United States Patent
Sumida et al.

(10) Patent No.: US 6,920,413 B2
(45) Date of Patent: Jul. 19, 2005

(54) METHOD AND APPARATUS FOR IDENTIFYING CHARACTERISTIC VALUE

(75) Inventors: Shizuo Sumida, 1-15-4 Yanonishi, Aki-ku, Hiroshima-shi, Hiroshima-Ken 736-0085 (JP); Akio Nagamatsu, 603-61 Tsu Kamakura-shi, Kanagawa-Ken, 248-0032 (JP); Hiroshi Takata, Fujisawa (JP)

(73) Assignees: Isuzu Motors Limited, Tokyo (JP); Shizuo Sumida, Hiroshima (JP); Akio Nagamatsu, Kanagwa (JP)

( * ) Notice: Subject to any disclaimer, the term of this patent is extended or adjusted under 35 U.S.C. 154(b) by 0 days.

(21) Appl. No.: 10/018,754

(22) PCT Filed: May 22, 2001

(86) PCT No.: PCT/JP01/04286

§ 371 (c)(1),
(2), (4) Date: Dec. 21, 2001

(87) PCT Pub. No.: WO01/90833

PCT Pub. Date: Nov. 29, 2001

(65) Prior Publication Data

US 2003/0065486 A1 Apr. 3, 2003

(30) Foreign Application Priority Data

May 26, 2000 (JP) ....................................... 2000-157158

(51) Int. Cl.[7] .............................................. H03F 1/26
(52) U.S. Cl. ..................................................... 702/189
(58) Field of Search .......................... 702/189, 64, 188, 702/19; 700/29, 52, 51, 30; 709/224; 705/8; 703/18, 14; 701/213; 327/105; 310/12; 356/218; 716/18, 4; 23/295; 370/250; 455/423; 340/905; 710/54; 50/10; 318/629; 707/204; 435/6; 304/514

(56) References Cited

U.S. PATENT DOCUMENTS

| | | | | |
|---|---|---|---|---|
| 4,641,235 A | * | 2/1987 | Shigemasa et al. | ........... 700/29 |
| 5,583,792 A | * | 12/1996 | Li et al. | ..................... 709/224 |
| 5,594,670 A | * | 1/1997 | Yamamoto | .................... 702/64 |
| 6,038,540 A | * | 3/2000 | Krist et al. | .................... 705/8 |

FOREIGN PATENT DOCUMENTS

JP        7-28504       1/1995

(Continued)

OTHER PUBLICATIONS

Akio Nagamatsu, et al., "Approach of Modeling for Aiding Product Development of Automobile (A Study on Construction of Virtual Prototype)", May 24, 2000.

*Primary Examiner*—John Barlow
*Assistant Examiner*—Tung S. Lau
(74) *Attorney, Agent, or Firm*—Staas & Halsey LLP

(57) ABSTRACT

A characteristic value identification method and an apparatus therefor which can develop each model to be integrated into an entire model, similar to a product in which individual parts are combined, are provided. A functional model of a part is prepared based on a potential quantity and a flow quantity representing a strength and a quantity of energy applied to the part, a steady internal characteristic value of the functional model in a steady state is identified, and a transient internal characteristic value of the functional model in a transient state is identified by using the identified steady internal characteristic value. Furthermore, the functional model having the characteristic value identified by such an identification apparatus is incorporated into a virtual testing system as a virtual prototype, an internal characteristic value of the virtual prototype is evaluated by providing a driving operation condition and an environment condition, actual machine test data obtained by the driving operation condition and the environment condition are compared with the internal characteristic value, and a re-identification is performed depending on the comparison result if necessary.

13 Claims, 33 Drawing Sheets

FOREIGN PATENT DOCUMENTS

| | | |
|---|---|---|
| JP | 8-16215 | 1/1996 |
| JP | 10-20930 | 1/1998 |
| JP | 11-282897 | 10/1999 |
| JP | 11-282898 | 10/1999 |
| JP | 2000-39381 | 2/2000 |
| JP | 2000-105172 | 4/2000 |

* cited by examiner

FIG.4

(1) FUNCTIONAL MODEL OF MOTOR

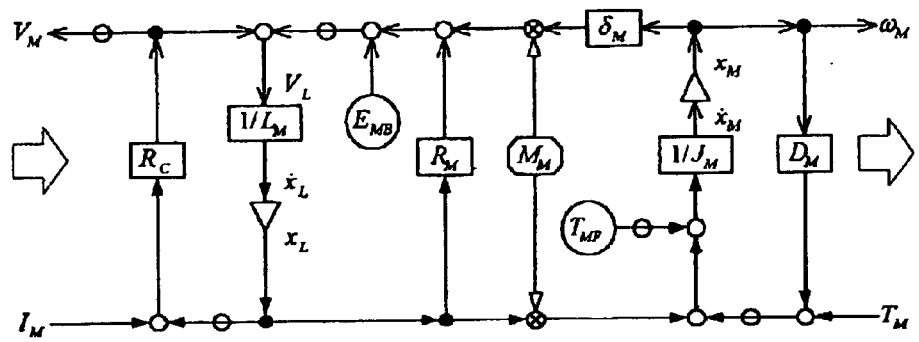

(2) SYMBOL OF FUNCTIONAL MODEL (FUNCTIONAL ELEMENT FRAME)

| SYMBOL NAME | SYMBOL | NOTE |
|---|---|---|
| FUNCTIONAL MODEL ELEMENT | $A_1 \rightarrow$ [FUNCTIONAL MODEL NAME] $\rightarrow B_1$ <br> $A_2 \leftarrow$ [FUNCTIONAL MODEL NAME] $\leftarrow B_2$ | $A1, A2, B1, B2$ : STATE VALUE |
| MECHANISM MODEL ELEMENT | $A \rightarrow$ (MECHANISM MODEL NAME) $\dashrightarrow B$ | $A$ : STATE VALUE · OPERATION QUANTITY <br> $B$ : RESULT |
| SHAPE MODEL ELEMENT | $A \rightarrow$ ⬡ $\dashrightarrow B$ | $A$ : STATE VALUE · OPERATION QUANTITY <br> $B$ : RESULT |
| EVALUATION MODEL ELEMENT | $A \rightarrow$ ⬢ $\dashrightarrow B$ | $A$ : STATE VALUE · OPERATION QUANTITY <br> $B$ : RESULT |
| ILLUSTRATION DIAGRAM | $A \rightarrow$ [CHART, ILLUSTRATION, EQUATION, ETC.] $\dashrightarrow B$ | $A$ : STATE VALUE · OPERATION QUANTITY <br> $B$ : RESULT |

METHOD AND APPARATUS FOR IDENTIFYING CHARACTERISTIC VALUE

TECHNICAL FIELD

The present invention relates to a characteristic value identification method and an apparatus therefor, and in particular to a characteristic value identification method and an apparatus therefor of a part composing a product.

BACKGROUND ART

There have been known two types of prior art characteristic value identification methods and apparatuses therefor in the following:

One is disclosed in the Japanese Patent Application No.6-140081, No. 8-18946, No. 9-287161, and the like. This prior art method adopts means for identifying a natural frequency, a natural mode, and a modal damping ratio based on measured data of a frequency response function (FRF) obtained by a vibration test of a tested object (part).

The other is a method called a characteristic matrix identification method. This method adopts means for identifying three kinds of characteristic matrices, i.e. a mass matrix, a damping matrix, and a stiffness matrix, which are coefficients of an equation of motion formulated based on "equilibrium of forces" rule in a dynamics system, from time history measured data of an exciting force and a response obtained by the vibration test of the tested object (part).

Generally, a machine has a mechanical power source generating a kinetic energy in some way, and is composed of a large number of parts such as a mechanism which transmits the mechanical power and a mechanism which takes advantage of the mechanical power for the work. Also, with the parts composing the machine, parts based on a physical unit system such as electric, mechanical, and fluid systems are organically united or combined.

The fact is that models which reproduce such a large number of parts with many different theoretical backgrounds are individually modeled for the identification according to the physical unit system in which the parts are included or the application thereof, with a mutual theoretical relationship being neglected regardless of high generality of the individual part and mechanism. For this reason, it has been disadvantageous that the above-mentioned two types of prior art based on the techniques of the mechanical system can be applied only to a specific phenomenon of mechanical system vibration.

Also, in the prior art, the model (part) has been identified only by one dimension "strength (flow quantity)" for two dimensional quantities "quantity (potential quantity)" and "strength" which prescribe energy. Namely, since both rules which govern each of the two kinds of quantities composing energy are not applied, continuity of velocity and acceleration has not been represented on the identified model, so that it was disadvantageously difficult to unite the parts with each other.

Furthermore, since the prior art only expresses a structure of a model, i.e. a positional relationship of the characteristics composing the model but not the functions of the characteristics, structural phenomena which the characteristics are compounded to reveal, e.g. a natural frequency, a natural mode shape, or a characteristic matrix of an entire structure can only be made clear by the identification, so that it has been impossible to directly clarify the characteristic values governing the function of an object.

SUMMARY OF THE INVENTION

It is accordingly an object of the present invention to provide a characteristic value identification method and an apparatus therefor which can develop models across different physical unit systems to be integrated into an entire model, similar to a product in which individual parts are combined.

A basic process for identifying an internal characteristic value of a functional model relating to a product and a part (hereinafter both simply referred to as a part) in the present invention is shown in FIG. 1. This diagram illustrates an identification method taking advantage of the functional model being a modeling method including a steady characteristic value and a transient characteristic value.

First of all, the functional model modeled in a process 1 originally includes the steady characteristic value and the transient characteristic value. Accordingly, the functional model identification of the present invention according to claim 1, these internal characteristic values are separately carried out by a steady identification process 2 and a transient identification process 3. Namely, for a basic process of the identification, the transient identification process 3 is executed after the steady identification process 2, since the steady characteristic value is free from interference of transient state and the transient state interferes with the steady characteristic value.

The steady identification process 2 further includes the following processes according to claims 2–5. Firstly, in a process 21, a steady functional model is obtained which reproduces a function, performance, and characteristic of a steady state from the functional model of the part. This steady functional model turns into a model including only a steady characteristic except a transient characteristic. In a process 22, a steady test of a part which forms an identification subject is performed to collect steady test data. In a process 23, the steady internal characteristic value is identified by using the test data to be provided to the functional model by a process 24.

The transient identification process 3 includes the following processes according to claims 6–9. Firstly in a process 31, a transient test model of a part which forms an identification subject is prepared, and the test is performed to collect transient test data. In a process 32, a transient internal characteristic value of the functional model is identified by using the test data. As shown in a process 4, the steady internal characteristic value identified in the process 24 is reflected to the transient identification process 3.

Hereinafter, along these processes, the test model and the identification method for identifying the functional model will be described taking a motor as an example enabling a brief description.

Firstly, the functional model of the process 1 common to each claim will be described by taking a DC (direct current) motor as an example.

<Modeling of Motor>
(1) Basic Function of Motor

A basic function of a motor is that electric energy is inputted, and the energy is converted into a rotation energy to be outputted. As for the energy conversion at this time, a voltage $V_M$ and a current $I_M$ are applied to the electric system of the motor whereby an angular velocity $\omega_M$ and a torque $T_M$ are outputted from the rotation system. Also, a loss characteristic, an accumulation characteristic, and an additional load are included in the motor as an internal load, so that these determine a behavior and a loss characteristic of the motor.

A torque coefficient $\chi_T$[Nm/A] expressed by the ratio of current and torque, and a velocity coefficient $\chi_\omega$ [V/(rad/sec)] expressed by the ratio of angular velocity and induced voltage are known between the electric system and the rotation system of the DC motor. An ideal motor model which directly converts an input/output state value with these coefficients being made a basic function can be expressed by the following equation:

$$\left. \begin{array}{l} \chi_T = \dfrac{T_M}{I_M} = \dfrac{1}{2\pi}\dfrac{P}{a} Z\phi \times 10^{-8} \\ \chi_\omega \cong \dfrac{V_M}{\omega_M} = \dfrac{1}{2\pi}\dfrac{P}{a} Z\phi \times 10^{-8} \end{array} \right\} \quad \text{Eq.(1)}$$

In equation (1), P is the number of poles in armature, "a" is the number of armature parallel circuits, Z is the number of all conductors, and $\phi$ is all of the magnetic flux per pole. They are characteristics determined by a motor structure. Also, the magnetic flux $\phi$ is determined by the structure in a separately excited type motor which uses a permanent magnet for a field in the same way as above, and is influenced by a state value of the electric system in a self-excited motor having a field winding. Eq.(1) is a basic one common to a DC rotator applied to a DC generator as well.

A torque coefficient $\chi_T$ and a velocity coefficient $\chi_\omega$ of Eq.(1) performs a physical unit system transformation from current into torque, or from angular velocity into voltage in the same equation. Therefore, these coefficients will be hereafter called motor constants expressed by $M_M$. As for the relationship between the motor constants and the internal load, the electric system and the rotation system are considered to be the motor internal load with the coefficients being bordered. A basic form of the motor model combining the relationship of the basic function of the motor constant $M_M$ and the internal load is shown in FIG. 2.

In FIG. 2, the input/output state value of the electric system is connected to a power supply, and the input/output state value of the mechanical system is united with an external machine load. Also, as for the flow of the state value, the lower flow represents a flow system in which the current $I_M$ of the power supply is converted by $M_M$ into a flow of the output torque $T_M$ which drives the external load, while the upper flow represents a potential system in which the angular velocity $\omega_M$ received from the external load is converted into the motor induced voltage by $M_M$ to turn into a flow of the voltage $V_M$ returned to the power supply.

Thus, the mechanical system and the electric system are united by the strength of energy called a potential quantity and the quantity of energy called a flow quantity, thereby enabling energy rules of two dimensions, equilibrium of forces and the continuity of velocity, to be satisfied.

(2) Functional Model of Motor

An electric circuit diagram of the motor model is shown in FIG. 3.

In the electric system of FIG. 3, $R_M$ is a winding resistance, $L_M$ is an inductance, and $R_C$ is an insulation resistance of the winding. Also, the rotation system has a moment of inertia $J_M$, a viscous resistance $D_M$, and a friction torque $T_{MF}$. The functional model expressing these relationships is shown in FIGS. 4(1) and 4(2). It is to be noted that such a functional model itself has already been disclosed in the Japanese Patent Application Laid-open No. 9-91334.

In FIG. 4(1), the right side of the motor constant $M_M$ forms the rotation system internal load, and the left side thereof forms the electric system internal load. This model has a voltage drop $E_{MB}$ of a brush which supplies the current $I_M$ to the armature, and a friction torque $T_{MF}$ of the rotation system as the additional load. When the influence of both is neglected, $T_{MF}$ and $E_{MB}$ can be assumed to be 0. It is to be noted that $x_M$ and $x_L$ in FIG. 4(1) are internal state values. Also, the following velocity correction coefficient $\delta_M$ is added to the motor constant $M_M$ by taking into account the variation of the torque coefficient $\chi_T$ and the velocity coefficient $\chi_\omega$.

$$\left. \begin{array}{l} \delta_M = \dfrac{\chi_\omega}{\chi_T} \\ M_M = \chi_T \end{array} \right\} \quad \text{Eq.(2)}$$

A government equation of such a motor functional model in FIG. 4(1) is given by the following equation:

$$\begin{bmatrix} 0 \\ 0 \\ \omega_M \\ V_M \end{bmatrix} = \begin{bmatrix} -J_M & 0 & -D_M & M_M & -1 & 0 & -T_{MF} \\ 0 & -L_M & -\delta_M M_M & -(R_M + R_c) & 0 & R_C & -E_{MB} \\ 0 & 0 & 1 & 0 & 0 & 0 & 0 \\ 0 & 0 & 0 & R_C & 0 & -R_C & 0 \end{bmatrix} * \begin{bmatrix} \dot{x}_M \\ \dot{x}_L \\ x_M \\ x_L \\ T_M \\ I_M \\ 1 \end{bmatrix} \quad \text{Eq.(3)}$$

In equation (3), the 1st–2nd rows form state equations, and the 2nd–4th rows form output equations.

It is to be noted that Eq.(3) can be derived from the following process shown in FIG. 4(1);

A white circle adds the inputted state values to make the output state value;

At a black circle, the outputted state value is equal to the inputted state value;

A characteristic expressed by a square makes the product of the input state value and the characteristic the output state value;

A white circle with a mark × outputs the product of the input state values or input signals;

A while circle with a mark — makes the state value negative;

A triangle integrates a differential quantity of the inputted state value to make the output state value;

A large white circle on which a variable name is written expresses the state value generated in the functional model as an additional load.

(3) Uniting with Motor Power Supply

A battery forming the power supply of the motor is modeled. FIG. 5 shows a circuit diagram of the battery, and FIG. 6 shows its functional model. In the battery of FIG. 6, a voltage $V_B$ and a current $I_B$ are connected to the voltage $V_M$ and the current $I_M$ of the motor shown in FIG. 4(1). Also, the characteristic of FIG. 6 has $E_O$ as an induced electromotive force of the battery, and $R_E$ as an internal resistance of the battery.

The government equation of the battery in FIG. 5 is given as follows:

$$[I_B] = \left[ -\frac{1}{R_B} \quad \frac{1}{R_B} E_0 \right] \begin{bmatrix} V_B \\ 1 \end{bmatrix} \quad \text{Eq.(4)}$$

Uniting the motor model and the battery model is given by the following equation by substituting equation (4) for Eq.(3).

$$\begin{bmatrix} 0 \\ 0 \\ \omega_M \\ V_M \\ I_M \end{bmatrix} = \begin{bmatrix} -J_M & 0 & -D_M & M_M & -1 & -T_{MF} \\ 0 & -L_M & -\delta_M M_M & -(R_M + R_C R_B Y_0) & 0 & R_C I_0 - E_{MB} \\ 0 & 0 & 1 & 0 & 0 & 0 \\ 0 & 0 & 0 & -R_B R_C Y_0 & 0 & R_C I_0 \\ 0 & 0 & 0 & R_C Y_0 & 0 & I_0 \end{bmatrix} * \begin{bmatrix} \dot{x}_M \\ \dot{x}_L \\ x_M \\ x_L \\ T_M \\ 1 \end{bmatrix} \quad \text{Eq.(5)}$$

The 1st–2nd rows of equation (5) form the state equations, and the 3rd–5th rows form the output equations. An abstracted equivalent admittance $Y_0$ and a current source $I_0$ in Eq.(5) are expressed by the following equations:

$$Y_0 = \frac{1}{R_B + R_C} \quad \text{Eq.(6)}$$

$$I_0 = Y_0 E_0 \quad \text{Eq.(7)}$$

Thus, a characteristic value identification method according to the present invention uses a functional model of a part based on a potential quantity and a flow quantity representing energy applied to the part, comprises a first process for preparing that functional model, a second process for converting the functional model into a steady functional model in a steady state to identify a steady internal characteristic value, and a third process for identifying a transient internal characteristic value in a transient state of the functional model by using the steady internal characteristic value (claim 1).

Thus, in the characteristic value identification method of the present invention, the functional model of the part is prepared by the energy rules called the potential quantity and the flow quantity, and the transient identification is performed after the steady identification of its internal characteristic value, thereby enabling accurate identification of the characteristic values for all the parts and modeling of an integrated product.

The above-mentioned second process may include a first step for determining an internal characteristic value of at least one steady test model from the steady functional model, a second step for collecting steady test data by performing a test corresponding to the steady test model, and a third step for identifying a steady internal characteristic value of the internal characteristic value based on the steady test data (claim 2).

The above-mentioned first step may determine the internal characteristic value from a government equation in the steady state of the functional model (claim 3).

Also, the above-mentioned third step may convert the government equation into a recurrence equation to determine the steady internal characteristic value from a recurrence coefficient of the recurrence equation (claim 4), and may divide the steady internal characteristic value into a known factor and an unknown factor to identify the steady internal characteristic value of the unknown factor (claim 5).

Furthermore, the above-mentioned third process may include a first step for determining an internal characteristic value of at least one transient test model in a transient state of the functional model, a second step for collecting transient test data by performing a test corresponding to the transient test model, a third step for applying the steady internal characteristic value to the internal characteristic value of the transient test model to generate transient phenomenon reproduction data, and a fourth step for correcting the transient phenomenon reproduction data based on an error between the transient phenomenon reproduction data and the transient test data, thereby identifying a transient internal characteristic value (claim 6).

When the error does not lie within an allowable range, the above-mentioned fourth step may repeatedly correct a predetermined transient internal characteristic value within the transient phenomenon reproduction data until the error lies within the allowable range, and determine the transient internal characteristic value to be identified when the error lies within the allowable range (claim 7).

Also, the above-mentioned fourth step may preliminarily calculate a variance deviation, as a time history sensitivity, to an initial value at a time when each transient internal characteristic value is increased or decreased at a fixed ratio, and select a transient internal characteristic value having a maximum sensitivity within the time history sensitivity as the predetermined transient internal characteristic value (claim 8), or may select a transient internal characteristic value having the time history sensitivity similar to the error as the predetermined transient internal characteristic value (claim 9).

It is to be noted that the fourth step may simultaneously select a plurality of transient internal characteristic values having different maximum sensitivity times as the predetermined transient internal characteristic value (claim 10).

Also, a characteristic value identification apparatus according to the present invention comprises block replacement means for a functional model of a part, test reproduction means for reproducing at least one steady test model in a steady state of the functional model and at least one transient test model in a transient state, testing means of the part for performing a steady test and a transient test respectively corresponding to the steady test model and the transient test model, measurement means for collecting steady test data and transient test data at a time when a steady test and a transient test of the part are performed by the testing means, and calculating means for identifying a steady internal characteristic value of the steady test model by using the steady test data, for applying the steady internal characteristic value to the transient test model to generate transient phenomenon reproduction data, and for correcting the transient phenomenon reproduction data based on an error between the transient phenomenon reproduction data and the transient test data, thereby identifying a transient internal characteristic value (claim 11).

Thus, it becomes possible to quickly identify the functional model of the same kind.

When the error does not lie within an allowable range, the above-mentioned calculating means may repeatedly correct a predetermined transient internal characteristic value within the transient phenomenon reproduction data until the error lies within the allowable range, and determine the transient internal characteristic value to be identified when the error lies within the allowable range (claim 12).

Also, the above-mentioned calculating means may preliminarily calculate a variance deviation, as a time history sensitivity, to an initial value at a time when each transient internal characteristic value is increased or decreased at a fixed ratio, and select a transient internal characteristic value having a maximum sensitivity within the time history sensitivity as the predetermined transient internal characteristic value (claim 13), or may select a transient internal characteristic value having the time history sensitivity similar to the error as the predetermined transient internal characteristic value (claim 14).

It is to be noted that the calculating means may simultaneously select a plurality of transient internal characteristic values having a different maximum sensitivity time as the predetermined transient internal characteristic value (claim 15).

Furthermore, a virtual testing system according to the present invention incorporates the functional model, as a virtual prototype, having an internal characteristic value identified by a characteristic value identification apparatus claimed in claim 11 and comprises condition assigning means for assigning a driving operation condition and an environment condition to the characteristic value identification apparatus, observation means for observing reproduction data obtained by the virtual prototype when the driving operation condition and the environment condition are assigned, and evaluation means for evaluating an observation result of the observation means (claim 12).

Namely, in the identification of the internal characteristic value by the present invention, an evaluation of a function, a performance, and a characteristic of a part as well as a product in an actual machine test can be regarded as a virtual test performed on a computer, and the actual machine test performed in a development process of designing, prototyping, and testing in the prior art can be omitted, so that it becomes possible to shorten the period and to reduce the development cost by the virtual test.

The above-mentioned virtual testing system may further comprise another measurement means for measuring actual machine test data at a time when the driving operation condition and the environment condition are provided to an actual machine which forms a subject of the virtual prototype, and re-identification means of the virtual prototype, wherein the evaluation means may compare an output of the measurement unit and the observation result, and make the re-identification means re-identify the virtual prototype according to the comparison result (claim 12).

A fixed virtual prototype may be incorporated into a part of a drive system and a load system connected to the part as the above-mentioned virtual prototype, the testing means may perform a test corresponding to the fixed virtual prototype, and the evaluation means at this time may make the re-identification means perform a re-identification according to the comparison result (claim 13).

BRIEF DESCRIPTION OF DRAWINGS

FIG. 4 is a diagram respectively showing a functional model and symbols of a motor used in a characteristic value identification method and an apparatus therefor according to the present invention;

Figure 1:
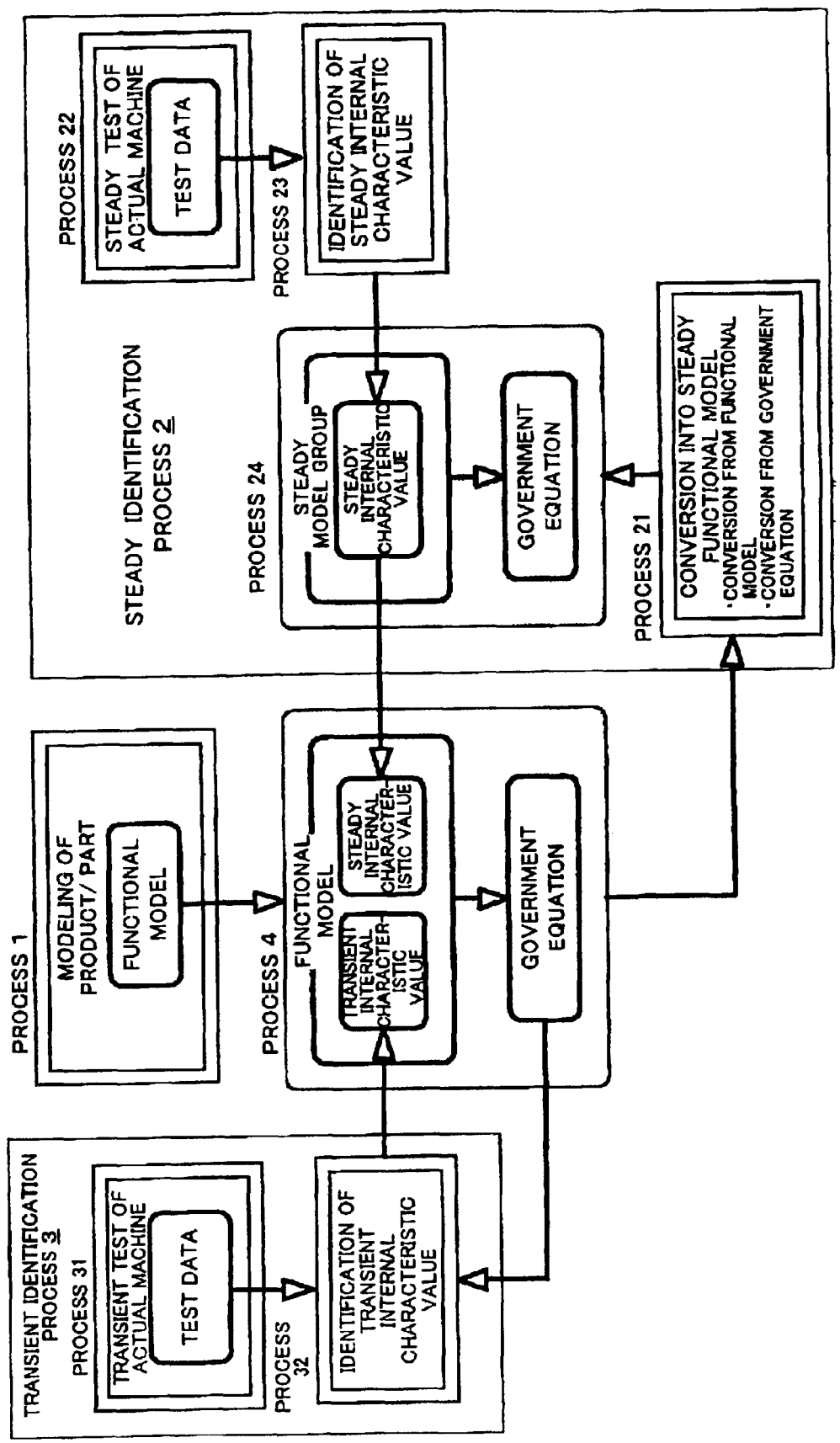
FIG. 1 is a block diagram showing a basic concept of a characteristic value identification method and an apparatus therefor according to the present invention.
Figure 2:
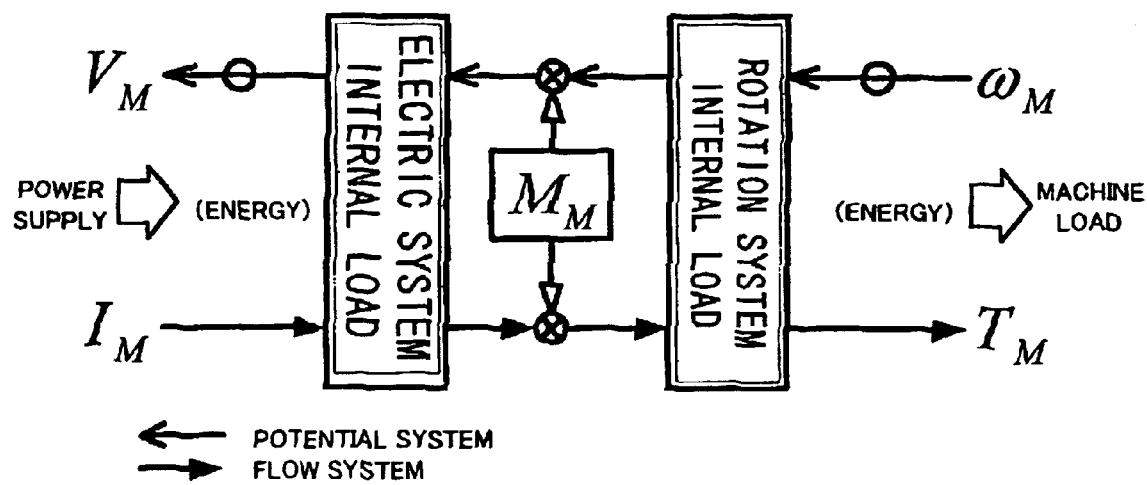
FIG. 2 is a block diagrams showing a basic system of a motor model with a potential quantity and a flow quantity of energy being mutually related.
Figure 3:
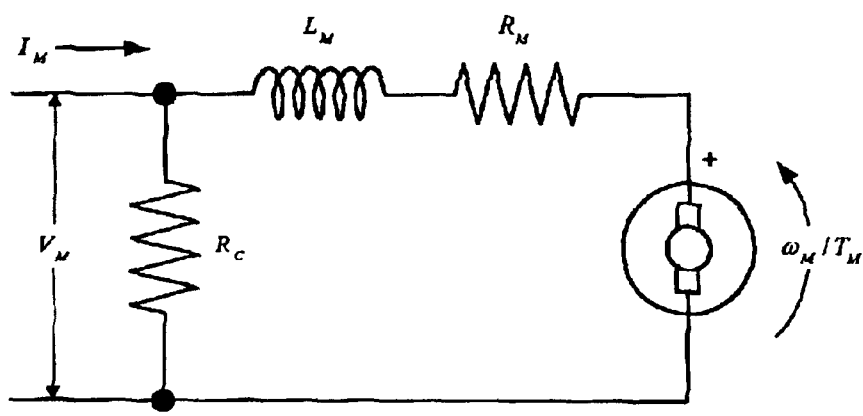
FIG. 3 is a diagram showing a general electric circuit of a motor.
Figure 5:
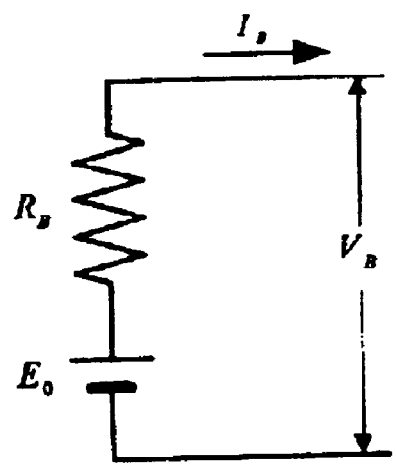
FIG. 5 is a diagram showing a general electric circuit of a battery.

DESCRIPTION OF REFERENCE NUMERALS 1 motor model (block replacement structure)
2 test reproduction model
3 tested motor
4 drive circuit unit
5 load generator
6 electric load
8, 34 measurement unit
9 calculation unit
10 virtual test model
11 virtual prototype
12 test standard model
13 engine model (motor model)
14 body model (generator model)
21 drive model (battery operation model)
22 load model (load generator model)
23, 37, 40 observation model, observation system
24 characteristic value update model
25 model replacement unit
30 virtual test portion
31, 38, 39 drive operation model, operation system
32, 41 environment condition model, environment system
33 actual machine test portion
35 evaluation model
36 control system input/output unit
50 tested transmission
51 tested power train (P/T)
71 drive system control unit
72 load system control unit Throughout the figures, like reference numerals indicate like or corresponding components.

BEST MODE FOR CARRYING OUT THE INVENTION

Hereinafter, an embodiment of a characteristic value (model) identification method and an apparatus according to the present invention schematically shown in FIG. 1 will be described.

1. Functional Model in Steady State

In order to perform the steady identification process 2 shown in FIG. 1, the steady functional model conversion is required as shown in the process 21. In this steady functional model conversion, it is necessary as will be described hereafter to convert the functional model into the steady functional model for reproducing the steady state of the part, and to further convert the steady functional model into the steady test model according to steady tests of the part (process 210).

Figure 7:
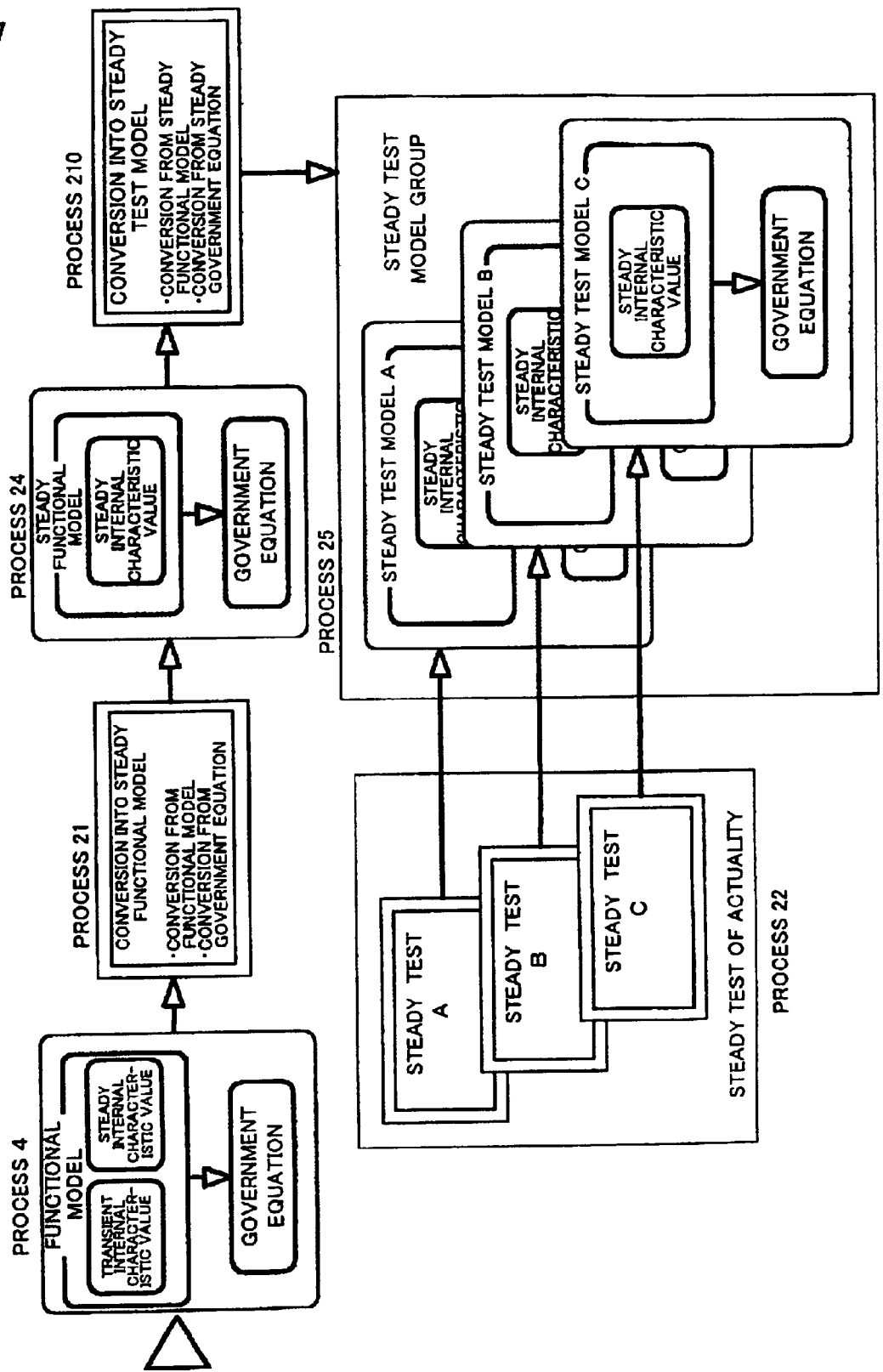
FIG. 7 is a block diagram showing a process for preparing a steady test model group from a motor steady functional model relating to a characteristic value identification method and an apparatus therefor according to the present invention.

Since the steady identification utilizes the steady test data, the steady test model can make the steady functional model of the identification subject accord with the tested object to which the actual machine test is performed, by modeling the tested object according to the condition and the contents of the steady test for generating the test data. FIG. 7 shows a flow of a series of model conversions.

1.1 Conversion from Function Model into Steady Functional Model

Since there is no transient variation in a steady state of a motor, neither the inductance $L_M$ nor the moment of inertia $J_M$ shown in FIG. 4A influences the steady internal characteristic value. Also, since the insulation resistance $R_C$ in FIG. 4A has an extremely large value, the influence to the motor current $I_M$ can be neglected. From the above-mentioned points, the motor model in the steady state where $L_M, J_M, R_C$ of FIG. 4(1) are eliminated turns into a functional model shown in FIG. 8.

Figure 6:
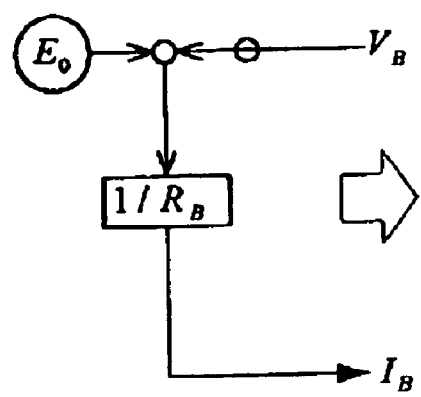
FIG. 6 is a diagram showing a functional model of a battery.
Figure 8:
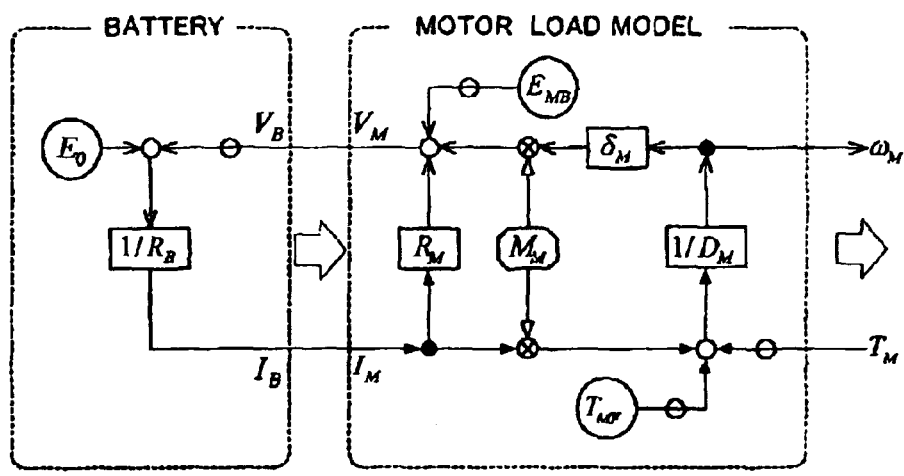
FIG. 8 is a diagram showing a steady functional model of a motor.

The left side of FIG. 8 shows a battery model of FIG. 6 in which the operation switch of the electric system is omitted, and the right side thereof shows a motor model in a steady state. From FIG. 8, the motor model in the steady state can be expressed by the following government equation:

$$\begin{bmatrix} \omega_M \\ V_M \end{bmatrix} = \begin{bmatrix} -\dfrac{1}{D_M} & \dfrac{M_M}{D_M} & -\dfrac{1}{D_M}T_{MF} \\ -\dfrac{M_M \delta_M}{D_M} & R_M + \dfrac{M_M^2 \delta_M}{D_M} & E_{MB} - \dfrac{M_M \delta_M}{D_M}T_{MF} \end{bmatrix} \begin{bmatrix} T_M \\ I_M \\ 1 \end{bmatrix} \quad \text{Eq.(8)}$$

For another method of deriving the steady government equation, the government equation in the steady state obtained by eliminating $L_M$, $J_M$, $R_C$ from the government Eq.(3) of the functional model in FIG. 4(1) can be obtained by the following processes:

① The equation obtained by eliminating the differential state values of $\dot{\chi}_M$ and $\dot{\chi}_L$ from Eq.(3) with $L_M$ and $J_M$ being assumed to be 0 is given as follows:

$$\begin{bmatrix} 0 \\ 0 \\ \omega_M \\ V_M \end{bmatrix} = \begin{bmatrix} -D_M & M_M & -1 & 0 & -T_{MF} \\ -\delta_M M_M & -(R_M + R_c) & 0 & R_C & -E_{MB} \\ 1 & 0 & 0 & 0 & 0 \\ 0 & R_C & 0 & -R_C & 0 \end{bmatrix} * \begin{bmatrix} x_M \\ x_L \\ T_M \\ I_M \\ 1 \end{bmatrix} \quad \text{Eq.(9)}$$

② The equation obtained by eliminating the internal state values of $x_M$ and $x_L$ from equation (9) is given as follows:

$$\begin{bmatrix} \omega_M \\ V_M \end{bmatrix} = \begin{bmatrix} -\dfrac{R_M + R_c}{D} & \dfrac{R_C M_M}{D} & \dfrac{M_M E_{MB} - (R_M + R_c)T_{MF}}{D} \\ \dfrac{R_C \delta_M M_M}{D} & -\dfrac{R_C(D_M R_M + R_C \delta_M M_M^2)}{D} & \dfrac{R_C(\delta_M M_M T_{MF} - D_M E_{MB})}{D} \end{bmatrix} * \begin{bmatrix} T_M \\ I_M \\ 1 \end{bmatrix} \quad \text{Eq.(10)}$$

"D" in equation (10) is assumed to be the following equation:

$$D = D_M(R_M + R_c) + \delta_M M_M^2 \quad \text{Eq.(11)}$$

③ The equation obtained by eliminating the insulation resistance by making $R_C = \infty$ from Eq.(10) is given as follows:

$$\begin{bmatrix} \omega_M \\ V_M \end{bmatrix} = \begin{bmatrix} -\dfrac{1}{D_M} & \dfrac{M_M}{D_M} & -\dfrac{1}{D_M}T_{MF} \\ \dfrac{\delta_M M_M}{D_M} & -R_M - \dfrac{\delta_M M_M^2}{D_M} & \dfrac{\delta_M M_M}{D_M}T_{MF} - E_{MB} \end{bmatrix} * \begin{bmatrix} T_M \\ I_M \\ 1 \end{bmatrix} \quad \text{Eq.(12)}$$

The government equation (12) in the steady state derived from the government Eq.(3) of the functional model is equal to the government equation (8) derived from the functional model in the steady state in FIG. 8.

Accordingly, there are two methods for obtaining the steady government equation reproducing the steady state of the part; one by converting the functional model reproducing the transient state of the part into the steady functional model, and the other by deriving the steady government equation from the government equation of the functional model. This indicates that the functional model in the steady state can be reversely depicted from the derived steady government equation, and that there is a reversibility between the steady functional model and the steady government equation.

1.2 Conversion from Steady Functional Model into Test Model

A steady state of an actuality by the steady functional model will be considered, and the test model will be examined. The test model in the steady state models the test of the actuality which provides a specified condition to an input/output system of a tested object, from the steady functional model and its government equation. The steady internal characteristic value is identified by relating the test data obtained when the specified condition is assigned to the tested object, with the government equation.

Figure 9:
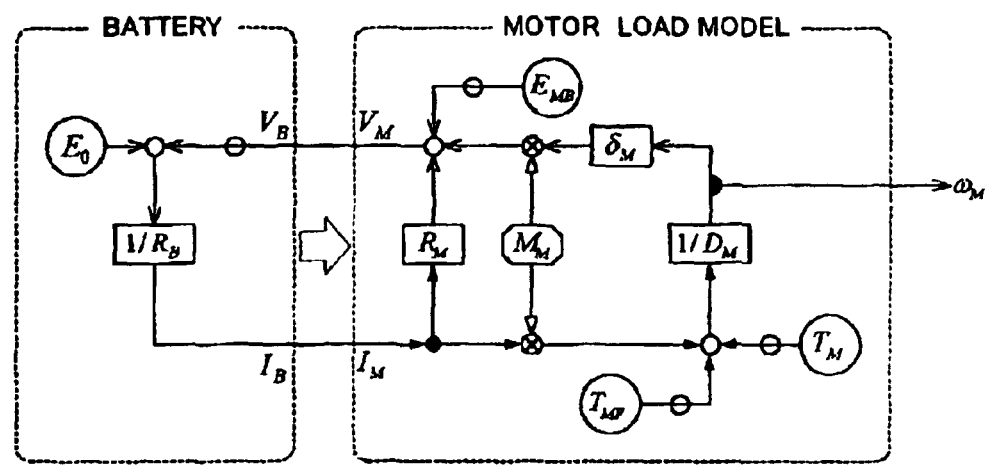
FIG. 9 is a diagram showing a motor model at the time of a steady load test.

The relationship between the specified condition in which the steady internal characteristic value is assigned to the motor model and the test is as follows:

① In case a fixed torque is provided to the motor with the power supply being connected, the model reproduces the relationship between the load applied to the motor and the steady internal characteristic value, so that the relationship between the motor current, the angular acceleration, and the load torque can be observed (steady load test: FIG. 9).

Figure 10:
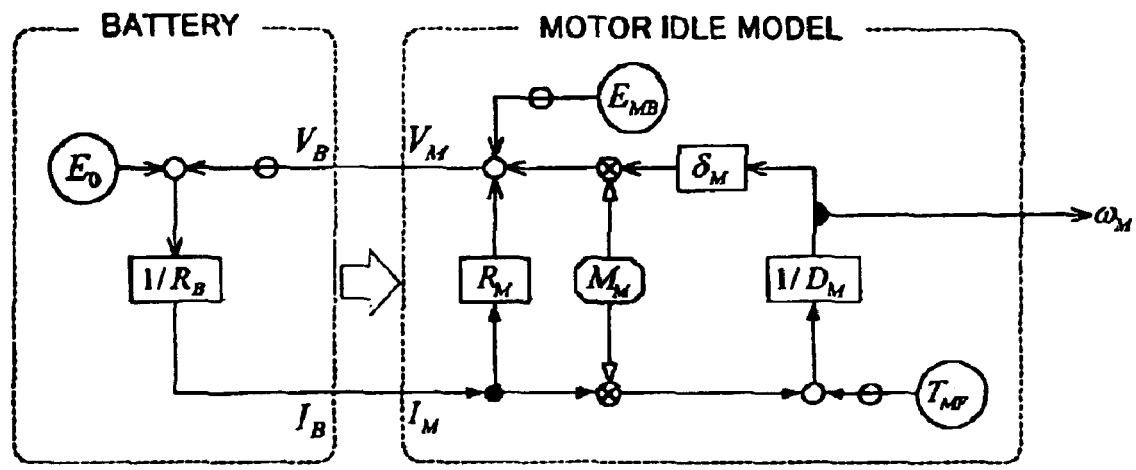
FIG. 10 is a diagram showing a motor model at the time of a load test.

② The case where the input torque $T_M$ is assumed to be 0 corresponds to a motor rotation in an idle state, so that an idle angular velocity and an idle current are observed (idle test: FIG. 10).

Figure 11:
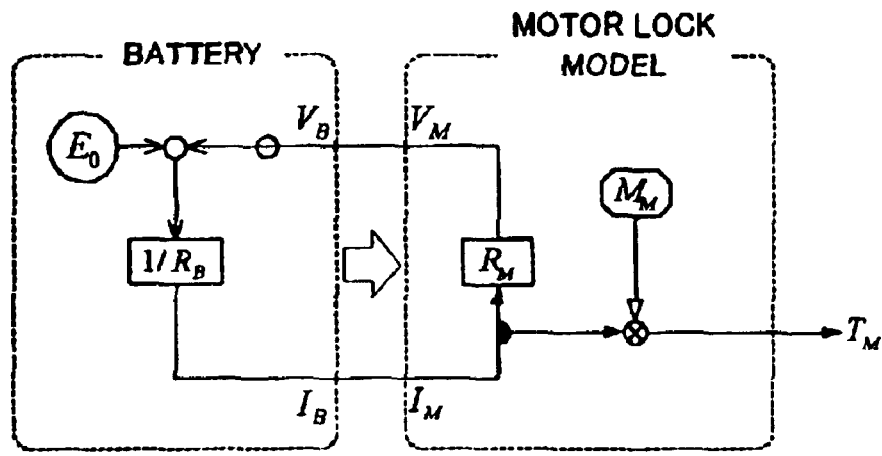
FIG. 11 is a diagram showing a motor model at the time of a lock test.

③ The case where an output angular velocity $\omega_M$ is assumed to be 0 corresponds to a lock state or a state at a starting moment when the motor rotation is compulsorily stopped, so that a lock current and a lock torque can be observed (motor lock test: FIG. 11).

Figure 12:
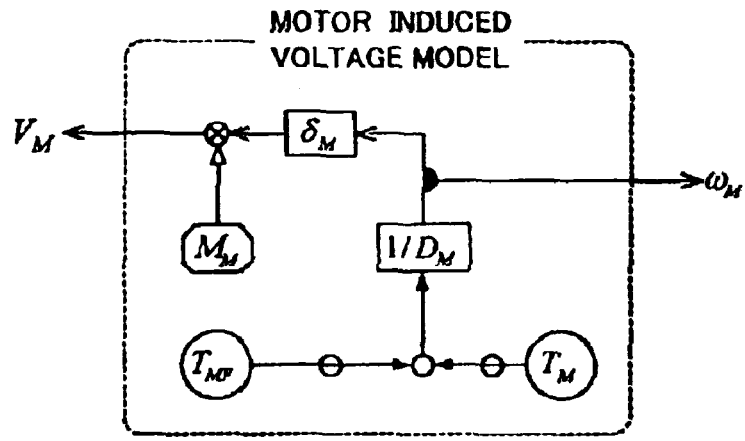
FIG. 12 is a diagram showing a motor model at the time of a induced voltage test.

④ In case the input current $I_M$ is assumed to be 0 and the input torque $T_M$ is provided, the model which reproduces a generator function of the motor is obtained, so that the induced voltage and the angular acceleration can be observed (induced voltage test: FIG. 12).

Figure 13:
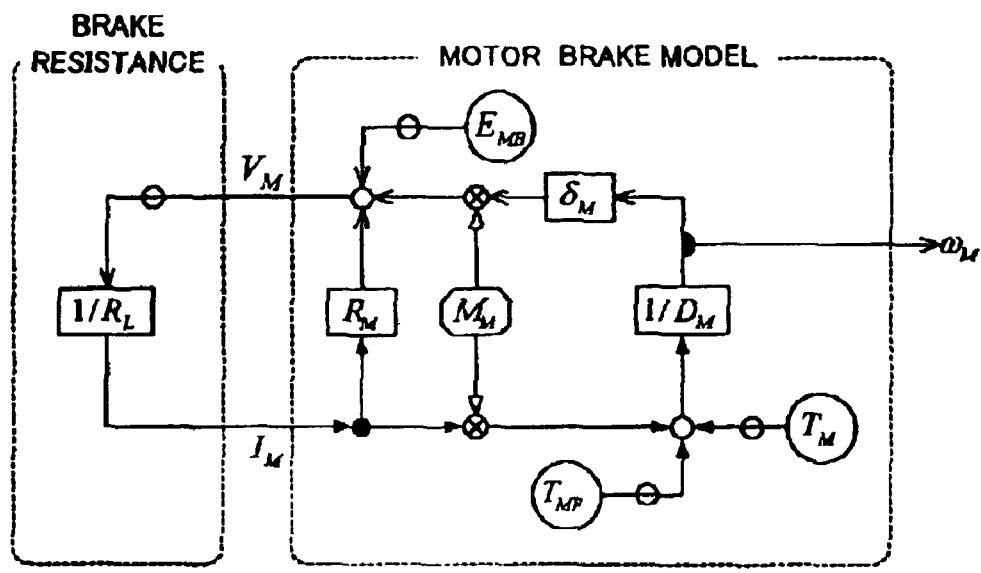
FIG. 13 is a diagram showing a motor model at the time of a braking test.

⑤ In case a resistor is connected to the input/output state value of the electric system to provide a fixed torque, the model which reproduces a regenerative braking force of the motor can be obtained, so that the relationship between the motor current, the angular acceleration, and a braking torque can be observed (steady braking test: FIG. 13).

These test models are different from each other depending on how to provide the specified conditions. However, in an actual modeling, the values of the steady characteristic such as a steady functional model or a steady load test model and the input state are made 0 or an infinite value (large value within a range where the value does not influence a reproduction result), so that each test model can be equivalently realized. It is necessary to perform at least one of such steady tests.

In view of the above-mentioned description, the motor test model performed from the steady functional model in FIG. 8 under the specified conditions, is given as follows:

1.2.1 Motor Steady Load Test

FIG. 9 shows a steady load test which observes the performance and the characteristic by providing the load torque to the motor.

In FIG. 9, the input torque $T_M$ is provided as a drive torque by the additional load from the steady functional model in FIG. 8, and the output angular velocity $\omega_M$ is represented as an observation quantity. Accordingly, the government Eq.(8) of the motor is transformed into the following equation:

$$\begin{bmatrix} \omega_M \\ V_M \end{bmatrix} = \begin{bmatrix} \dfrac{M_M}{D_M} & -\dfrac{1}{D_M}(T_M + T_{MF}) \\ R_M + \dfrac{M_M^2 \delta_M}{D_M} & E_{MB} - \dfrac{M_M \delta_M}{D_M}(T_M + T_{MF}) \end{bmatrix} \begin{bmatrix} I_M \\ 1 \end{bmatrix} \quad \text{Eq. (13)}$$

The government equation of the steady load test obtained by mutually substituting the government Eq.(4) of the battery for equation (13) is given as follows:

$$\begin{bmatrix} \omega_M \\ V_M \\ I_M \end{bmatrix} = \begin{bmatrix} \dfrac{1}{D_M} \dfrac{M_M(E_0 - E_{MB}) - (R_B + R_M)(T_M + T_{MF})}{(R_B + R_M) + \dfrac{M_M^2 \delta_M}{D_M}} \\ \dfrac{\left(R_M + \dfrac{M_M^2 \delta_M}{D_M}\right)\dfrac{1}{R_B}E_0 + E_{MB} - \dfrac{M_M \delta_M}{D_M}(T_M + T_{MF})}{1 + \left(R_M + \dfrac{M_M^2 \delta_M}{D_M}\right)\dfrac{1}{R_B}} \\ \dfrac{E_0 - E_{MB} + \dfrac{M_M \delta_M}{D_M}(T_M + T_{MF})}{\left(R_B + R_M + \dfrac{M_M^2 \delta_M}{D_M}\right)} \end{bmatrix} \quad \text{Eq. (14)}$$

Equation (14) is a government equation reproducing a rated load test of the motor, where all of the equations assume the output state value reproducing the state value of the steady state.

1.2.2 Motor Idle Test

In the motor idle state, the input torque $T_M$ of the steady load test model in FIG. 9 becomes 0. The idle test model where the input torque $T_M$ is eliminated from FIG. 9 can be shown by FIG. 10.

The government equation of the motor in FIG. 10 turns into the following equation obtained by eliminating the load torque $T_M$ from the government Eq.(13) of the steady load test:

$$\begin{bmatrix} \omega_M \\ V_M \end{bmatrix} = \begin{bmatrix} \dfrac{M_M}{D_M} & -\dfrac{1}{D_M}T_{MF} \\ R_M + \dfrac{M_M^2 \delta_M}{D_M} & E_{MB} - \dfrac{M_M \delta_M}{D_M}T_{MF} \end{bmatrix} \begin{bmatrix} I_M \\ 1 \end{bmatrix} \quad \text{Eq. (15)}$$

The government equation of the idle test obtained by mutually substituting the government Eq.(4) of the battery for equation (15) is given as follows:

$$\begin{bmatrix} \omega_M \\ V_M \\ I_M \end{bmatrix} = \begin{bmatrix} \dfrac{1}{D_M} \dfrac{M_M(E_0 - E_{MB}) - (R_B + R_M)T_{MF}}{(R_B + R_M) + \dfrac{M_M^2 \delta_M}{D_M}} \\ \dfrac{\left(R_M + \dfrac{M_M^2 \delta_M}{D_M}\right)\dfrac{1}{R_B}E_0 + E_{MB} - \dfrac{M_M \delta_M}{D_M}T_{MF}}{1 + \left(R_M + \dfrac{M_M^2 \delta_M}{D_M}\right)\dfrac{1}{R_B}} \\ \dfrac{E_0 - E_{MB} + \dfrac{M_M \delta_M}{D_M}T_{MF}}{\left(R_B + R_M + \dfrac{M_M^2 \delta_M}{D_M}\right)} \end{bmatrix} \quad \text{Eq. (16)}$$

1.2.3 Motor Lock Test

At the starting moment of the motor, the angular velocity $\omega_M$ becomes 0, where it can be regarded as a motor lock state in which the motor rotation is compulsorily stopped. Accordingly, the functional model of the lock test reproducing the motor lock can be shown by FIG. 11 where the output angular velocity $\omega_M$ of the steady functional model in FIG. 8 is supposed to be 0. It is to be noted that since a brush voltage drop $E_{MB}$ generated in the stop state of the motor rotation does not generate a fixed voltage drop but only assumes a minute voltage drop by a brush resistance, it is neglected and omitted.

In FIG. 11, each steady internal characteristic value relating to the output angular velocity $\omega_M$ is eliminated from the steady functional model in FIG. 8, so that the input torque $T_M$ is shown by the observation quantity of the lock torque. The government equation of FIG. 11 is given as follows:

$$\begin{bmatrix} V_M \\ T_M \end{bmatrix} = \begin{bmatrix} R_M \\ M_M \end{bmatrix} [I_M] \quad \text{Eq. (17)}$$

The government equation of the lock test obtained by substituting the government Eq.(4) of the battery for equation (17) to be integrated is given as follows:

$$\begin{bmatrix} V_M \\ T_M \\ I_M \end{bmatrix} = \begin{bmatrix} \dfrac{R_M}{R_B + R_M}E_0 \\ -\dfrac{E_0}{R_B + R_M}M_M \\ \dfrac{E_0}{R_B + R_M} \end{bmatrix} [1] \quad \text{Eq. (18)}$$

1.2.4 Motor Induced Voltage Test

FIG. 12 shows a model of an induced voltage test which provides the torque to the motor to observe a counter electromotive force $V_M$ induced by the armature and the angular velocity $\omega_M$.

In FIG. 12, the steady internal characteristic value relating to the input current $I_M$ is eliminated from the steady functional model in FIG. 8, so that the output angular velocity $\omega_M$ is shown by the observation quantity. The government equation of FIG. 12 is given as follows:

$$\begin{bmatrix} \omega_M \\ V_M \end{bmatrix} = \begin{bmatrix} -\dfrac{1}{D_M}(T_M + T_{MF}) \\ -\dfrac{M_M \delta_M}{D_M}(T_M + T_{MF}) \end{bmatrix} [1] \quad \text{Eq. (19)}$$

1.2.5 Motor Steady Braking Test

FIG. 13 shows a steady model of a regenerative braking which provides the torque to the motor and reversely returns the counter electromotive force $V_M$ induced by the armature to the motor through a braking resistance $R_L$ to provide a braking force.

In FIG. 13, the battery is eliminated from the steady functional model in FIG. 8, the braking resistance $R_L$ is connected, and the input torque $T_M$ of the motor is provided as a drive torque. In addition, the output angular velocity $\omega_M$ is shown as the observation quantity. The government equation of the motor in FIG. 13 is given as follows:

$$\begin{bmatrix} \omega_M \\ V_M \\ I_M \end{bmatrix} = \begin{bmatrix} -\dfrac{M_M E_{MB} + (R_L+R_M)(T_M+T_{MF})}{(R_L+R_M)+\dfrac{M_M^2 \delta_M}{D_M}} \dfrac{1}{D_M} \\ \dfrac{E_{MB} - \dfrac{M_M \delta_M}{D_M}(T_M+T_{MF})}{(R_L+R_M)+\dfrac{M_M^2 \delta_M}{D_M}} R_L \\ \dfrac{E_{MB} - \dfrac{M_M \delta_M}{D_M}(T_M+T_{MF})}{(R_L+R_M)+\dfrac{M_M^2 \delta_M}{D_M}} \end{bmatrix} \quad [1] \qquad \text{Eq. (20)}$$

The above-mentioned test models can be equivalently modeled by setting the following values to the characteristic or the input state value of the steady load test model shown in FIG. 9:

① The idle test model becomes equivalent by rendering the input torque $T_M=0$.

② The lock test model becomes equivalent by rendering a viscous damping coefficient and the brush voltage drop respectively $D_M=\infty$, $E_{MB}=0$.

③ The induced voltage test model becomes equivalent by rendering the motor current and the brush voltage drop respectively $I_M=0$, $E_{MB}=0$.

④ The braking test model becomes equivalent by rendering the internal electromotive force of the battery $E_0=0$, and by rendering the internal resistance $R_B$ the braking resistance $R_L$.

2. Identification of Steady State

Figure 14:
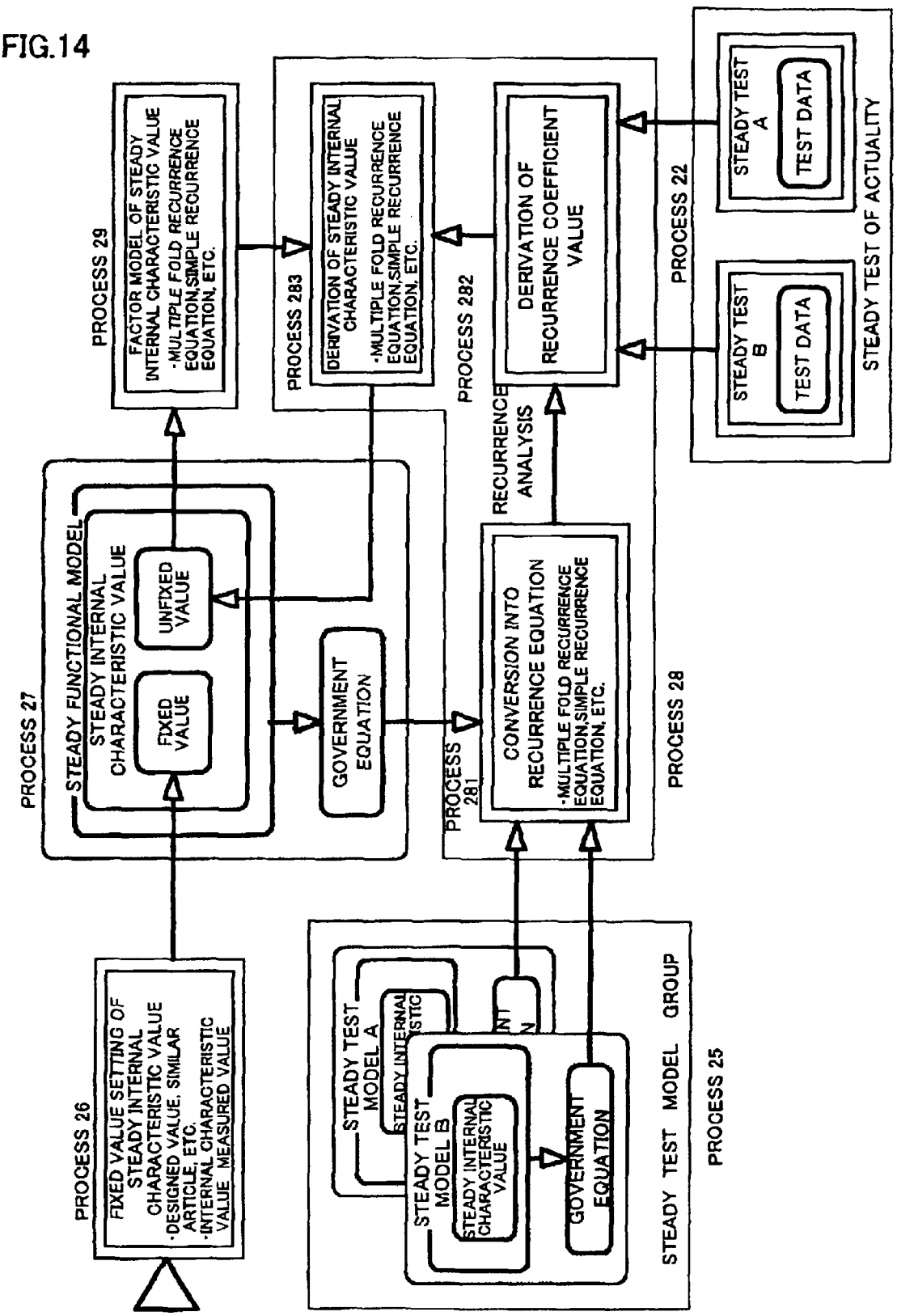
FIG. 14 is a block diagram showing an identification process of a steady functional model from a steady test model group in a characteristic value identification method and an apparatus therefor according to the present invention.

FIG. 14 shows an identification process 2 of the steady internal characteristic value included by the steady functional model having been described referring to FIG. 1. Since the steady internal characteristic value known beforehand from a design value, the characteristic value of a similar article, the measured value of the characteristic, and the like can be determined as a fixed value in the steady identification process (process 26), remaining unfixed values can be identified (process 27).

As for an analysis technique applied to this, the government equation of the steady test model is converted into a statistical model such as a canonical correlation analysis or a multiple fold recurrence analysis (simple recurrence analysis), determines a deviated recurrence coefficient from the steady test data, and derives the steady internal characteristic value from the relationship between the deviated recurrence coefficient and the government equation (process 28). Also, as for the steady characteristic formed by many factors, the factors are analyzed, and divided into factors of which quantification is possible and factors of which quantification is difficult by modeling the forming process of the steady internal characteristic value with a theoretical equation, an experimental equation, and the like, thereby identifying the factors of which quantification is difficult (process 29).

2.1 Test Plan of Steady Identification

In the steady functional model shown in FIG. 8, there are six kinds of the steady internal characteristic values $M_M$, $R_M$, $D_M$, $\delta_M$, $T_{MF}$, and $E_{MB}$ which form the subject of the steady identification. In order to determine these steady internal characteristic values, it is necessary to firstly clarify the function of the steady model in FIG. 8 and the characteristic of the steady internal characteristic values, and to clarify the relationship with the test method.

2.1.1 Verification of Known/measurable Steady Internal Characteristic Value (Process 26)

Firstly, known characteristic values and the characteristic values which can be solely measured are clarified in the steady internal characteristic values included in the steady functional model. Among the characteristic values which govern the steady state of a general product or part, there are a large number of characteristic values which can be clarified without performing the steady test such as a characteristic value clarified in the literature or the like, a characteristic value which can directly utilize the design value, and a characteristic value which can be directly measured. Accordingly, it is important to determine the characteristic values by a preliminary investigation or measurement in case of the steady identification.

Reviewing the motor used here, such characteristic values to be determined are a brush voltage drop $E_{MB}$, an insulation resistance $R_C$ omitted at the time of modeling the steady functional model in FIG. 8, a motor winding resistance $R_M$, and the like. These steady characteristics are given as follows:

① Since being a voltage drop due to a graphite brush, the brush voltage drop $E_{MB}$ assumes constant regardless of the current $I_M$ during the motor rotation, and assumes a minute DC resistance in the stop state. Accordingly, 0.7 [V] shown in the literature is applied during the motor rotation, and the direct current in the stop state can be neglected.

② The insulation resistance $R_C$ assumes the value [MΩ] which does not influence the result.

③ The winding resistance $R_M$ of the motor can be determined by the ohmmeter or by calculating the motor voltage and current in the motor lock state shown in FIG. 11.

2.1.2 Steady Functional Model and Statistical Model (Process 28)

There is a multivariate analysis such as a multiple fold recurrence analysis and a simple recurrence analysis in the analysis technique frequently used for the product development. The recurrence equation of the multiple fold recurrence model applied thereto is given as follows:

$$y = b_0 + b_1 x_1 + b_2 x_2 \ldots b_n x_n + e_{rr} \qquad \text{Eq.(21)}$$

Applying the multiple fold recurrence equation shown in equation (21) to the steady functional model including a plurality of unknown steady internal characteristic values will be examined. As for the method of application, dependent variables and independent variables in the steady government Eq.(8) are made correspond to an objective variable "y" and predictor variables $x_1$–$x_n$, to be determined from the steady test data.

Also, deviated recurrence coefficients $b_0$–$b_n$ are values combining known and unknown steady internal characteristic values. Accordingly, unknown steady internal characteristic values can be derived by relating (associating) the deviated recurrence coefficients to (with) the steady internal characteristic values. In Eq.(21), $e_{rr}$ is a residual. Also, when the multiple fold recurrence equation has a plurality of different objective variables, these are expressed by simultaneous equations so that the canonical correlation analysis is applied. As a matter of course, the test data obtained by a plurality of different test methods, the deviated recurrence coefficient, and the steady internal characteristic value of the recurrence model can be related to each other.

In the multiple fold recurrence analysis of the motor, the steady internal characteristic value can be clarified by the following process from the data of the steady load test shown in FIG. 9:

Firstly, as for the multiple fold recurrence model, the following multiple fold recurrence equations can be derived from the government Eq.(13) of the steady load test model in FIG. 9:

$$T_M = -T_{MF} - D_M \omega_M + M_M I_M \qquad \text{Eq. (22)}$$

$$T_M = -\left(T_{MF} + \frac{D_M E_0 - D_M E_{MB}}{M_M \delta_M}\right) + \left(\frac{R_M D_M}{M_M \delta_M} + M_M\right) I_M \qquad \text{Eq. (23)}$$

It is to be noted that equation (22) corresponds to the 1st row of Eq.(13), and equation (23) corresponds to the 2nd row of Eq.(13). Since the internal resistance $R_B$ of the battery is very small, and the internal electromotive force $E_0$ of the battery and a motor output voltage $V_M$ are considered to be approximately equal, $E_0$ in Eq.(23) is substituted for the dependent variable $V_M$ (motor output voltage) of Eq. (13).

The recurrence equation with the torque $T_M$ of these equations being made an objective variable and the motor current $I_M$ and the angular velocity $\omega_M$ being made predictor variables is given as follows (process 281), where the upper equation of the following equations (24) forms a multiple fold recurrence equation with two predictor variables, and the lower equation forms a simple recurrence equation with a single predictor variable:

$$\left.\begin{array}{l} T_M = B_{10} + B_{11} I_M + B_{12} \omega_M \\ T_M = B_{20} + B_{21} I_M \end{array}\right\} \qquad \text{Eq. (24)}$$

Also, constants (intercepts) $B_{10}$, $B_{20}$, and deviated recurrence coefficients $B_{11}$, $B_{12}$, $B_{21}$ can be expressed by the following equations:

$$\left.\begin{array}{l} B_{10} = -T_{MF} \\ B_{11} = -D_M \\ B_{12} = M_M \\ B_{20} = -D_M E_0 - \dfrac{E_{MB}}{M_M \delta_M} - T_{MF} \\ B_{21} = M_M + \dfrac{R_M D_M}{M_M \delta_M} \end{array}\right\} \qquad \text{Eq. (25)}$$

The steady internal characteristic values derived from the deviated recurrence coefficients shown in equations (25) are given as follows (process 282):

Firstly, $T_{MF}$, $D_M$, $M_M$ correspond to the respective deviated recurrence coefficients from the upper four rows of Eqs. (25).

$$\left.\begin{array}{l} T_{MF} = -B_{10} \\ D_M = -B_{11} \\ M_M = B_{12} \end{array}\right\} \qquad \text{Eq. (26)}$$

Then, $\delta_M$ can be derived by substituting equation (26) for four rows of Eqs. (25) as follows:

$$\delta_M = \frac{B_{11}}{(B_{20} - B_{10}) B_{12}} (E_0 - E_{MB}) \qquad \text{Eq. (27)}$$

It is to be noted that the induced voltage $E_0$ of the battery and the brush voltage drop $E_{MB}$ in equation (27) are assumed to be known steady internal characteristic values.

Moreover, $R_M$ can be derived from the following equation by substituting Eqs. (26) and (27) for five rows of Eqs. (25):

$$R_M = \frac{B_{12} - B_{21}}{B_{20} - B_{10}} (E_0 - E_{MB}) \qquad \text{Eq. (28)}$$

While in the above-mentioned example, all of the steady internal characteristic values have been determined from the government Eq.(8) by the recurrence analysis, in many cases of the actual steady identification, the steady internal characteristic values are derived by combining a plurality of test methods. For example, in the above-mentioned example, as for the 3rd row of Eqs.(26) deriving the motor constant $M_M$ and equation (28) determining the winding resistance $R_M$, both $M_M$ and $R_M$ can be determined from Eq.(17) of the lock test model and the test data as well.

2.1.3 Factor Analysis of Steady Characteristic (Process 29)

The steady internal characteristic value of the steady functional model includes many internal factors forming this characteristic. Accordingly, it is necessary to clarify the factors composing each characteristic value by performing a factor analysis, and to formulate the result. Also, it is necessary to divide the factors into known factors and unknown factors based on the result, and to perform a steady identification for clarifying an influence degree of the unknown or uncertain factors by the model or the test data.

To the steady identification method, a sensitivity analysis or the like is effective by which the relationship between the variance of the government factor and the steady internal characteristic value is taken as a sensitivity. Particularly, in case the steady internal characteristic value has a non-linear characteristic influenced by another state value, the sensitivity analysis is important.

If the motor constant is considered, for example, P, "a", and Z are known values in Eq.(1) since they are design constants determined by the motor structure. However, it is difficult to determine all of the magnetic fluxes $\phi$ per pole since it is distributed in the gap between the field and the armature. Accordingly, to identify the motor constant means to identify the magnetic flux $\phi$ by the test data. All of the magnetic fluxes $\phi$ per pole determined from the identified motor constant $M_M$ are given as follows:

$$\phi = M_M 2\pi \frac{a}{PZ} \times 10^8 \qquad \text{Eq. (29)}$$

Moreover, as a brief example, the winding resistance $R_M$ of the motor is given by the following equation determined by a line length "l", a sectional area "S", a specific resistance "$\rho$", and a temperature coefficient a "$\alpha$", being governed by a temperature "t":

$$R_M = \rho \frac{l}{S}(1 + \alpha t) \qquad \text{Eq. (30)}$$

From equation (30), l, S, $\rho$, and $\alpha$ assume the design values determined by the structure and the stuff, while the temperature "t" is governed by the temperature of the test environment and the temperature rise by self-heating of the motor. Accordingly in the test for performing the identification, the temperature of the motor forms an important factor which governs the characteristic value. Also, upon the examination of the high temperature environment and low temperature environment, it is required to perform a temperature correction, by Eq.(30), to $R_M$ in the government Eq.(3) and the steady government equations of equation (8) and subsequent equations.

2.1.4 Motor Steady Characteristic

The steady internal characteristic value of the motor is represented by a torque-current characteristic representing the relationship between the output torque $T_M$ [Nm] and the motor current $I_M$ [A], and by a torque-velocity characteristic representing the relationship with the angular velocity $\omega_M$ [rad/sec], based on the result measured in the above-mentioned steady load test (FIG. 9). Firstly, the torque-velocity characteristic can be expressed by the following equation obtained by substituting the motor current $I_M$ of Eqs.(22) and (23), the latter itself representing the torque-current characteristic:

$$T_M = \left(\frac{M_M}{R_M D_M}(E_0 - E_{MB}) - T_{MF}\right) - \left(D_M + \frac{M_M^2 \delta_M}{R_M}\right)\omega_M \quad \text{Eq. (31)}$$

If the torque-current characteristic and the torque-velocity characteristic of the motor are available from a catalog, technical materials, or the like, the steady internal characteristic value may be determined from the characteristic diagram. This motor characteristic is shown in FIG. 15.

Figure 15:
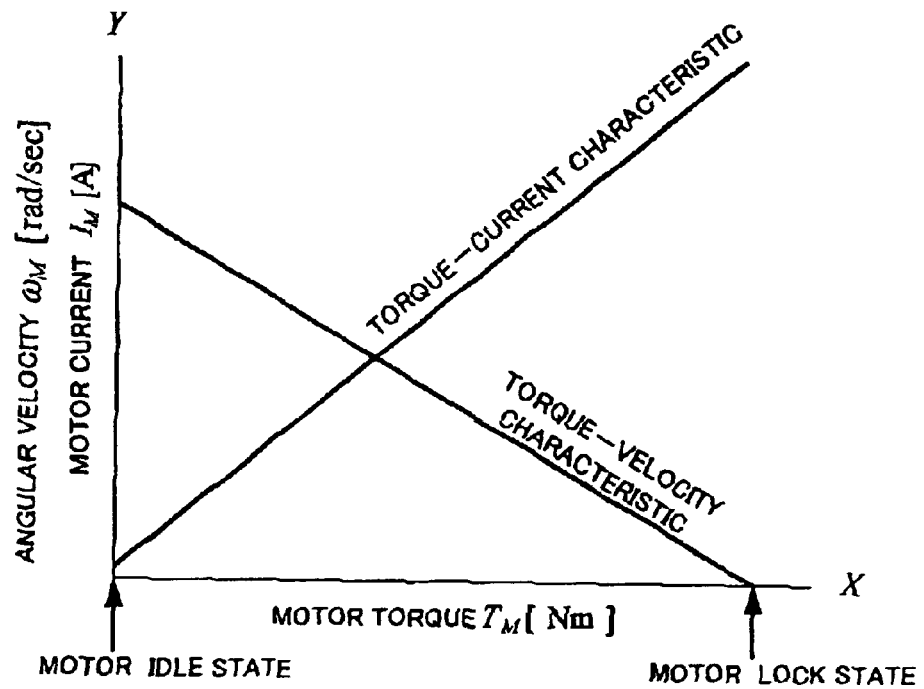
FIG. 15 is a graph showing a motor characteristic of a steady state.

The relationship between the two recurrence lines in FIG. 15 is expressed by Eq.(22). In FIG. 15, the intersection of X axis and the torque-angular velocity characteristic shows the motor lock state, and the intersection of Y axis and the torque-angular velocity characteristic shows the idle state. Accordingly, as for the motor constant $M_M$ and the winding resistance $R_M$, their approximate values can be determined by substituting the motor current $I_M$, the torque $T_M$, and the voltage $V_M$ in the lock state for Eq.(17). Also, by substituting the result for Eq.(22), an approximate value of the viscous resistance coefficient $\delta_M$ at the time of idling can be determined, whereas the friction torque $T_{MF}$ is neglected.

2.2 Motor Steady Test and Steady Identification Result

The characteristic value in the steady state is identified from the motor functional model shown in FIG. 4(1). It is to be noted that the motor used in this identification is a small DC motor of a separately excited type widely used for an electric actuator of a car, and a permanent magnet is used for the field.

The steady test for the steady identification has been performed to the idle test, the lock test, and the steady load test. The idle test and the lock test have been performed as a test under the specified conditions of the motor. The former has been performed with the output axis of the motor being released in the state of the input torque $T_M=0$, and the latter has been performed with the output axis being fixed in the state of the output angular velocity $\omega_M=0$.

Moreover, in the steady load test, a string hung with a weight has been winded onto a drum attached to the motor output axis, whereby the load torque has been calculated from the mass of the weight and the radius of the drum. Also, the test conditions are shown in the following Table 3 together with the result of the steady identification.

Figure 16:
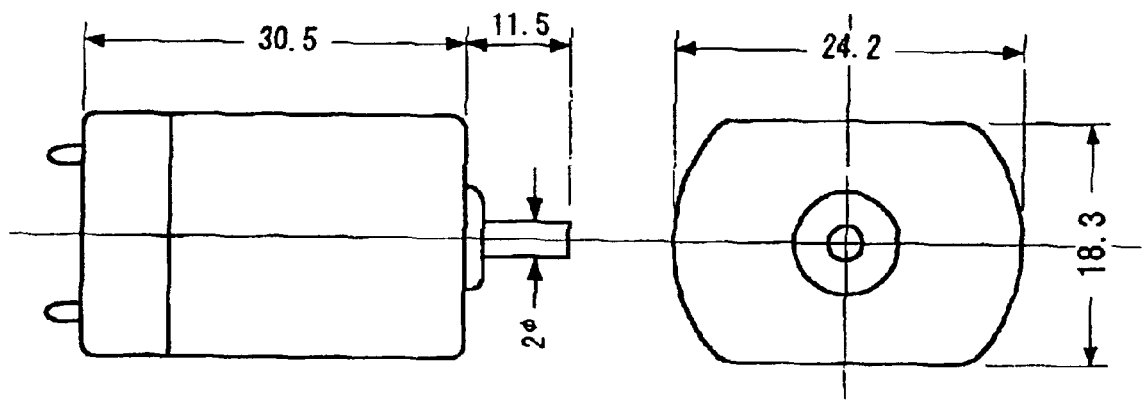
FIG. 16 is a diagram showing an external shape of a motor.
Figure 17:
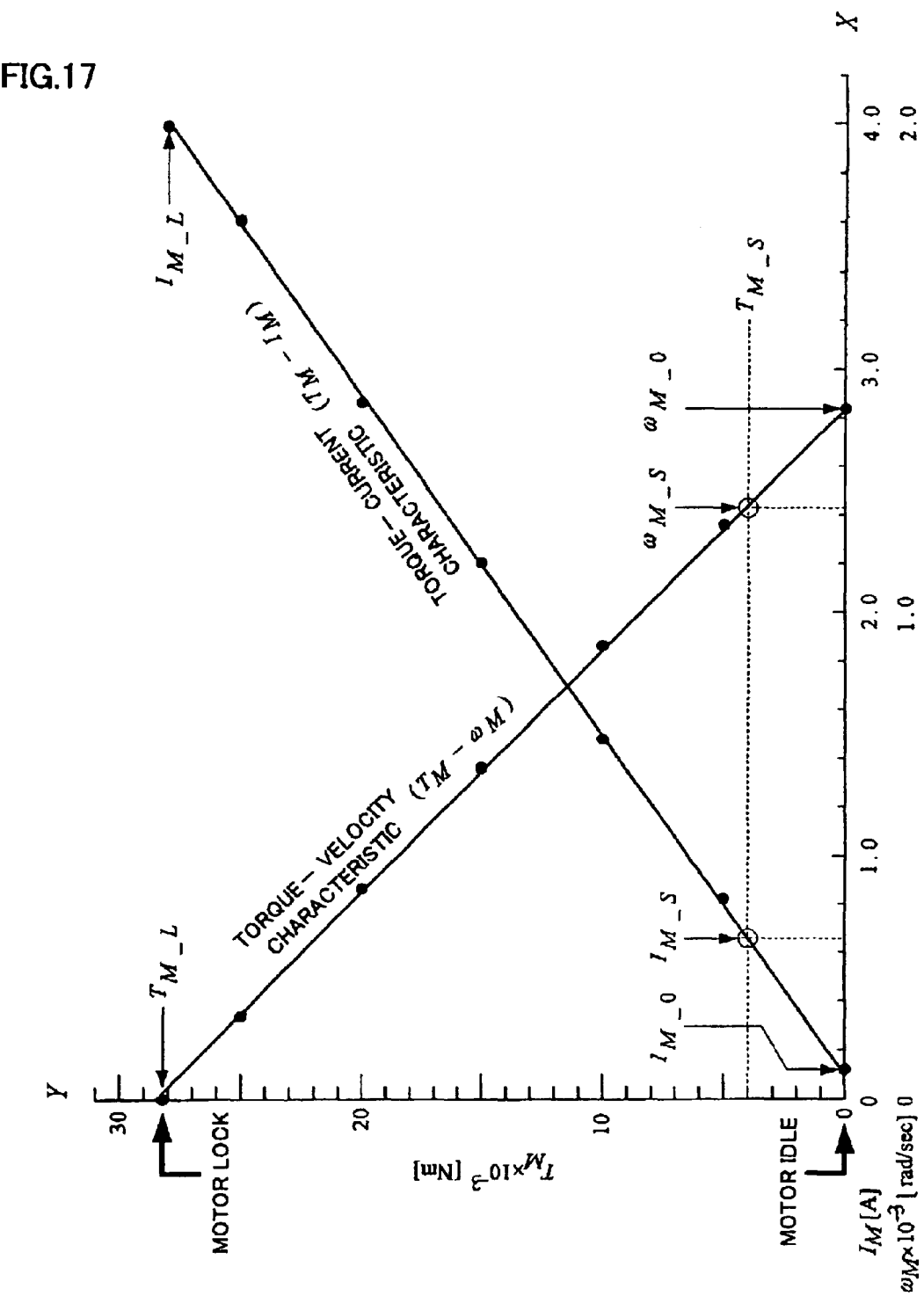
FIG. 17 is a graph showing a steady internal characteristic value of a motor with an ordinate and an abscissa in FIG. 15 being exchanged.

FIG. 17 shows a result of the steady test performed to the motor of FIG. 16 and the recurrence equations, where X and Y axes of FIG. 15 are exchanged.

FIG. 17 is a diagram showing the measured values of the torque-current characteristic representing the relationship between the output torque $T_M$ [Nm] in the steady state and the motor current $I_M$ [A], and representing the relationship with the angular velocity $\omega_M$ [rad/sec], and its recurrence equation. The characteristic value on the X axis represents the motor idle state ($T_M=0$) as mentioned above, and the intersection between the torque-velocity characteristic and the Y axis shows the lock state or the starting moment of the motor with the angular velocity $\omega_M=0$. The points shown by variable names in FIG. 17 show a basic characteristic and a rating characteristic (dotted line) in Table 1. Also, the black circle in FIG. 17 shows the measured values.

Moreover, the basic performance at the time of starting and idling obtained in FIG. 17 is shown in Table 1, and a catalog specification published by a motor maker is shown in Table 2 as reference data.

TABLE 1

| CHARACTERISTIC NAME | | SYMBOL | UNIT | CHARACTERISTIC VALUE |
|---|---|---|---|---|
| MOTOR | IDLE CURRENT | $I_{M-O}$ | [A] | 0.1 |
| | IDLE ANGULAR VELOCITY | $\omega_{M-O}$ | [rad/sec] | 1410.0 |
| | STARTING TORQUE | $T_{M-L}$ | [Nm] | $28.0 \times 10^{-3}$ |
| | STARTING CURRENT | $I_{M-L}$ | [A] | 4.0 |
| TEST POWER SUPPLY | INTERNAL ELECTROMOTIVE FORCE | $E_B$ | [V] | 12.0 |
| | POWER SUPPLY INTERNAL RESISTANCE | $R_B$ | [A] | $1.0 \times 10^{-3}$ |

TABLE 2

| CHARACTERISTIC NAME | SYMBOL | UNIT | CHARACTERISTIC VALUE | CONDITION |
|---|---|---|---|---|
| RATED CURRENT | $I_{M-S}$ | [A] | 0.57 | MAX 0.9 |
| RATED ANGULAR VELOCITY | $\omega_{M-S}$ | [rad/sec] | 1210.0 | TOLERANCE ± 160.0 |
| RATED LOAD | $T_{M-S}$ | [Nm] | $4.0 \times 10^{-3}$ | |
| RATED VOLTAGE | $V_M$ | [V] | 12.0 | |

Table 3 shows a result of the steady identification by the test data of FIG. 17.

TABLE 3

| CHARACTERISTIC NAME | | SYMBOL | UNIT | CHARACTERISTIC VALUE |
|---|---|---|---|---|
| MOTOR STATE CHARACTERISTIC | VISCOUS RESISTANCE COEFFICIENT | $D_M$ | [Nm/(rad/sec)] | $0.65 \times 10^{-6}$ |
| | KINETIC FRICTION TORQUE | $T_{MP}$ | [Nm] | $0.1 \times 10^{-6}$ |

TABLE 3-continued

| | CHARACTERISTIC NAME | SYMBOL | UNIT | CHARACTERISTIC VALUE |
|---|---|---|---|---|
| | WINDING RESISTANCE | $R_M$ | [Ω] | 3.0 |
| | BRUSH VOLTAGE | $E_{BR}$ | [V] | 0.7 |
| | INSULATION RESISTANCE | $R_C$ | [MΩ] | 10.0 |
| | MOTOR CONSTANT | $M_M$ | [Nm/A] | $7.25 \times 10^{-3}$ |
| | VELOCITY COEFFICIENT CORRECTION | $\delta_M$ | | 1.0 |
| TEST CONDITION | TEST VOLTAGE | $E_O$ | [V] | 12.0 |
| (KNOWN) | INTERNAL RESISTANCE | $R_B$ | [Ω] | $50.0 \times 10^{-3}$ |
| | AMBIENT TEMPERATURE | $t_F$ | [deg] | 25.0 |

Table 3 is a result assembled according to the process of the steady identification examined so far. Among the identified steady internal characteristic values, $E_{BR}$ has been assumed to be a prescribed value determined from the literature. Also, $R_C$ is a measurement result of the insulation testing set. The other steady internal characteristic values $M_M, R_M, D_M, \delta_M$, and $T_{MF}$ are determined from the multiple fold recurrence analysis and the simple recurrence analysis by the above-mentioned Eqs.(24)–(27). Also, since the internal resistance $R_B$ of the battery is so small that the resistance value of the current measurement distributary unit has been applied to the internal resistance $R_B$ of the battery.

It is to be noted that in order to determine five coefficients $B_{10}, B_{20}, B_{11}, B_{12}$, and $B_{21}$, five simultaneous equations are required. $T_M, I_M$, and $\omega_M$ are vectors where equal to or more than five values determined by the characteristic of FIG. 17 exist.

Figure 18:
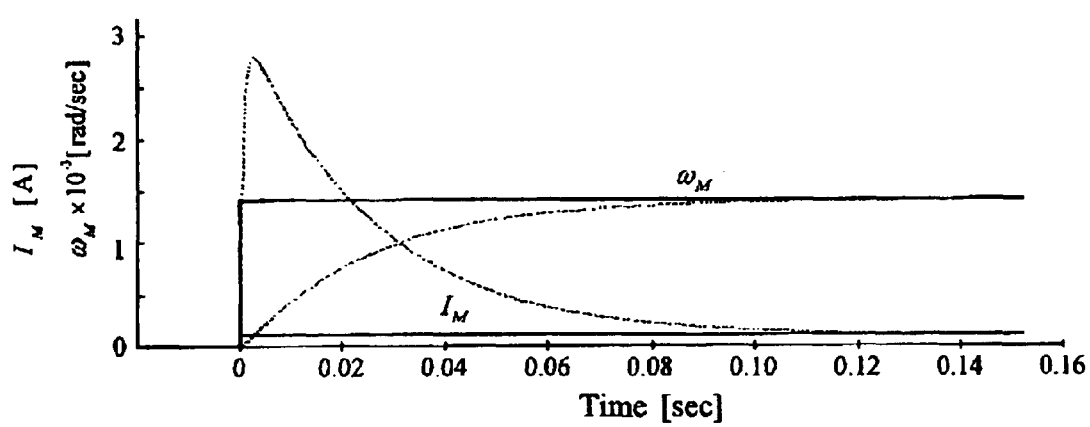
FIG. 18 is a graph showing a steady internal characteristic value of a motor.

FIG. 18 shows a simulation result of the thus identified steady internal characteristic values by using the steady government equation obtained by substituting Eq.(4) of the battery model for Eq.(8) of the motor steady state.

Thick solid lines in FIG. 18 show results of the steady state of the angular velocity $\omega_M$ and the motor current $I_M$, while thin dotted lines show simulation results performed in Eq.(5) by using the transient internal characteristic value before identification described later. It is seen from FIG. 18 that the results of the steady state coincides with each other in the steady region where the transient state becomes stable.

3. Identification of Transient State (Process 32)

Figure 19:
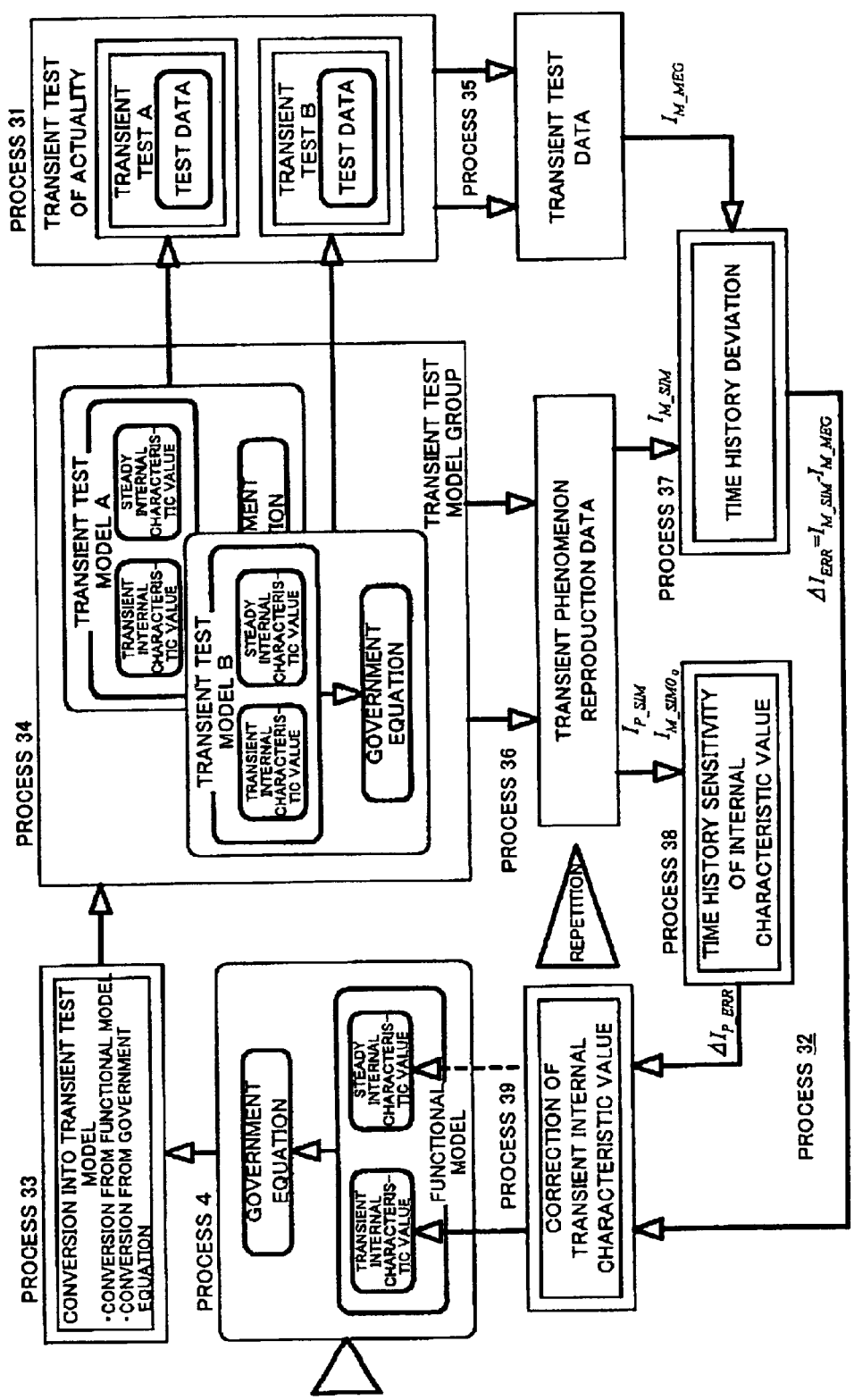
FIG. 19 is a block diagram showing a transient identification process of a functional model in a characteristic value identification method and an apparatus therefor according to the present invention.

Since the steady internal characteristic values of the motor shown in the above-mentioned Table 3 are clarified, the moment of inertia $J_M$ and the inductance $L_M$ as transient internal characteristic values governing the transient function of the motor are identified next with the measured value of the motor current $I_M$, by the transient identification process 32 shown in FIG. 19.

As an identification method, approximate values are firstly provided to the transient internal characteristic values to perform a simulation so that initial values are determined (process 36), then the time history sensitivities of the transient internal characteristic values for the motor current $I_M$ are determined (process 38), and the deviation (process 37) between the measured value (process 35) of the motor current $I_M$ and the simulation value assumes the least for the sensitivity indexed.

Moreover, the viscous resistance coefficient $\delta_M$ and the kinetic friction torque $F_{MF}$ already identified are again identified in the transient identification for the confirmation. As for the identification, the assembly/disassembly and the replacement by a block replacement method can be performed to the model of the operation system and the load connected to the motor source supply system and the rotation system.

3.1 Conversion from Functional Model into Transient Test Model (Process 33)

The test model in the transient state reproduces an actuality test providing a specified condition to the input/output system of the tested object in the same way as the steady identification by the functional model and its government equation. In the transient identification, the test data obtained by providing the specified condition to the tested object, and the simulation result by the test model are related, so that the characteristic value group included in the government equation is identified. Also, the test model of the transient identification models the drive or the load to be incorporated by the following method:

① Input/output model for driving

The input/output model for driving is a model for supplying driving energy such as a power supply and a torque in order to drive the tested object. This model occasionally has an operation system or a control system for operating the supplying method of the driving energy. For example, the system connected to the electric system of the motor corresponds to such a system including a battery of a power supply, an operation switch of a motor, a control unit, and the like. As a specific example, there is a braking resistance of the regenerative braking mentioned above, or the like.

② Input/output model for load

The input/output model for the load is a model for accumulating or consuming the energy such as a characteristic which forms the load of the tested object and an actual load. This model occasionally has the operation system or the control system for operating how to provide the load energy. In the rotation system or the mechanical system of the motor, there is a method for connecting a stiffness (spring stiffness), the moment of inertia, the viscous resistance coefficient, and the like.

It is to be noted that in case the characteristic whose value is large is connected, it can be considered that the output axis is fixed. Also, as an expediency for providing the fixed load, there is a method by which the current, the torque, and the like are provided as an additional load, and the voltage and the angular velocity which become a pair are made an observation quantity. For operating a machine load, the load is switched over by simultaneously using models of a clutch, a brake, and the like.

3.1.1 Actual Load Transient Test Model of Motor (Process 34)

In the transient test model which reproduces the state of the practical use, the battery model in FIG. 6 is united with the electric system of the motor model in FIG. 4(1), and an actual load model or an equivalent load model is further united with the rotation system to be converted into a model for an execution closed from the outside.

(1) Actual Load Model of Electrically Driven Arm Mechanism

Figure 20:
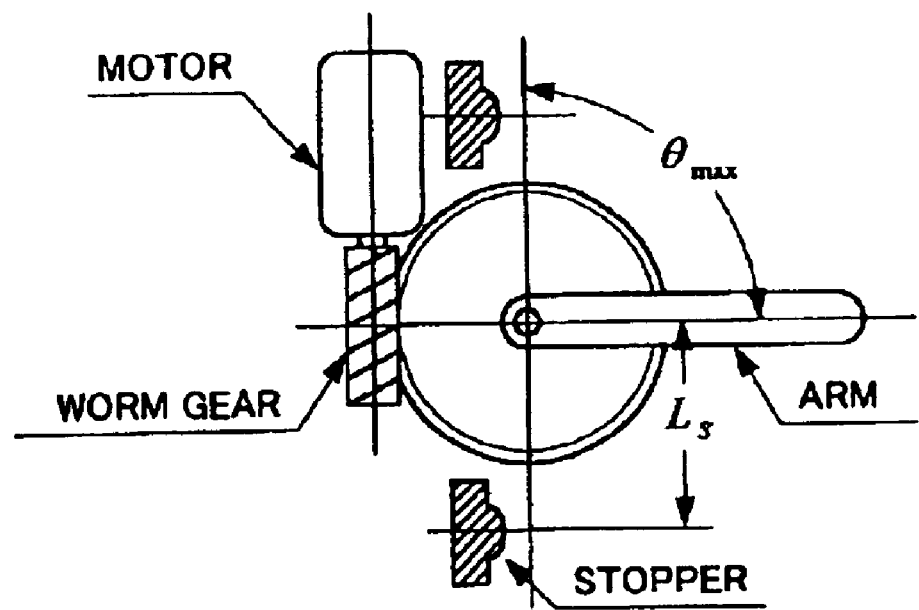
FIG. 20 is a diagram showing a structure of an electrically driven arm mechanism.

FIG. 20 shows a load model of an electrically driven arm mechanism having an operation arm whose operation range is restricted by $\theta_{max}$ at a rack side of a worm gear, as an example of a practical load.

Figure 21:
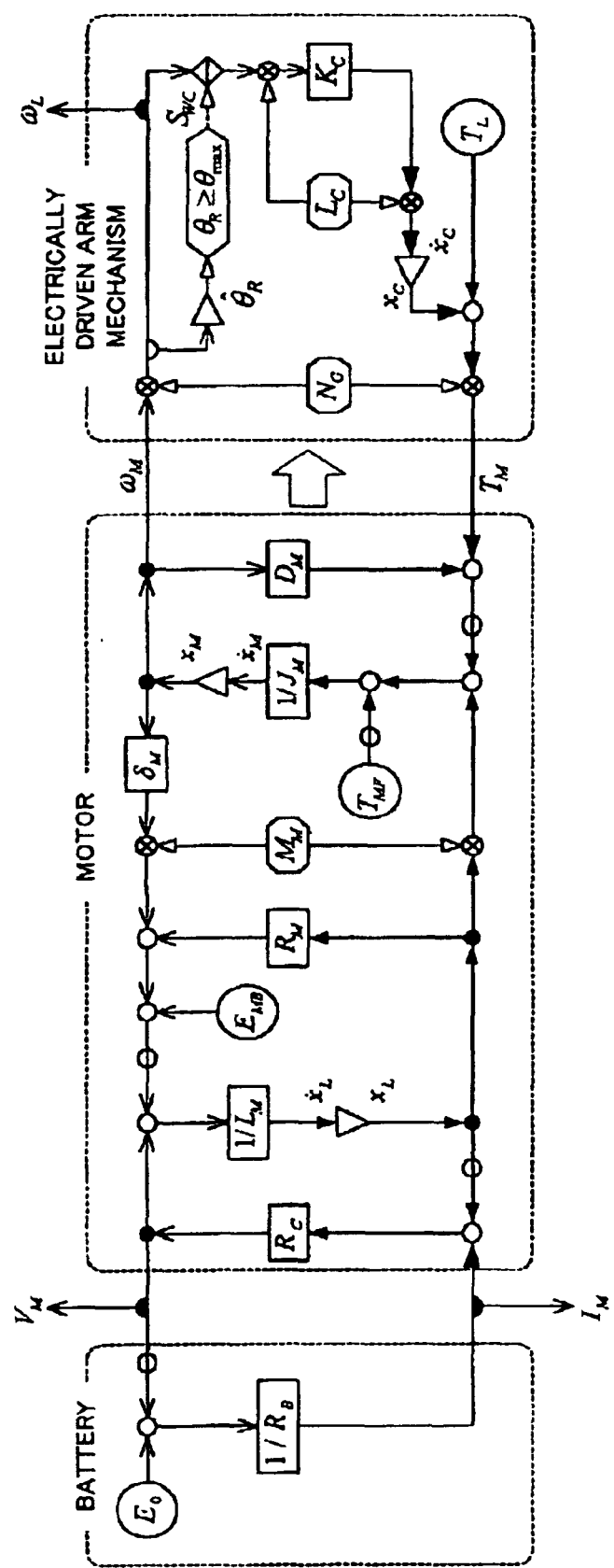
FIG. 21 is a diagram showing a model at the time of an actual load transient test of a motor.

FIG. 21 shows a functional model for an execution in which the electrically driven arm mechanism in FIG. 20 is incorporated in the battery and the motor model. The electrically driven arm mechanism in FIG. 21 has a stiffness $K_C$ of a stopper, a reduction ratio $N_G$ of a reduction unit, and a contact radius $L_C$ of the stopper. Inside the electrically driven arm mechanism, there are a presumed rotation angle $\hat{\theta}_R$ of the arm and an internal state $x_C$.

Also, the condition judgment shown by a hexagon frame in FIG. 21 is a model which judges an arm operation range, and operates a switch variable $S_{WC}$. This functional model has an additional load of torque $T_L$ as an external load.

The government equations of the electrically driven arm mechanism are given as follows:

$$\begin{bmatrix} 0 \\ T_M \\ \omega_L \end{bmatrix} = \begin{bmatrix} -\frac{1}{K_C L_C^2 S_{WC}} & 0 & N_G & 0 \\ 0 & -N_G & 0 & -N_G T_L \\ 0 & 0 & N_G & 0 \end{bmatrix} \begin{bmatrix} \dot{x}_C \\ x_C \\ \omega_M \\ 1 \end{bmatrix} \quad \text{Eq. (32)}$$

$$\hat{\theta}_L = N_G \int\int \dot{x}_M dt$$

In this government equations (32), the upper equation indicates the government equation of the electrically driven arm mechanism shown on the right side of FIG. 21, and the lower equation indicates the presumed rotation angle $\hat{\theta}_L$ of the arm. Also, the model determining the rotation range of the arm is given as follows:

$$\text{if}(\hat{\theta}_R \geq \theta_{max}) \text{ then } (S_{WC}=1) \text{ else } (S_{WC}=0) \quad \text{Eq.(33)}$$

Equation (33) is for a condition judgment $S_{WS}$ in which $S_{WC}=0$ when the presumed rotation angle $\hat{\theta}_R$ of the arm lies within the rotation range $\theta_{max}$, and otherwise $S_{WC}=1$.

If the above-mentioned Eq.(5) where the battery and motor are integrated, and the government Eq.(32) of the electrically driven arm mechanism are integrated, the following equation can be obtained:

$$\begin{bmatrix} 0 \\ 0 \\ 0 \\ \omega_L \\ \omega_M \\ V_P \\ I_M \\ T_M \end{bmatrix} = \begin{bmatrix} -J_M & 0 & 0 & -D_M & M_M & -N_G & -T_{MF}-N_G T_L \\ 0 & -L_M & 0 & -\delta_M M_M & -R_M - R_C R_B Y_0 & 0 & R_C I_0 - E_{MB} \\ 0 & 0 & -\frac{1}{K_C L_C^2 S_{WC}} & N_G & 0 & 0 & 0 \\ 0 & 0 & 0 & N_G & 0 & 0 & 0 \\ 0 & 0 & 0 & 1 & 0 & 0 & 0 \\ 0 & 0 & 0 & 0 & -R_C R_B Y_0 & 0 & R_C I_0 \\ 0 & 0 & 0 & 0 & R_C Y_0 & 0 & I_0 \\ 0 & 0 & 0 & 0 & 0 & N_G & N_G T_L \end{bmatrix} \begin{bmatrix} \dot{x}_M \\ \dot{x}_L \\ \dot{x}_C \\ x_M \\ x_L \\ x_C \\ 1 \end{bmatrix} \quad \text{Eq. (34)}$$

In equation (34), the 1st–3rd rows form the state equations, and the 4th and the following rows form output equations for observing the internal transient state value. It is to be noted that $Y_0$ and $I_0$ in the equations are an equivalent admittance and a current source respectively shown in equations (6) and (7).

(2) Axis Fixed Model of Motor

Figure 22:
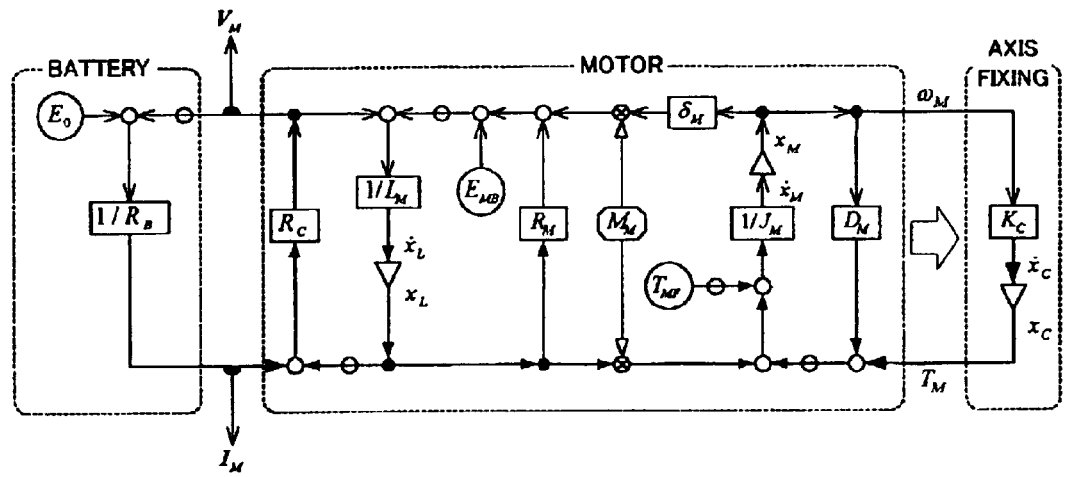
FIG. 22 is a diagram showing a transient test model at the time when a motor axis is fixed.

The model in which the output axis of the motor is fixed can be shown by next FIG. 22. This model can be replaced with the arm mechanism on the right side of the motor actual load transient test model in FIG. 21.

FIG. 22 is a model in which the model of the electrically driven arm mechanism in the actual load transient test model of FIG. 21 is replaced with stiffness $K_C$ which fixes the motor output axis. The motor torque $T_{MF}$ in FIG. 22 reproduces the lock torque in the state where the output axis of the motor is fixed. It is to be noted that the government equation is omitted in this case.

3.1.1.1 Fixed Torque Transient Test Model of Motor

There is a fixed torque test for providing a fixed torque as a load in the load test performed in the actual machine test. This test model unites the battery model in FIG. 6 with the motor model in FIG. 4(1) to be converted into the model for execution closed from the outside. The converted functional model for the execution is shown in FIG. 23.

Figure 23:
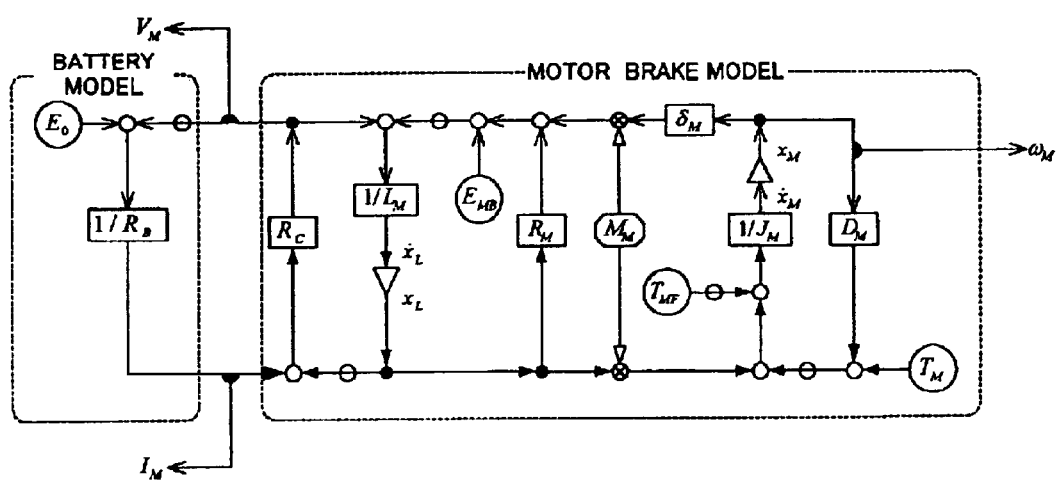
FIG. 23 is a diagram showing a fixed torque transient test model of a motor.

In FIG. 23, by uniting the battery and the motor, the motor voltage $V_M$ and the current $I_M$ form the observation quantities. Moreover, since the input torque $T_M$ of the motor becomes the load torque generated inside the model, the input torque $T_M$ becomes the additional load $T_M$, and the output angular velocity $\omega_M$ becomes the observation quantity. It is to be noted that in the idle test of the motor, the additional load $T_M$ can be made 0.

The government equation for execution of the function model therefor shown in FIG. 23 is given as follows:

$$\begin{bmatrix} \dot{x}_M \\ \dot{x}_L \\ \omega_M \\ V_M \\ I_M \end{bmatrix} = \begin{bmatrix} -\frac{D_M}{J_M} & \frac{M_M}{J_M} & -\frac{T_M + T_{MF}}{J_M} \\ -\frac{\delta_M M_M}{L_M} & -\frac{R_M + R_C R_B Y_0}{L_M} & \frac{R_C I_0 - E_{MB}}{L_M} \\ 1 & 0 & 0 \\ 0 & -R_C R_B Y_0 & R_C I_0 \\ 0 & R_C Y_0 S_{WA} & I_0 \end{bmatrix} * \begin{bmatrix} x_M \\ x_L \\ 1 \end{bmatrix} \quad \text{Eq. (35)}$$

In equation (35), the 1st–2nd rows form the state equations, and the 3rd–5th rows form the output equations. It is to be noted that the equivalent admittance $Y_0$ and the current source $I_0$ are given by the above-mentioned Eqs.(6) and (7).

Moreover, the process by which Eq.(35) is derived from the above-mentioned Eq.(5) is as follows:

Firstly, the 1st and 2nd columns including the moment of inertia $J_M$ and the inductance $L_M$ are eliminated, and the dependent variables at the 1st and the 2nd rows are made $\dot{\chi}_M$ and $\dot{\chi}_L$. Then, the input torque $T_M$ of the independent variable in Eq.(5) can be substituted for the additional load at the 1st row the 3rd column in Eq.(5).

3.1.1.2 Inertia Rotation Test Model of Motor

With the motor, the motor voltage $V_M$, the current $I_M$, the angular velocity $\omega_M$ of the rotation system, and the torque $T_M$ can be measured. Among them, the electric system particularly has a characteristic that data with high accuracy are easily measured. However in the functional model shown in FIG. 23, the motor voltage $V_M$ nearly equals the electromotive force $E_o$ of the battery, so that it can not be used as the data for identification.

However, as for the induced voltage $V_M$ generated when the motor power supply is turned off, the test data for identification can be measured by the inertial rotation test. The model of this inertial rotation test is shown in FIG. 24.

Figure 24:
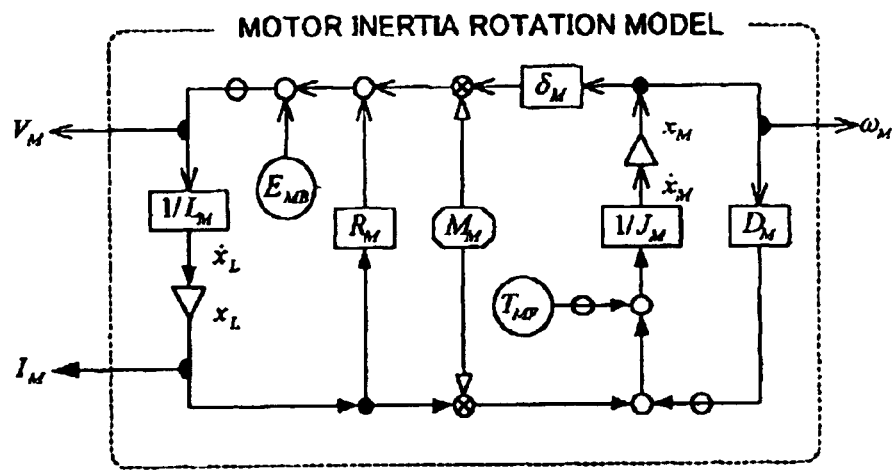
FIG. 24 is a diagram showing a model at the time of an inertial rotation test of a motor.

FIG. 24 shows a model of the inertial rotation test from the moment when the power supply of the motor in the idle state is turned off until the motor is stopped. It is to be noted that the insulation resistance $R_C$ is omitted because the current is minute. The motor model of the inertial rotation test shown in FIG. 24 is given as follows:

$$\begin{bmatrix} \dot{x}_M \\ \dot{x}_L \\ \omega_M \\ V_M \\ I_M \end{bmatrix} = \begin{bmatrix} -\frac{D_M}{J_M} & \frac{M_M}{J_M} & -\frac{T_{MF}}{J_M} \\ -\frac{\delta_M M_M}{L_M} & -\frac{R_M}{L_M} & -\frac{E_{MB}}{L_M} \\ 1 & 0 & 0 \\ 1 & 0 & 0 \\ -\delta_M M_M & -R_M & -E_{MB} \\ 0 & 1 & 0 \end{bmatrix} * \begin{bmatrix} x_M \\ x_L \\ 1 \end{bmatrix} \quad \text{Eq. (36)}$$

In equation (36), the 1st–2nd rows form the state equations, and the 3rd–5th rows form the output equations. It is to be noted that the transient test model of FIG. 23 is used for the example of the transient internal characteristic value identification performed here, instead of the inertial rotation test model.

Figure 25:
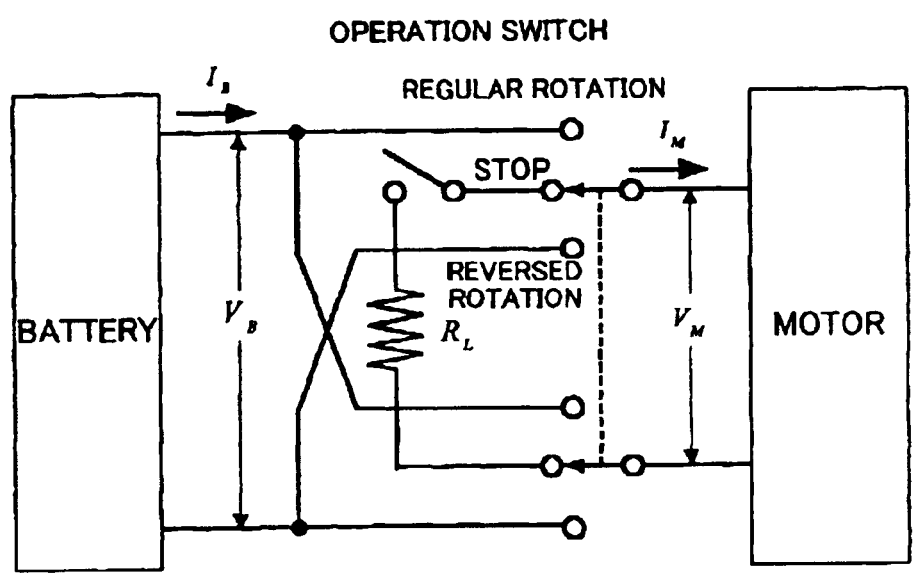
FIG. 25 is a diagram showing a motor operation switch circuit.

3.1.1.3 Actual Load Transient Test Model of Motor having Operation System (1) Operation Switch The start, the stop, the regular rotation, the reversed rotation of the motor, and the basic operation of the electric brake can be performed by a switch circuit shown in FIG. 25. The test model in which the modeled switch circuit is incorporated into the actual load transient test model of FIG. 21 will now be examined.

The motor operation model can be incorporated between the voltage $V_M$ and the current $I_M$ which connect the battery and the motor in the motor actual load transient test model shown in FIG. 21. By incorporating the operation switch, the actual load transient test model in FIG. 21 can reproduce the start, the stop, the regular rotation, the reversed rotation of the motor, and the drive state of the electric brake by the switch operation. It is to be noted that the simulation results of the model will be described after the identification of the transient state.

FIG. 25 is a circuit diagram of the operation switch incorporated between the battery and the motor. The functional model of the switch circuit is shown in the next FIG. 26.

Figure 26:
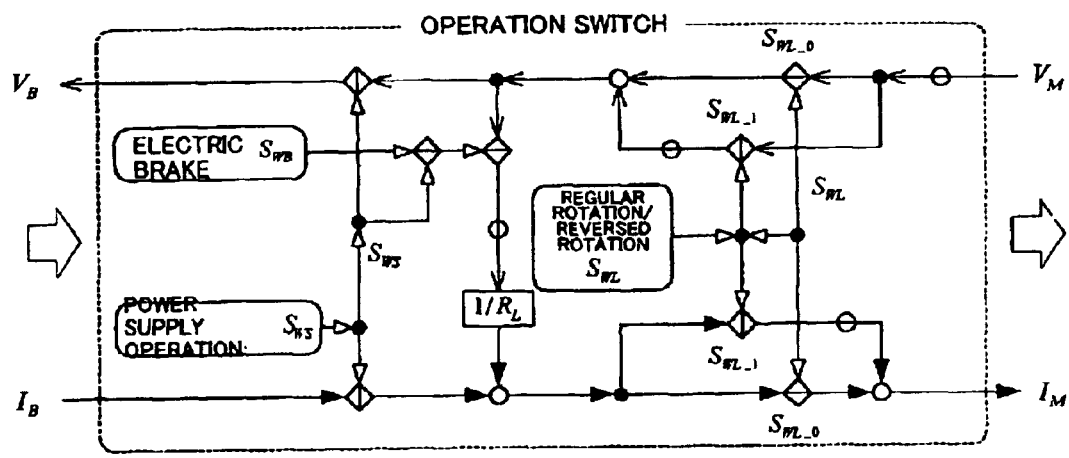
FIG. 26 is a diagram showing a functional model of a motor operation switch.

The resistance $R_L$ in FIG. 26 is the braking resistance for the electric brake. Moreover, neither the contact resistance nor the insulation resistance of the switch are considered.

The operation switch in FIG. 26 is composed of $S_{WS}$ for starting and stopping the motor, $S_{WL}$ for operating the regular/reversed rotation, and $S_{WB}$ for selecting necessity/unnecessity of the electric brake. As for an operation signal for operating the switches, ON/OFF of the switches are respectively represented by "1" and "0". The functions of the switches are as follows:

① The switch $S_{WS}$ supplies the power to the motor when $S_{WS}$=1, and stops the power supply when $S_{WS}$=0.

② As for $S_{WL}$ which controls the regular/reversed rotation, a switchover switch variable $S_{WL\_0}$ assumes "1" when $S_{WL}$=0, so that the current $I_M$ of the electric circuit in FIG. 23 flows in the direction of the arrow to rotate the motor regularly. An $S_{WL\_1}$ assumes "1" when $S_{WL}$=1, so that the current flows reversely to rotate the motor reversely. Also, $S_{WL\_0}$ and $S_{WL\_1}$ are the switchover switch variables prohibiting that both of $S_{WL\_0}$ and $S_{WL\_1}$ simultaneously assume the state of "1" or "2". On the functional model, this operation makes $S_{WL}$ on the current side switch over the polarity of the output current $I_S$, so that $S_{WL}$ on the voltage side restores the input voltage $V_S$ which has come back to the original polarity.

③ As for the braking by the electric brake, the electric brake is made ON when $S_{WB}$=1 and OFF when $S_{WB}$=0 under the condition of the power supply being made OFF, i.e. $S_{WS}$=0. The electric brake consumes the induced current caused by the motor idling when the power supply is made OFF by the braking resistance $R_L$ to generate the braking torque. This braking torque is determined by the braking resistance $R_L$, so that the maximum braking torque is generated when the resistance value is 0 [$\Omega$].

The government equation determined from FIG. 26 is given as follows:

$$\begin{bmatrix} I_M \\ V_B \end{bmatrix} = \begin{bmatrix} \frac{1}{R_L} S_{WB}(1 - S_{WS}) & S_{WE} \\ -S_{WE} & 0 \end{bmatrix} \begin{bmatrix} V_M \\ I_B \end{bmatrix} \quad \text{Eq. (37)}$$

$S_{WE}$ of equation (37) is a power supply switch variable for switching over the motor start/stop, and regular/reverse direction of the current flow, which is expressed by the following equation:

$$S_{WE} = S_{WS}(S_{WL\_0} - S_{WL\_1}) \quad \text{Eq.(38)}$$

The government equation of the power supply system obtained by mutually substituting the voltage $V_B$ and the current $I_B$ of the government equations of the battery and the operation switch in Eqs.(4) and (37) to be integrated is given as follows:

$$[I_M] = \begin{bmatrix} \frac{1}{R_B} S_{WA} & \frac{E_0}{R_B} S_{WE} \end{bmatrix} \begin{bmatrix} V_M \\ 1 \end{bmatrix} \quad \text{Eq. (39)}$$

$S_{WA}$ in equation (39) is assumed to be a braking switch variable by which ON/OFF of the power supply and a necessity/unnecessity of the electric brake are selected, and is expressed by the following equation:

$$\left. \begin{array}{c} S_{WA} = S_{WE}^2 + \dfrac{R_B}{R_L} S_{WB}(1 - S_{WS}) \\ OR \\ S_{WA} = S_{WS} + \dfrac{R_B}{R_L} S_{WB}(1 - S_{WS}) \end{array} \right\} \quad \text{Eq. (40)}$$

In equation (40), as for $S_{WE}^2$ in the upper equation, the switchover switch variable member of the regular/reversed rotation assumes $(S_{WL\_0} - S_{WL\_1})^2 = 1$, and $S_{WS}^2$ assumes either "0" or "1" from equation (38). Therefore, the upper equation can be expressed by the lower equation arranged by $S_{WE}^2 = S_{WS}$.

Finally, the government equation obtained by mutually substituting the motor model of the actual load transient test model in Eq.(32) and the voltage $V_M$ and the current $I_M$ of and the power supply system in Eq.(39) to be integrated is expressed by the following equation:

$$\begin{bmatrix} 0 \\ 0 \\ 0 \\ \omega_L \\ \omega_M \\ V_P \\ I_S \\ T_S \end{bmatrix} = \begin{bmatrix} -J_M & 0 & 0 & -D_M & M_M & -N_G & -T_{MF}-N_G T_L \\ 0 & -L_M & 0 & -\delta_M M_M & -(R_M+R_C R_B Y_0) & 0 & R_C I_0 - E_{MB} \\ 0 & 0 & -\dfrac{1}{K_C L_C^2 S_{WC}} & N_G & 0 & 0 & 0 \\ 0 & 0 & 0 & N_G & 0 & 0 & 0 \\ 0 & 0 & 0 & 1 & 0 & 0 & 0 \\ 0 & 0 & 0 & 0 & -R_C R_B Y_0 & 0 & R_C I_0 \\ 0 & 0 & 0 & 0 & R_C Y_0 S_{WA} & 0 & 0 \\ 0 & 0 & 0 & 0 & 0 & N_G & N_G T_L \end{bmatrix} * \begin{bmatrix} \dot{x}_M \\ \dot{x}_L \\ \dot{x}_C \\ x_M \\ x_L \\ x_C \\ 1 \end{bmatrix} \quad \text{Eq. (41)}$$

In equation (41), the 1st–3rd rows form the state equations, and the 4th and after rows form the output equations. The abstracted equivalent admittance $Y_0$ and the current source $I_0$ in Eq.(41) are expressed by the following equations:

$$Y_0 = \frac{1}{R_B + R_C S_{WA}} \quad \text{Eq. (42)}$$

$$I_0 = Y_0 E_0 S_{WE} \quad \text{Eq. (43)}$$

As an applied example of operating the motor by the electronic circuit incorporated into a control unit or the like, it is possible to incorporate the electronic circuit into the actual load transient test model in FIG. 21 in the same way as the operation switch circuit of the motor in FIG. 25.

Also, it is possible to replace the operation system of the motor including the above-mentioned switch mechanism by the block replacement method. It is to be noted that while there is another method by which the electronic circuit is incorporated by using high circuit technology, the minimum function necessary for driving the motor is modeled here. Accordingly, the non-linear characteristic of a semiconductor, the transient response of the electronic circuit and the like are excluded.

(2) Switching Method

Figure 27:
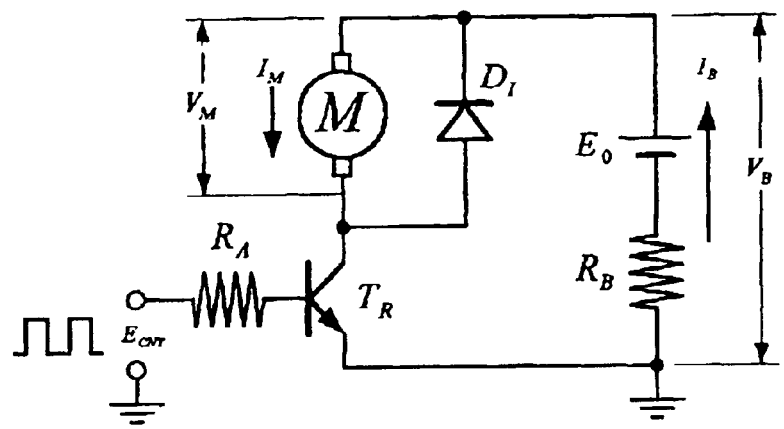
FIG. 27 is a diagram showing an electric circuit of a switching method.
Figure 28:
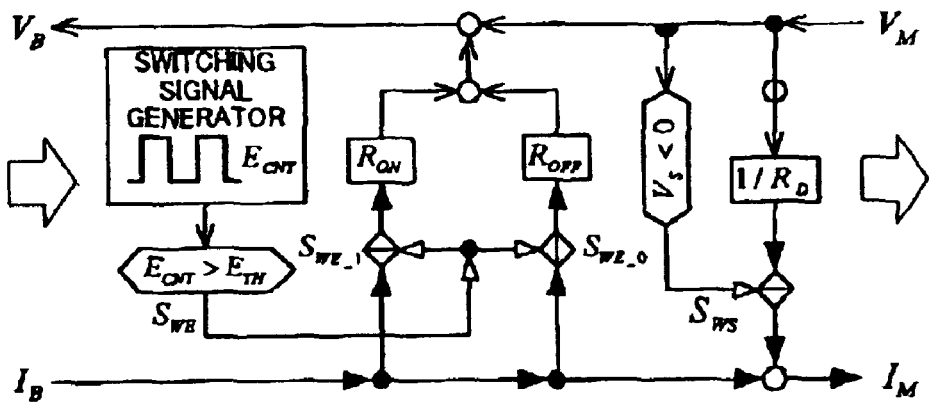
FIG. 28 is a diagram showing a functional model of an electric circuit of a switching method.

By the switching method, the ON/OFF ratio by which the electric power is supplied at a cycle which does not influence the motor speed is changed to perform a control. The switching method can be realized by periodically switching over $S_{WS}$ in FIG. 26. The electronic circuit diagram close to this method is shown in FIG. 27 and its functional model is shown in FIG. 28. FIGS. 27 and 28 respectively show a model including the battery.

In FIG. 27, a signal voltage $E_{CNT}$ of a rectangular wave applied from the outside is converted into a base current by a resistance $R_A$ of a transistor $T_R$ to make the transistor $T_R$ perform an ON/OFF operation. At this time, $E_0$ and $R_B$ respectively denote a battery voltage and an internal resistance. $D_I$ in FIG. 27 denotes a wheeling diode, and has the following two functions: One is a function of restoring the energy saved by the inductance of the motor winding generated when the transistor is turned OFF to the motor, and another is a function of guarding the transistor from the high voltage induced by the inductance. It is to be noted that a mechanism model of a switching signal generator is omitted.

In the switching operation of FIG. 28, a conductive state of ON is represented by a low resistance $R_{ON}$ and an interrupted state of OFF is represented by a high resistance $R_{OFF}$, in which both are switched over. Also, the function of the wheeling diode is represented by a condition judgment $S_{WD}$ shown by a hexagon frame and a resistance $R_D$ of the conductive state. Namely, the condition judgment $S_{WE}$ judges the voltage $E_{CNT}$ of the signal generator with the detected voltage $E_{TH}$, the conductive resistance $R_{ON}$ is selected when $S_{WE}=1$, and the interception resistance $R_{OFF}$ is selected when $S_{WE}=0$. Selection is performed by the switchover switch variables $S_{WE\_1}$ and $S_{WE\_0}$.

Moreover, as for the accumulated energy of the inductance, the release period is judged by the counter electromotive force of the inductance which has turned to be negative, so that the energy is restored to the motor through the conductive resistance $R_D$ of the wheeling diode. The functions of the braking resistance $R_L$ shown in FIG. 26 and the resistance $R_D$ in FIG. 28 appear to be the same at a glance. However, the former functions by a positive induced voltage of the motor, while the latter functions by a negative counter electromotive force by the inductance. The government equation of the switching method taking these points into account is given as follows:

$$\begin{bmatrix} V_B \\ I_M \end{bmatrix} = \begin{bmatrix} R_{ON} S_{WE\_1} + R_{OFF} S_{WE\_0} & 1 \\ 1 & -R_D S_{WD} \end{bmatrix} \begin{bmatrix} I_B \\ V_M \end{bmatrix} \quad \text{Eq. (44)}$$

It is to be noted that the switching signal generator is excluded.

(3) Fixed Current Control Method

Figure 29:
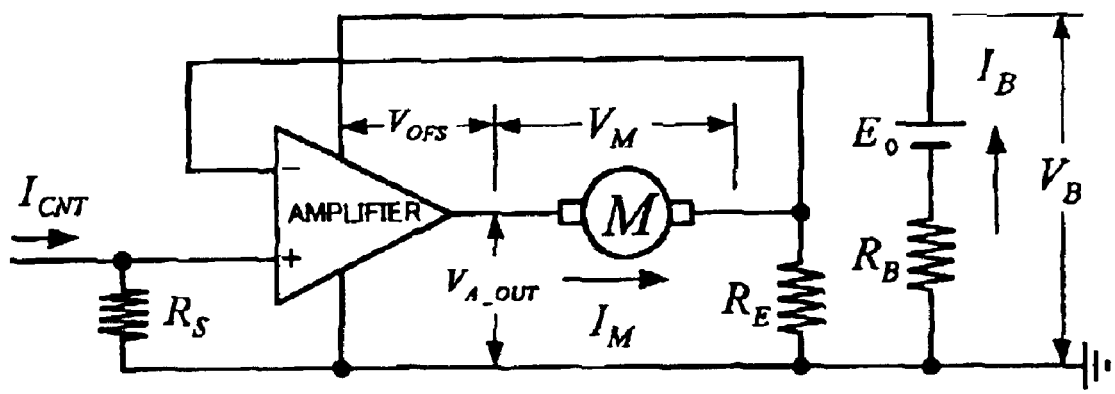
FIG. 29 is a diagram showing an electric circuit of a fixed current control.

The electronic circuit for controlling the motor by continuously changing the motor current or voltage is as follows:

The basic function of the motor is to convert the given current into the drive torque by the torque coefficient $\chi_T$. Accordingly, when an electronic control is performed to the motor, it is a basic function of the fixed current control to freely set a current targeted and to maintain the current. FIG. 29 shows one of control circuits for maintaining the output current $I_S$ in proportion to the value of a designated current $I_{CNT}$.

In FIG. 29, a triangle shows an operational amplifier or the like which has a high amplification ratio inside. The current $I_{CNT}$ targeted is converted into the voltage by the resistance $R_S$ to be inputted to + side of the amplifier. Also, the controlled current $I_M$ is converted into the voltage by the current detecting resistance $R_E$ to be returned to − side of the amplifier, thereby performing a feedback control. It is to be noted that $E_0$ and $R_B$ are respectively the induced voltage and the internal resistance of the battery.

Additional brief examination of the fixed current control will be described as follows:

The voltage applied to + and − sides of the amplifier are respectively $V_{A\_INP1}=R_S I_{CNT}$ and $V_{A\_INP2}=R_E I_M$, as seen from FIG. 29. Also, assuming the amplification ratio of the amplifier is $A_{MP}$, the output voltage $V_{A\_OUT}$ is given as follows:

$$V_{A\_OUT} = (R_S I_{CNT} - R_E I_M) A_{MP} \quad \text{Eq. (45)}$$
$$= V_M + R_E I_M$$

Also, the amplifier in FIG. 29 has a high amplification ratio. Therefore, if equation (45) is arranged assuming $1/A_{MP}=0$, the equation of the output current $I_M$ is given as follows, where $R_S/R_E$ in the equation indicates the current amplification ratio:

$$I_M \cong \frac{R_S}{R_E} I_{CNT} \quad \text{Eq. (46)}$$

$V_{A\_OUT}$ of Eq.(45) cannot generate the voltage equal to or more than a supply voltage $V_B$ shown in FIG. 29. Also, a voltage difference of an offset voltage $V_{OFS}$ is necessary between an output voltage upper limit value of the amplifier and a power supply voltage. This relationship is expressed by the following inequality:

$$V_{A\_OUT} \leq V_L - V_{OFS} \quad \text{Eq.(47)}$$

The output voltage $V_{A\_OUT}$ of the inequality (47) restricts the upper limit value of the output current $I_M$, indicating the limit of the fixed current control. The output current $I_{SL}$ exceeding this limit is determined by the closed circuit of the voltage of the battery induced voltage $E_0$ and the offset voltage $E_{OFS}$ shown in FIG. 29, as well as the voltage drop by the motor winding resistance $R_M$, the current detecting resistance $R_E$, and the battery internal resistance $R_B$. However, since $E_0$ is not included in the functional element of the fixed current control, it is necessary to replace $E_0$ with the supply voltage $V_B$ which can be added to the functional element. The current $I_{SL}$ considering this point is expressed by the following equation:

$$I_{SL} \cong \frac{V_B - E_{OFS}}{R_M + R_E} \quad \text{Eq. (48)}$$

The current consumed by the internal circuit of the amplifier is very low. Therefore, by neglecting the current, equation (48) turns into the approximate equation of the current $I_B$ supplied by the battery.

From the above-mentioned description, the fixed current control circuit in FIG. 29 has a function of switching over the controlled current $I_M$ given in equation (46) to the uncontrolled current $I_{SL}$ given in Eq.(48) to be supplied. The functional model of the fixed current control in which the above-mentioned contents are arranged and modeled can be shown in FIG. 30.

Firstly, the government equation of the fixed current control can be obtained from FIG. 30 as follows:

$$\begin{bmatrix} I_M \\ V_B \end{bmatrix} = \begin{bmatrix} 0 & S_{WAMP\_1} & \frac{R_S}{R_E} S_{WAMP\_0} I_{CNT} \\ 1 & R_E S_{WAMP\_1} & \frac{R_E R_S}{R_E} S_{WAMP\_0} I_{CNT} \end{bmatrix} \begin{bmatrix} V_M \\ I_B \\ 1 \end{bmatrix} \quad \text{Eq. (49)}$$

In equation (49), $S_{WAMP\_1}$ and $S_{WAMP\_0}$ indicate switchover elements with the condition judgment for judging the limit of the fixed current control.

Finally, as for the fixed current control provides an in-control while the current $I_B$ within the control range of Eq.(46) is equal to or less than the current $I_{SL}$ exceeding the control limit of Eq.(48), and a non-control when the current $I_B$ exceeds the current $I_{SL}$. This condition judgment $S_{WAMP}$ provides the following equation. It is to be noted that $\hat{I}_B$ and $I_{SL}$ in equation (50) are estimated state values.

$$\text{if } (\hat{I}_B < I_{SL}) \text{ then } S_{WAMP}=1 \text{ elkse } S_{WAMP}=0 \quad \text{Eq.(50)}$$

In Eq.(50), $S_{WAMP}=1$ means that the condition is fulfilled so that the current is directly supplied from the battery, while $S_{WAMP}=0$ means that the condition is not fulfilled so that the fixed current control is performed.

3.2 Determination of Initial Characteristic Value

Characteristics which have not yet been clarified are mainly transient characteristic values inside the motor. In order to understand the relationship between the motor function and the functional model, the characteristic value is initialized by providing the design value shown in the following Table 4 or an initial characteristic value obtained from a similar part, by applying a steplike voltage to the motor in the idle state, and by sequentially updating the characteristic value experimentally. It is a matter of course that the process and method performed here can be simulated by the computer.

TABLE 4

| CHARACTERISTIC NAME | SYMBOL | UNIT | CHARACTERISTIC VALUE |
|---|---|---|---|
| INERTIA MOMENT | $J_M$ | [Nm/(rad/sec$^2$)] | $0.4 \times 10^{-6}$ |
| INDUCTANCE | $L_M$ | [H] | $3.0 \times 10^{-3}$ |

Figure 31:
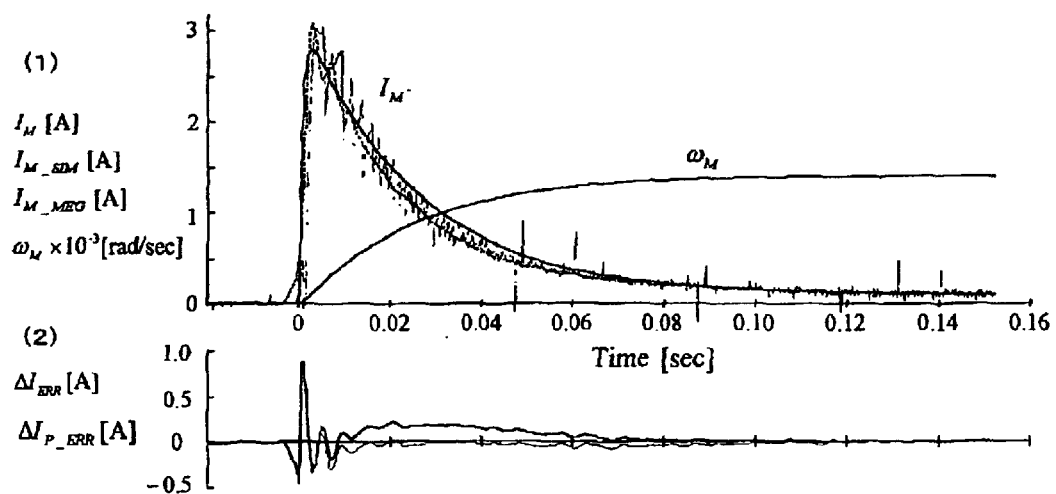
FIG. 31 is a graph showing a trial simulation result before performing a transient identification in a characteristic value identification method and an apparatus therefor according to the present invention.

Upon the identification, the simulation results at the time when the functional model, corresponding to model when $T_M=0$ in FIG. 23, in the idle state is initialized by providing the characteristic shown in the Table 4 to Eq.(35) are shown in FIGS. 31(1) and 31(2). It is to be noted that for the steady internal characteristic value and the test condition except those shown in the Table 4, the above-mentioned identification results of the steady state shown in the Table 3 are used. Also, since the additional load $T_M$ is idle, it is made "0".

FIG. 31(1) shows the motor current $I_M$ [A] and the angular velocity $\omega_M$ [rad/sec]. In FIG. 31(1), a thin dotted line indicates natural data of a measured current, a thick dotted line indicates a current $I_{M\_MEG}$ [A] where signal processing is performed to a measured result described later with a digital filter, a thick solid line indicates a current $I_{M\_SIM}$ [A] of the simulation result, and a thin solid line indicates an angular velocity $\omega_M$ [rad/sec] of the motor.

Also, in FIG. 31(2), a thick solid line indicates a current deviation $\Delta I_{ERR}$ [A] of an initial value obtained by subtracting the current $I_{M\_MEG}$ after being signal-processed with the filter from the current $I_{M\_SIM}$ determined by the simulation, and a thin dotted line indicates a current deviation $\Delta I_{P\_err}$ [A] at the time when a moment of inertia $J_M$ described later is identified.

In FIG. 31(2), the current $I_M$ shows a rise immediately after the power supply is turned ON where a high starting current flows, and decreases with a lapse of time, being stabilized to the idle current. Oppositely, the angular velocity $\omega_M$ rises with a lapse of time to stabilize in the idle rotation number. The change of the motor current indicates that the induced voltage of the motor is governed by the angular velocity $\omega_M$ through the motor constant $M_M$.

3.2.1 Noise Process of Measured Current

The motor current $I_M$ is measured by connecting a distributary resistance $R_S$ of 50 [m$\Omega$] between the motor and the power supply. The starting current measured at this time is shown by a thin dotted line which varies extensively in FIG. 31(1). The extensive variance indicated by the actually measured value is due to the brush and a commutator of the motor, and is remarkably shown in a low rotation region immediately after the start. Particularly, the extensive variance which occurs at the rise of the rotation depends on a rotation angle of the commutator for the brush, which is remarkably shown in a small motor having a few contact pieces of commutator.

The result of performing the signal processing to the measured data with the digital filter in order to remove the extensive current variance is shown by the thick dotted line in FIG. 31(1), for the filter characteristic, a low-pass filter with a cut-off frequency of 100 [Hz] is used. It is to be noted that since the phase delay of about 72 [msec] from the measured data has occurred due to filtering, the result of the signal processing in FIG. 31(1) is made coincident with the measured data by forwarding the rising point by the phase difference. Thus, the diagonally rising component having moved before 0 [sec] shown in FIG. 31(1) is neglected.

The identification processing is performed by using the data to which the filter processing is performed. However, it is expected that an error greatly influences the identification result since the current variance occurring at the start of the motor rotation is not completely excluded. Since this error is an uncertain variance dependent on a positional relationship between the brush and the commutator at the starting time described before, the identification is performed from this view point.

3.2.2 Time History Sensitivity of Characteristic (Process 38)

It has been clarified that all of the characteristic values which form the subject of the identification are included in the motor current $I_M$ obtained from the output state value of the output equation in the 5th row of Eq.(36). Therefore, in order to perform the identification, it is necessary to form a hypothesis by fully grasping the relationship between the characteristic values which form the subject and the motor current, and to verify it through the interpretation of the identification result. Accordingly, the followings are hypothesized for the influence of the characteristics on the motor.

① It is supposed that the moment of inertia $J_M$ is proportional to the change of the angular velocity (angle acceleration), provides strong influences during the acceleration when the change of the angular velocity is large, and does not provide influences in the steady state when the change is little.

② It is supposed that the inductance $L_M$ is proportional to the change of the motor current, provides influences when the current variance is large at the starting moment, and does not provide influences in the steady state when the current becomes stable.

③ It is supposed that the viscous resistance coefficient $\delta_M$ is proportional to the angular velocity, provides influences as the load of the internal loss with the increase of the angular velocity, and assumes a fixed load in the steady state.

④ It is supposed that the kinetic friction torque $F_{MF}$ is a constant and so is a characteristic not influenced by the state value change. The motor has a structure of reducing the friction torque as much as possible, so that the influence is little.

It is seen from the above-mentioned contents that the respective ways in which the characteristic values contribute are different in the process of a time transition from the starting moment to the steady state. Accordingly, if the sensitivity of the characteristic values for the change of the motor current $I_M$ is supposed to be the index of the identification, it can be easily presumed that the identification is possible. It is to be noted that the above-mentioned ③ and ④ are added for examining the time history sensitivity of the steady internal characteristic value.

Figure 32:
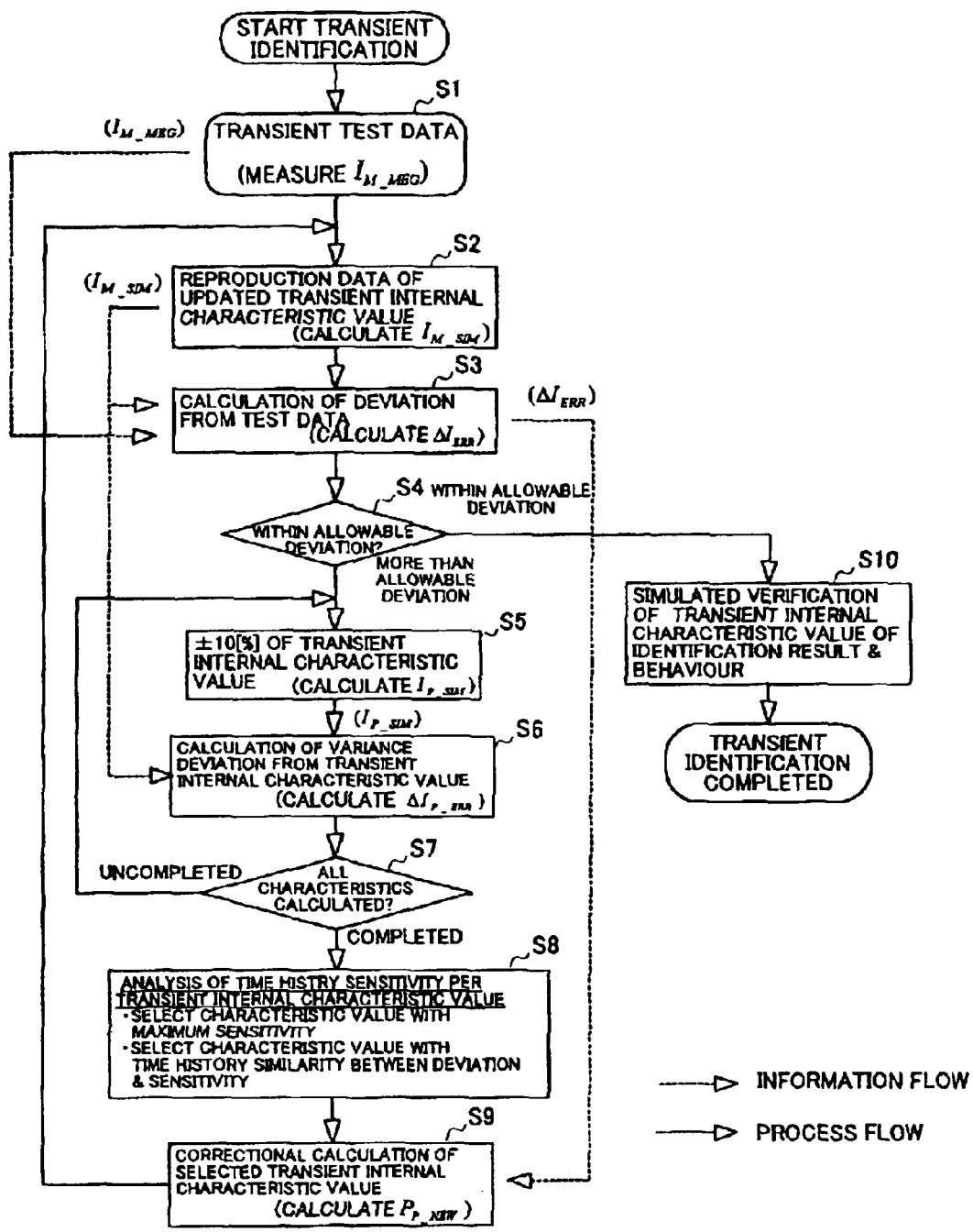
FIG. 32 is a flow chart illustrating an operation of a transient identification in a characteristic value identification method and an apparatus therefor according to the present invention.

The sensitivity of each characteristic value will be examined based on the above-mentioned result as follows (see flow chart in FIG. 32):

It has been described that the simulation result in FIG. 31(1) has been performed at the initial values of the characteristic values, and the current deviation $\Delta I_{ERR}$ at that time is shown in FIG. 31(2). In order to make this the index of the identification, the influence which the characteristic value variance provides to the current deviation $\Delta I_{ERR}$ is clarified, so that the relationship between the characteristic value and the motor current can be grasped. This current deviation $\Delta I_{ERR}$ can be expressed by the following equation (at step S3), with a current measured value $I_{M\_MEG}$ (at step S1 in FIG. 33) and a simulation value $I_{M\_SIM}$ (at step S2) being made a deviation:

$$\Delta I_{ERR} = I_{M\_SIM} - I_{M\_MEG} \qquad \text{Eq.(51)}$$

If the deviation $\Delta I_{ERR}$ lies within an allowable range, the transient identification is completed after verifying the identification result by the simulation described later (at steps S4 and S10).

From equation (51), the value of the simulation is high with respect to the measured value when the current deviation $\Delta I_{ERR}$ of FIG. 31(2) is positive, and otherwise low. Moreover, an extensive violent variance is included at the starting moment. Accordingly, in order to use the current deviation $\Delta I_{ERR}$ as a sensitivity of the motor current $I_M$ for the characteristic change, it is required to remove the variance. Also, the offset quantity by the current deviation $\Delta I_{ERR}$ is included in the sensitivity.

A variance current deviation $\Delta I_{P\_ERR}$ of the characteristic representing the sensitivity is expressed by the following equation to remove the variance portion of the deviation:

$$\left. \begin{aligned} \Delta I_{P\_err} &= I_{P\_SIM} - I_{M\_MEG} - \Delta I_{ERR} \\ &= I_{P\_SIM} - I_{M\_SIM} \end{aligned} \right\} \qquad \text{Eq. (52)}$$

On the upper term of equation (52), the $I_{P\_SIM}$ (at step S5) indicates the simulation value at the time when the transient internal characteristic value is changed, and the initial value current deviation $\Delta I_{ERR}$ indicates the current deviation of the measured value $I_{M\_MEG}$ for the simulation value $I_{M\_SIM}$ of the initial value by Eq. (51).

From this equation, the variance current deviation $\Delta I_{P\_ERR}$ of the characteristic value can use the deviation of the simulation value $I_{P\_SIM}$ of each characteristic value variance for the simulation value $I_{M\_SIM}$ of the initial value as a sensitivity as shown in the lower term of Eq.(52). However, since an identification accuracy is exceedingly evaluated by the initial value current deviation $\Delta I_{ERR}$, it is necessary to proceed the identification while the $\Delta I_{ERR}$ is contained within an appropriate range at any time during the identification.

3.2.3 Identification Method by Time History Sensitivity Change

Firstly, the result (at step S6) upon having determined the current deviation $\Delta I_{P\_ERR}$ at the time when the characteristic values are changed by +10 [%] and −10 [%] with the time history is shown in FIGS. 33B–33E. The four diagrams show the sensitivity seen with the time history at the time when the characteristic values are changed. FIG. 33(1) is a diagram for comparing the sensitivities at the time indicated by thin dotted times in the lower four diagrams, so that the time history data are stored.

Figure 33:
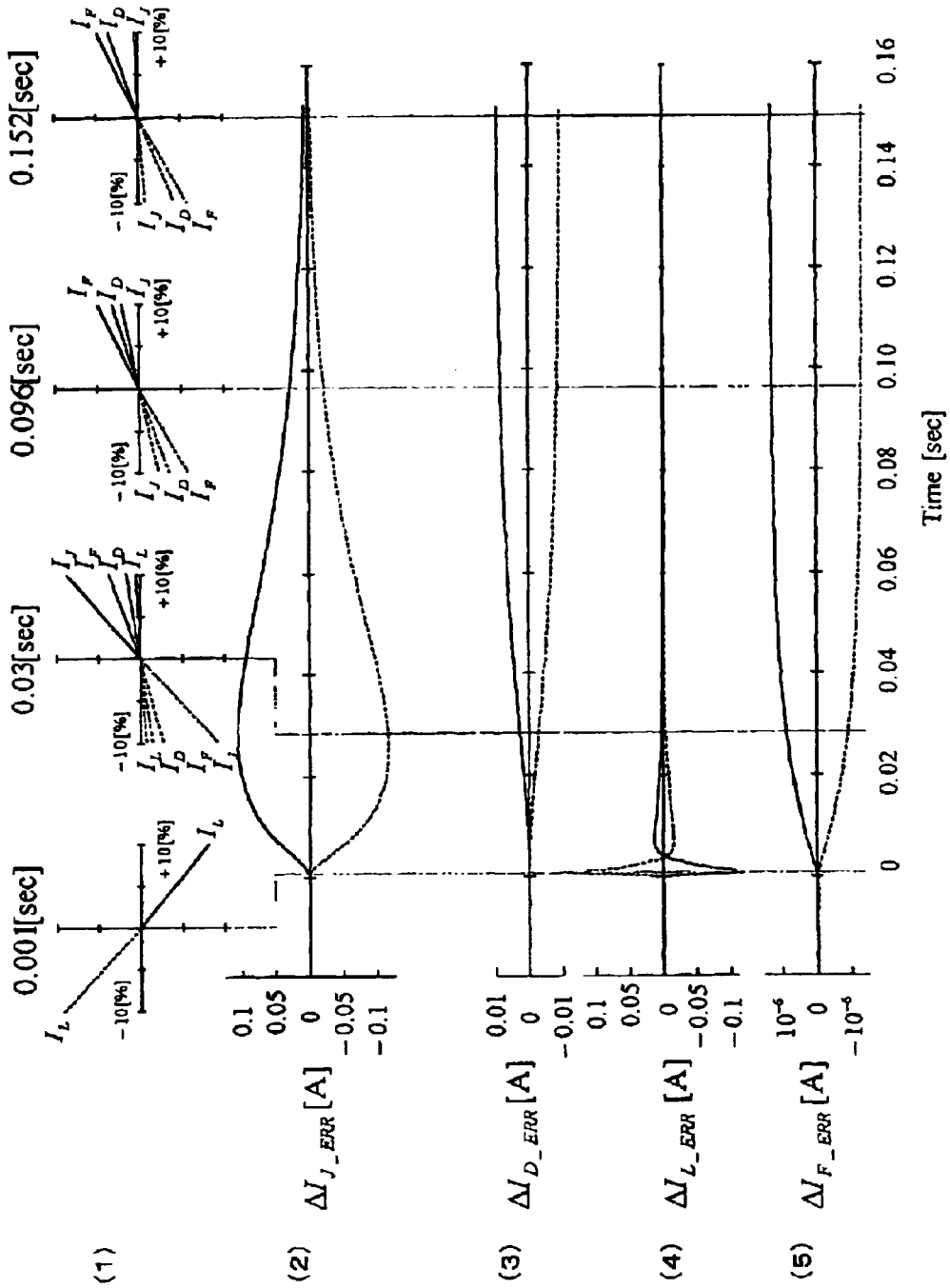
FIG. 33 is a graph respectively showing a sensitivity of a characteristic value in a characteristic value identification method and an apparatus therefor according to the present invention.

Also, in the respective current deviations of FIGS. 33(2)–33(5), J indicates the moment of inertia, L the inductance, D the viscous resistance coefficient, and F the kinetic friction torque, which are generally referred to "P (parameter)" as mentioned above. However, since the vertical axis scale in each diagram is the same as that in each diagram on the lower term, it is impossible to compare the four diagrams in parallel. Also, the solid line shows a result upon having increased the characteristic of the Table 4 by +10 [%], and the dotted line shows a result upon having decreased the same by −10 [%]. This calculation is performed to all of the characteristic values of the identification subject (at step S7).

It is seen that the characteristic becomes linear, since the result upon having changed the characteristic value by ±10 [%] is symmetrical with respect to positive and negative in FIG. 33(1). The moment of inertia $J_M$ and the viscous resistance coefficient $\delta_M$ become directly proportional to the motor current, and the inductance $L_M$ becomes proportional to the motor current in which the positive and negative are inverted. These relationships almost agree to the above-mentioned hypothesis of the relationship between the motor current $I_M$ and the characteristic, so that the variance of the deviation is removed.

The identification is performed with the current deviation $\Delta I_{P\_ERR}$ at the time when the characteristic of FIGS. 33(1)–33(5) is changed being made a time history sensitivity. In the identification, trials are repeated so that the current deviation lies within an allowable range by the following process (at step S4):

Firstly, since the positive current deviation is large in the range of 0.02–0.06 [sec] from the initial value current deviation $\Delta I_{ERR}$ of FIG. 31(2), the moment of inertia $J_M$ in FIG. 33(2) whose sensitivity is high in this region as shown in FIG. 33(1) is selected (at step S8) to be reduced (at step S9) in the identification of the characteristic values. Since a variance value $DI_{ERR}$ at the starting moment comes near the upper side as shown in FIG. 31(2), the inductance $L_M$ of FIG. 33(4) is increased.

As for the order of identifying these characteristic values, the above-mentioned steps S2–S9 are sequentially executed from the value having larger coefficient with the mutual relationship between the initial value current deviation $\Delta I_{ERR}$ and each variance current deviation $\Delta I_{P\_ERR}$ being made an index. Alternatively, when it is thought that the variances do not interfere with each other due to the time difference as shown in FIGS. 33(2) and 33(4), the identifications may be simultaneously performed by the steps S2–S9.

It is to be noted that since the characteristic curve of the moment of inertia $J_M$ is similar to the current deviation $\Delta I_{ERR}$ shown in FIG. 31(2) in the curve of the time history change, only the moment of inertia $J_M$ may be changed for the identification under the judgment that the current deviation $\Delta I_{ERR}$ is most influenced by the moment of inertia $J_M$.

Figure 34:
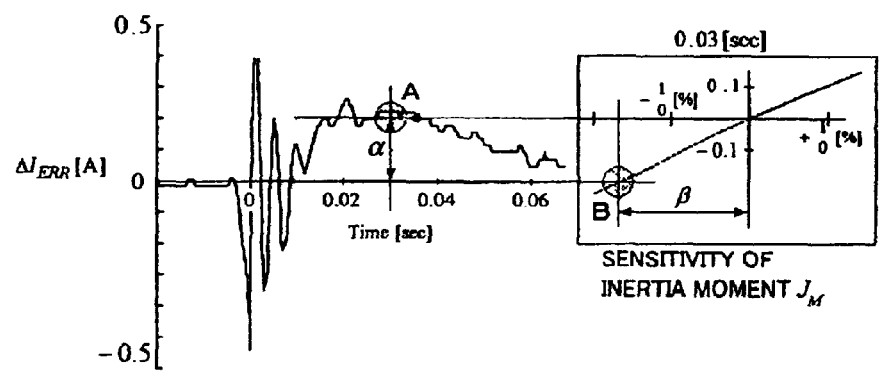
FIG. 34 is a graph respectively showing a relationship between a current deviation and a characteristic value time history sensitivity in a characteristic value identification method and an apparatus therefor according to the present invention.

Among above-mentioned processes, the process firstly performed in which the updated value of the moment of inertia $J_M$ is determined is shown in FIGS. 34(1) and 34(2).

FIG. 34(1) is a diagram showing the current deviation $\Delta I_{ERR}$ in FIG. 31(2) up to 0.06 [sec]. Point A in FIG. 34(1) indicates a deviation quantity a which is desired to be reduced and the position (point of 0.03 [sec]). FIG. 34(2) shows a sensitivity of the moment of inertia $J_M$ at the point of 0.03 [sec] shown in FIG. 33(1), in which the sensitivity point 0 (abscissa) is adjusted to the point A in FIG. 34(1).

It is to be noted that the current deviation shown by the both ordinates is adjusted to the same scale. As for the deviation quantity α=0.2 [A] which is desired to be removed from FIG. 34(1), it is seen from FIG. 34(2) that the sensitivity becomes negative.

Accordingly, a correction ratio β=16.8 [%] of moment of inertia $J_M$ is determined from an intersection B between the abscissa of the deviation 0 in FIG. 34(1) and the extension of the negative sensitivity in FIG. 34(2). From the Table 4, the updated moment of inertia $J_M$ assumes $0.4 \times 10^{-6} \times (1-0.168) = 0.3328 \times 10^{-6}$.

The result upon having updated the moment of inertia $J_M$ is a thin dotted line showing the variance current deviation $\Delta I_{P\_ERR}$ of FIG. 31(2). The above-mentioned process is expressed by the following equations (at step S9):

$$\left. \begin{array}{l} \beta = \dfrac{\alpha(t)}{\lambda(t)} \\ P_{M\_NEW} = P_{M\_OLD}\left(1 - \dfrac{\beta}{100}\right) \end{array} \right\} \quad \text{Eq. (53)}$$

In equations (53), the upper term is an equation of the correction ratio β of the characteristic value, and the lower term is an equation of the characteristic value after the update. As for the variables in Eqs.(53), α (t) [A] is a current deviation quantity of the initial value current deviation $\Delta I_{ERR}$ at a time "t", λ(t) [A/%] is a sensitivity of a characteristic value at a time "t" similarly, $P_{M\_NEW}$ is a characteristic value after the update, and $P_{M\_OLD}$ is a characteristic value before the update.

When the motor current and the characteristic value have a non-linear characteristic (time history sensitivity becomes asymmetrical) which are not proportional to each other, and the change range of the characteristic value greatly exceeds ±10 [%], it is necessary to again determine the sensitivity from Eq.(52) to repeat the identification.

3.3 Result of Transient Identification and Simulation (at Step S10)

(1) Identification Result and Simulation Thereof

The characteristic values via the above-mentioned process of the transient identification are shown in Table 5. As test data for identification, a result of an idle test is used in which the setting torque of the fixed torque transient test is assumed to be 0.

TABLE 5

| CHARACTERISTIC NAME | SYM-BOL | UNIT | CHARACTERISTIC VALUE |
|---|---|---|---|
| INERTIA MOMENT | $J_M$ | [Nm/(rad/sec²)] | $0.335 \times 10^{-6}$ |
| INDUCTANCE | $L_M$ | [H] | $4.2 \times 10^{-3}$ |

Figure 35:
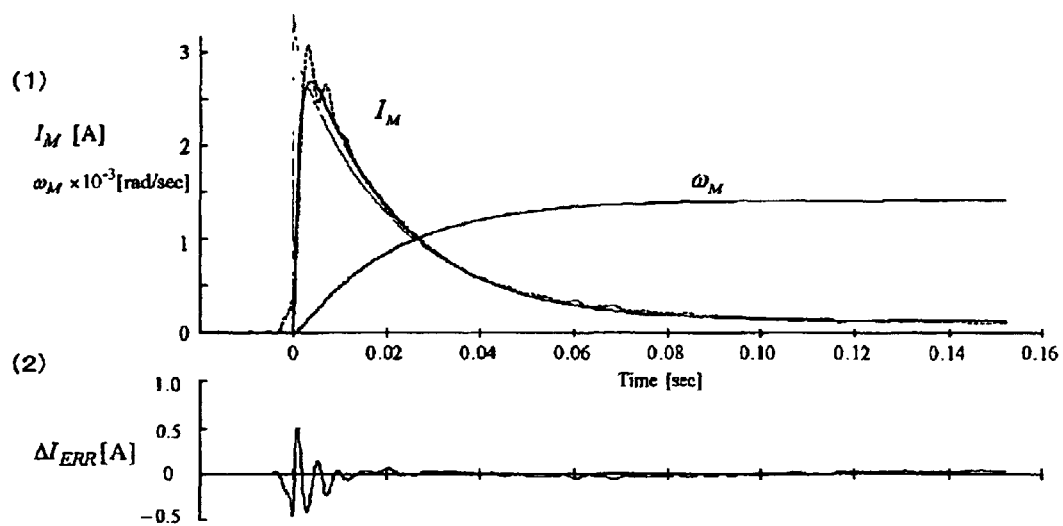
FIG. 35 is a graph respectively showing a simulation result after performing an identification in a characteristic value identification method and an apparatus therefor according to the present invention.

The simulation result in which the transient identification result is reflected is shown in FIG. 35. The simulation has been performed by providing the transient identification result of the Table 5 and the characteristic value of the steady identification result of the Table 3 to the government Eq.(35) for execution of the fixed torque transient test model shown in FIG. 23.

In FIG. 35(1), the result out of consideration of the inductance $L_M$ is added by a thin dotted line and the natural data of the motor current are omitted, while the others are the same as FIG. 31. It is to be noted that the simulation out of consideration of the inductance $L_M$ has been performed by the same Eq.(35) with $L_M = 10^{-12}$ [H] being made a minute value without influence.

When both are compared, it is seen that by the influence of the inductance $L_M$ the starting current which steeply rises at the starting moment is saved as an energy to be released with the decrease of the current.

As a result, the rising of the motor current and the peak value are suppressed in a solid line ($L_M>0$) with respect to the thin dotted line ($L_M\approx0$), and the falling part shifts to the right side. Also, the identification results are almost coincident as shown by the current deviation $\Delta I_{ERR}$ of FIG. 35(2), while the variance at the starting moment appears as it is in the form of the current deviation as mentioned before.

(2) Simulation of Actual Load Transient Test Model of Motor

Since this identified motor model becomes a virtual prototype which accurately reproduces a motor unit, a model of a virtual test which reproduces the driving state of the actual machine can be made by incorporating the functional model for operation in FIG. 26 into the actual load transient test model shown in FIG. 21 (see FIG. 42 described later). The simulation result will be described:

The simulation is performed by providing the characteristic value of the electrically driven arm of the following Table 6 to Eq.(41).

TABLE 6

| CHARACTERISTIC NAME | SYMBOL | UNIT | CHARACTERISTIC VALUE |
|---|---|---|---|
| DECELERATION RATIO | $N_G$ | | 1/200 |
| OPERATING ANGLE | $\theta_S$ | [rad] | 1.57 |
| STOPPER STIFFNESS | $K_S$ | [N/m] | $7.0 \times 10^4$ |
| STOPPER RADIUS | $L_S$ | [m] | 0.04 |

It is to be noted that the characteristic values other than those in the Table 6 are the same as those of the motor model after the identification. Also, the motor operation is performed by the power supply switch $S_{WS}$, the regular/reversed rotation switch $S_{WL}$, and the braking switch $S_{WB}$ shown in FIG. 26.

Firstly, the simulation result of the motor start and stop is given as follows:

The power supply switch $S_{WS}$ is turned ON to start the motor with the regular/reversed rotation switch $S_{WL}$ being made OFF and the braking switch $S_{WB}$ being made OFF. Then, the load of 2 [N·m] is provided after 120 [msec], and the power supply switch $S_{WS}$ is turned OFF after 280 [msec] with the load being provided. The simulation result is shown in FIGS. 36(1)–36(4).

Figure 36:
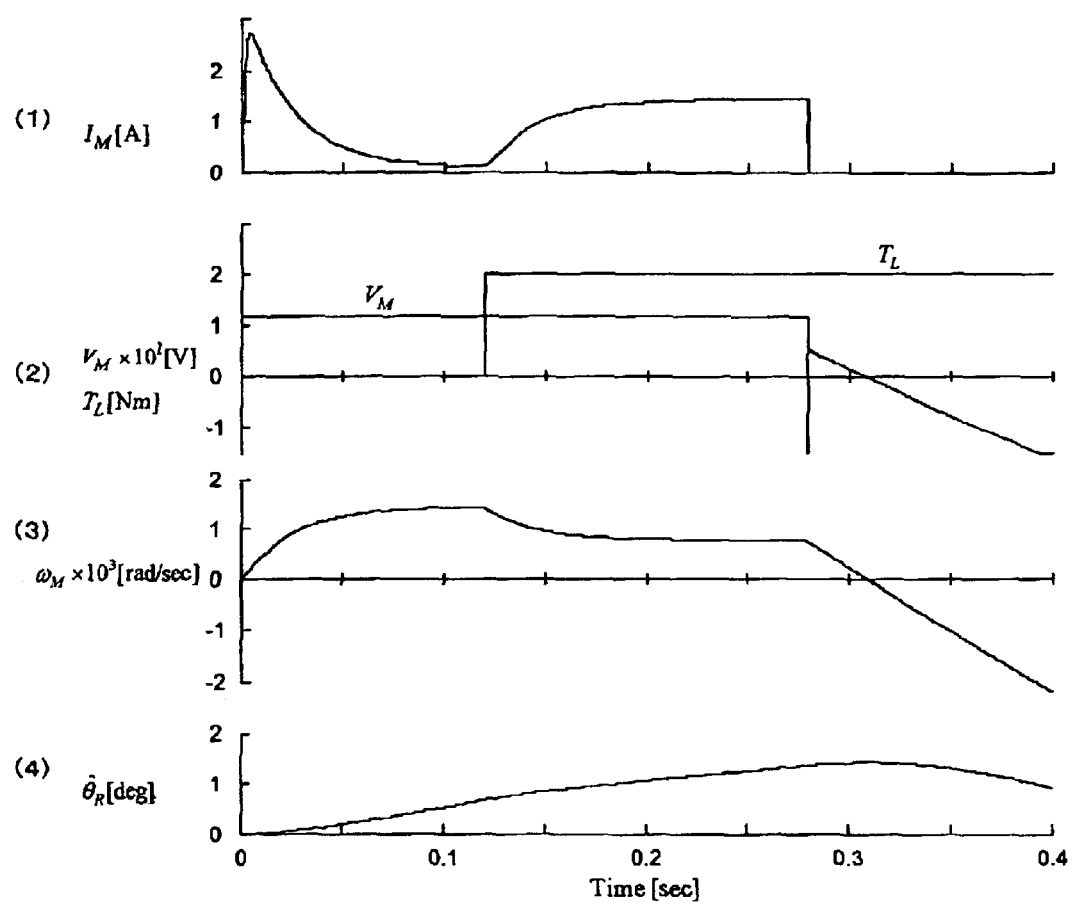
FIG. 36 is a graph respectively showing a simulation result of a start and a stop in a characteristic value identification method and an apparatus therefor according to the present invention.

FIGS. 36(1)–36(4) sequentially show a motor current $I_M$ [A], a load torque $T_L$ [Nm], a motor voltage $V_M$ [V], a motor angular velocity $\omega_M$ [rad/sec], and an operation angle of arm $\theta_R$ [deg]. The motor current $I_M$ increases, and the angular velocity $\omega_M$ decreases from the moment the load is added. At this time, the change of the operation angle $\theta_R$ becomes rather slow.

Also, when the power supply is OFF, the motor current $I_M$ aassumes 0 [A], the angular velocity $\omega_M$ decreases, and the load drives the motor from about 310 [msec], so that the reversed rotation occurs. Also, as for the motor voltage $V_M$ after the power supply is turned OFF, the inductance $L_M$ generates a spike-like voltage at the moment the power supply is OFF, and then the induced voltage $V_W$ by the angular velocity $\omega_M$ of the motor occurs, so that the state where the motor is changed into the generator is described.

Figure 37:
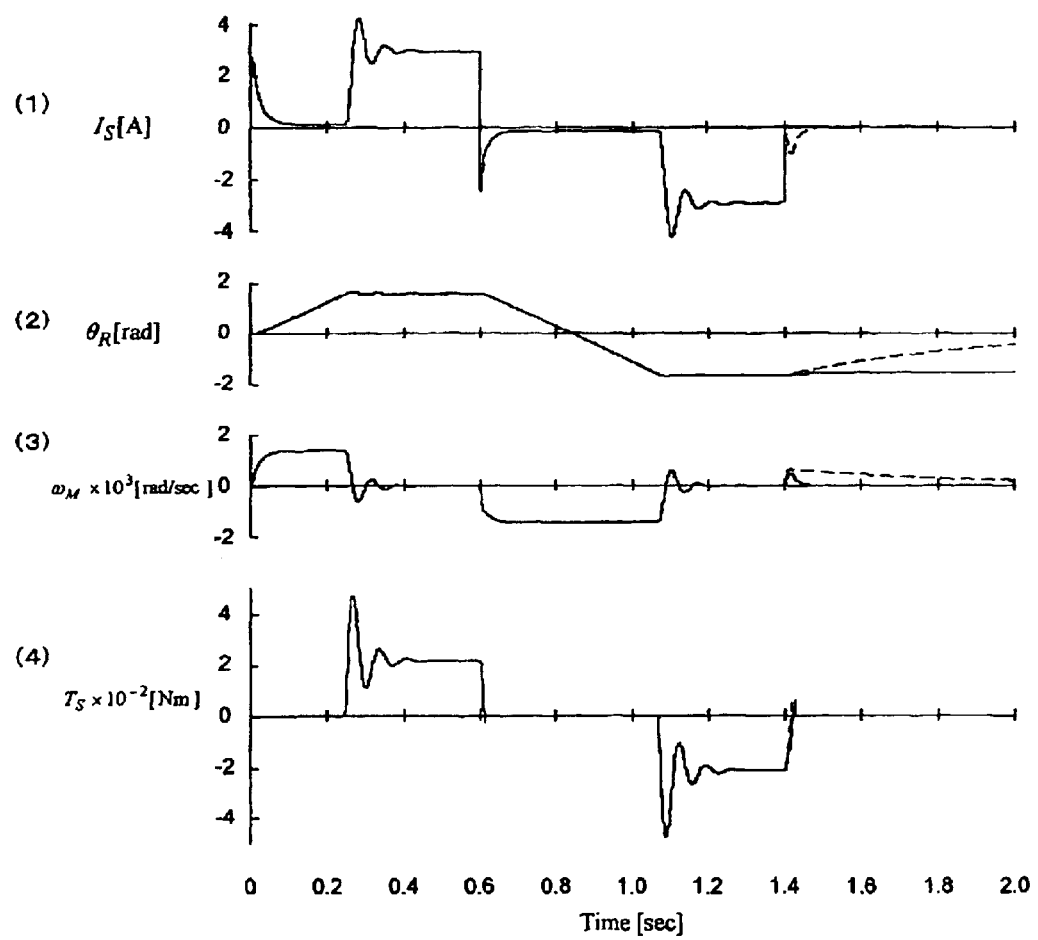
FIG. 37 is a graph respectively showing a simulation result of a regular/reversed rotation and brake in a characteristic value identification method and an apparatus therefor according to the present invention.

The simulation result of the motor regular/reversed rotation, as well as the braking is as follows:

FIGS. 37(1)–37(4) show an example in which the motor is stopped with and without the electric brake by OFF/ON of the braking switch $S_{WB}$. FIGS. 37(1)–37(4) show states as follows: The motor is started with the regular/reversed rotation switch $S_{WL}$ being made OFF and the power supply switch $S_{WS}$ being made ON to be compulsorily stopped with the stopper. Then, the motor is rotated reversely in 0.6 [sec] after the regular/reversed switch $S_{WL}$ being made ON and is again compulsorily stopped with the stopper on the opposite side. After the lapse of 1.4 [sec], the power supply switch $S_{WS}$ is made OFF, so that the motor is stopped.

FIGS. 37(1)–37(4) sequentially show a motor current $I_M$ [A], an operation angle of arm $\theta_R$ [deg], a motor angular velocity $\omega_M$ [rad/sec], and a motor torque $T_M$ [Nm]. Also, the solid line of FIGS. 37(1)–37(4) shows the state where the electric brake by the braking resistance of $R_L=1$ [mΩ] is applied, while the dotted line shows the state without the brake. Both of the regular and reversed rotations generate an attenuated oscillation at the time of collision at the stopper.

Also, when the motor is compulsorily stopped by the stopper, a flexible structure of a stopper gum absorbs the maximum torque of the motor to be compressed. If the power supply is cut off in this state, the arm is pushed back by the compression power owing to the bend of the stopper. The effect of the electric brake appears at the stop state after 1.4 [sec]. It is seen from the motor angular velocity $\omega_M$ and the operation angle of arm $\theta_R$ that the motor idle by the stopper counterforce is well absorbed as shown by the solid line.

4. Motor Identification Apparatus

Hereinafter, an apparatus required for identifying the above-mentioned test model of the steady and transient states of the functional parts will be described.

The functional parts incorporated into the products have a structure working with assembling the functional parts to the input/output portion and by mutually associating them. As shown in FIG. 21, the battery for driving, the electrically driven arm forming a load and the like are necessary e.g. for the motor test. Also, in order to control the motor, the operation system shown in FIGS. 25, 27, and 29 is necessary.

The test model for thus performing an identification by using the test data of the actual machine requires modeling the functional parts which form the driving source and the load of the tested object. Subject to the influence by other functional parts in this way, it is possible to standardize the function and the behavior as the specification of the tested object and the test standard. If there is something which operates and reproduces the behavior just as standardized function and behavior, it can be used as a substitute common to each test method.

If the functional model which forms the substitute of the driving source and the load is modeled and incorporated into the test model as an identified model, the identification defined to the internal characteristic value of the tested object can be performed. Also, as for the testing unit and the test model, the group of the tested objects at whose parts specifications are different can be replaced with block replacement means.

Figure 38:
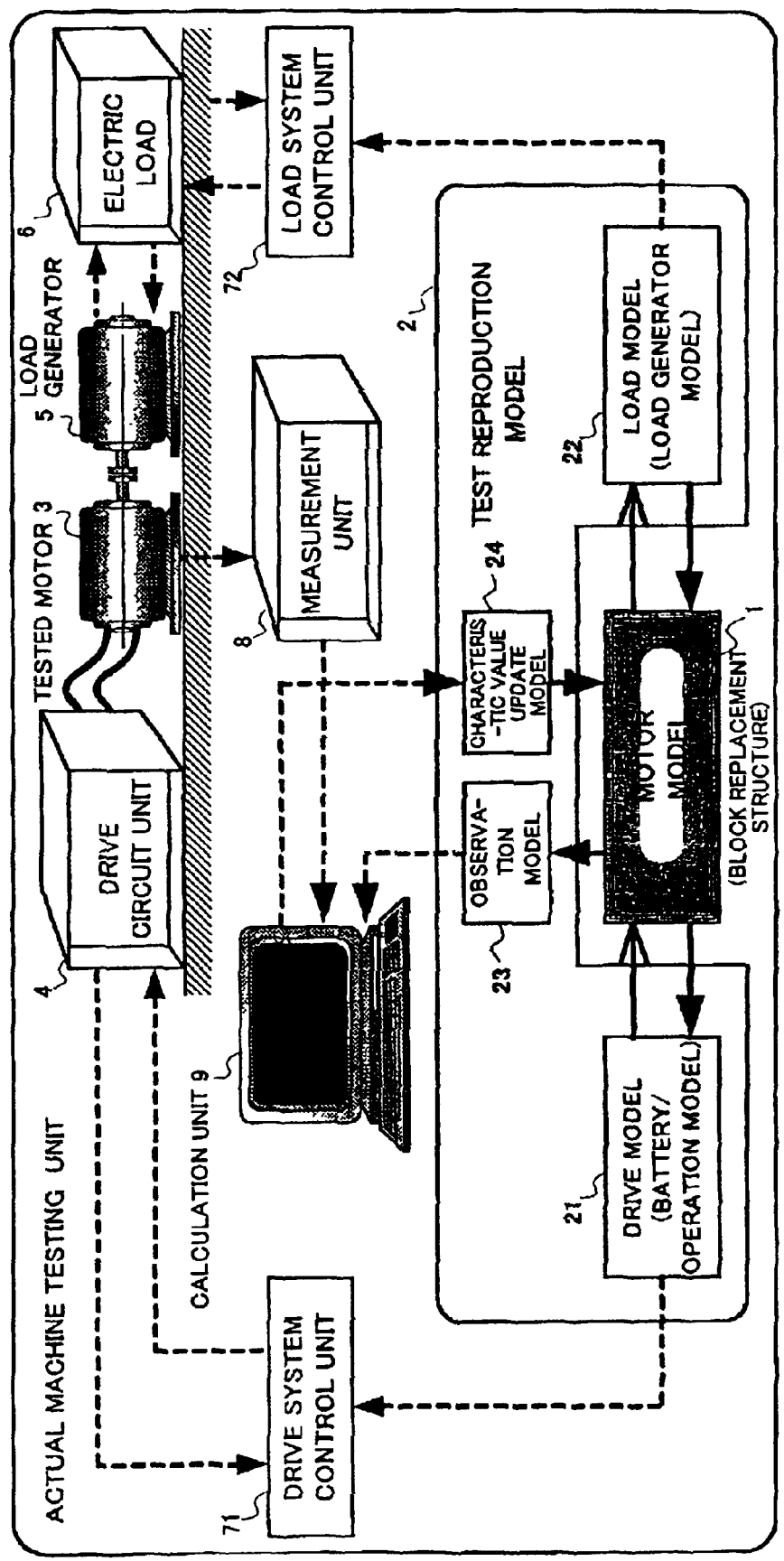
FIG. 38 is a block diagram illustrating a characteristic value identification apparatus according to the present invention by taking a motor as an example.

FIG. 38 shows an example in which the concepts are applied to the motor identification apparatus. In the identification apparatus of FIG. 38, a motor model 1 has a block replacement structure for a test reproduction model 22. A reproduction model 2 is composed of a drive model 21 such as a battery and an operation model, a load model 22 such as a load generator model, an observation model 23 for observing the state value of the motor model 1, and a characteristic update model 24 for updating the internal characteristic value.

Also, a drive circuit unit 4 takes charge of the battery and the operation system which forms driving source of a tested motor 3. A load generator 5 and an electric load 6 take charge of the mechanical load of the motor 3. The driving source and the mechanical load are modeled as a drive model 21 and a load model 22 already identified.

Furthermore, as for the relationship between the actual machine testing unit and the models, the former drive model 21 has a structure of controlling the drive circuit unit 4 through a drive system control unit 71, and the latter load model 22 has a structure of controlling the load generator 5 through a load system control unit 72.

The measured value of the motor 3 is obtained at a measurement unit 8 to be provided to a calculation unit 9. The calculation unit 9 receives the observation value of the observation model 23 and the measurement from the measurement unit 8 to update a characteristic update model 24.

Figure 30:
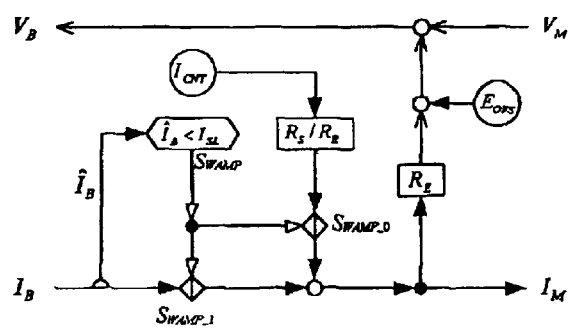
FIG. 30 is a diagram showing a functional model of a fixed current control circuit.

The motor drive model 21 shown in FIG. 38 corresponds to the model in which the battery on the left side of FIG. 21 and the operation system circuit of FIGS. 26, 28, and 30 are united. The load generator model 22 corresponds to the arm mechanism on the right side of FIG. 21 and the fixed torque generation model of FIG. 23.

The operation and the behavior reproduced on the former model are reproduced at the drive circuit unit 4 by the drive system control unit 71 to be provided to the motor 3 of the tested object. Similarly, the load state provided to the motor 3 is reproduced on the load generator 5 by the load system control unit 72 controlling the electric load 6.

Accordingly, if the motor functional model 1 shown in FIG. 4(1) is connected to the reproduction model 2, the drive model 21 and the load model 22 preliminarily provided corresponding to the drive system and the load system turns into predetermined steady test models and control the drive circuit unit 4 and the electric load 6.

Together with this operation, the steady test data generated by the motor 3 is measured by the measurement unit 8, so that the calculation unit 9 which has received the data provides the government equation of the steady functional model i.e. the steady internal characteristic value to the motor model 1. Thus, the steady identification is completed.

Then, the reproduction model 2 changes the drive model 21 and the load model 22 into the transient test model for the transient identification. Together with this operation, the transient test is executed, so that the transient test data are provided to the calculation unit 9 from the measurement unit 8. The calculation unit 9 compares the value obtained by substituting the already calculated steady internal characteristic value for the internal characteristic value inputted from the observation model 23 with the measured data from the measurement unit 8. The internal characteristic value of the motor model 1 is properly updated as mentioned above, by the characteristic update model 24 so that an error between them becomes small to lie within an allowable range. Thus, the transient identification ends, so that all of the identification works are completed.

5. Virtual Test

The model which reproduces the function, the performance, and the characteristic value of the parts or the products composed of the parts is identified with the test data of the actuality, so that the internal characteristic value and the reproductivity are verified. Therefore, it can be utilized as a virtual prototype for performing various evaluation tests on the computer instead of the actual machine. An example where the virtual prototype is applied to the product development will be described.

5.1 Relationship Between Product Development and Modeling

Figure 39:
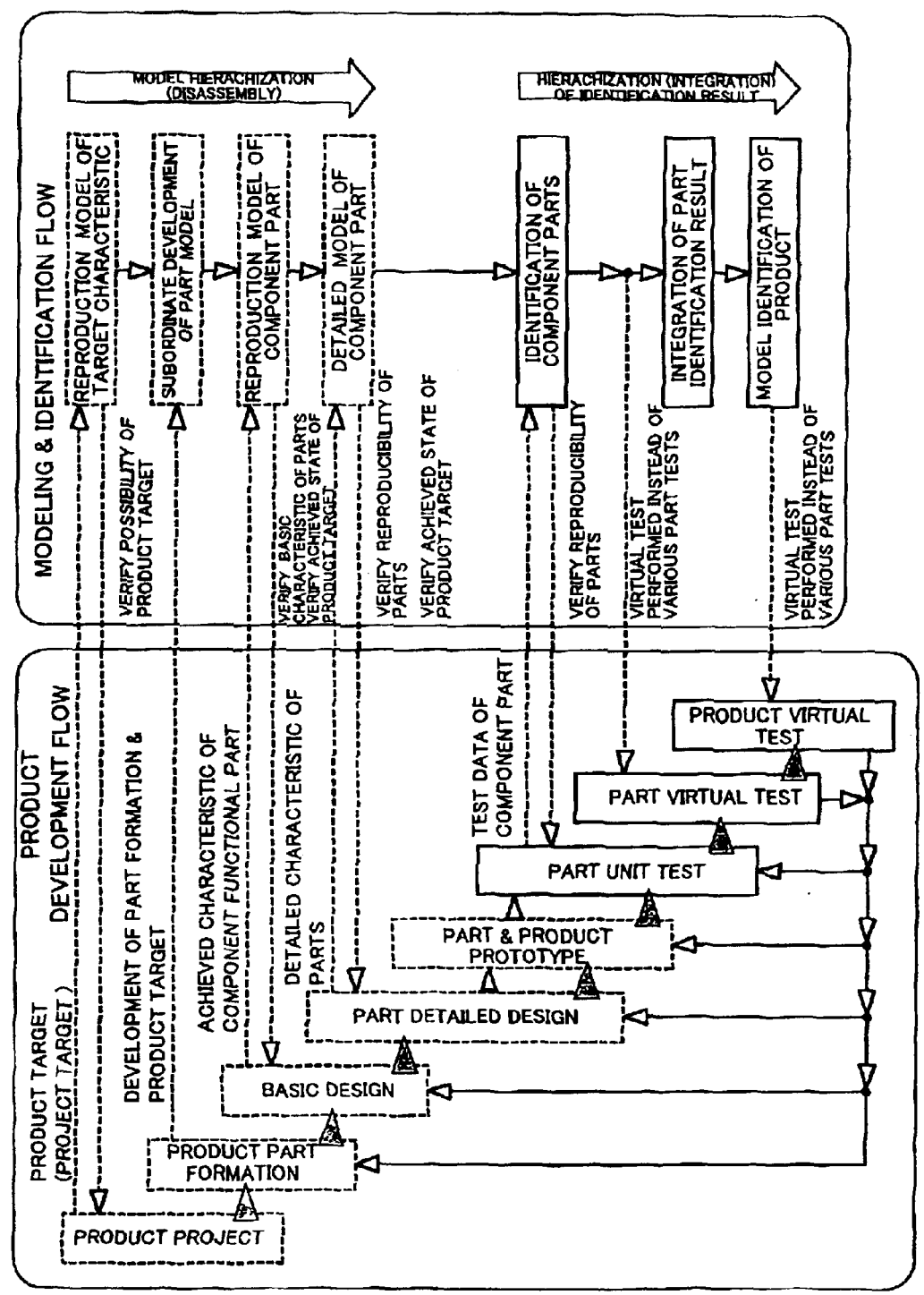
FIG. 39 is a block diagram showing a relationship between a product development and a model.

The development process of product and the formation process of model are shown by the relationship in FIG. 39.

FIG. 39 shows a relationship between a development process of a project stage, a design stage, a prototype and test stage, and modeling and identification performed in parallel with the development. FIG. 39 shows a process including a concept of concurrent engineering in which development processes of the product are performed in parallel.

On the other hand, the process of modeling has a flow as follows: An abstract product target at the project stage is firstly modeled, the model is sequentially detailed along with the development process, a validity of the project and design contents by the model is verified, and the identification is finally performed with the test data of the prototype, so that the virtual test is performed executing computer simulation with the identification model instead of the various evaluation tests.

(1) Relationship Between Product Development and Modeling

If this virtual test is applied to the development of the car, for example, the process is given as follows:

As for the abstract model at the project stage such as a model reproducing a car performance which forms the target characteristics of the projected car such as an acceleration time of 0–400 [m], a stationary fuel cost performance, and an acceleration performance, a possibility of achieving the target characteristics is verified by the model assembled with the characteristics such as a weight, a resistance, a power characteristic, and a gear ratio.

In the next product part formation and basic design, the model is disassembled following the formation method of the basic functional parts such as an engine, a transmission, a body realizing the target characteristics, and modeling is performed with the internal characteristic values of the functional parts being clarified, so that the function and the performance required for the functional parts, and the possibility of realizing the target characteristic value are verified.

Similarly, in the detailed design, the modeling is detailed according to the contents of the detailed design of an engine, a clutch, a brake, a transmission, a control unit, and the like, whereby the validity of the design contents in the details such as a torque variance, a transmission shock, a vibration noise, and the control algorithm is verified with the model.

The model made by the above-mentioned process is sequentially disassembled into the lower model from the abstract model at the project stage along the part formation, so that a systematic model hierarchized from the product to the part and its details is formed.

Also, in the above-mentioned process of the project, design and modeling, the development is proceeded by the design drawing of the actuality realizing the target characteristic, and the model verifying the design drawing. However, both are eventually hypotheses. Accordingly, it is necessary to test both by an experimental car made based on the design drawing or the like, to identify the model, and to verify the validity of the hypotheses.

(2) Relationship between product development and identification

By the above-mentioned reason, the identification shown in the lower side of FIG. 39 is performed based on the data of the functional parts and a car test. The identification and the test necessary therefor are performed separately in the above-mentioned steady and transient states. The model is converted in accordance with the test method as shown in FIGS. 9–13 for the steady test, and in FIGS. 21–30 for the transient test, so that the identification of the test model is performed by the test data. In the identification performed here, the identification result of the test models firstly performed per functional part are integrated along the part formation to be made the identification of the product model.

It is supposed that the functional parts of the battery, the motor, and the electrically driven arm in FIG. 21 are individually modeled, for example, and the product in which the parts are mutually connected is an electric actuator. The model of the electric actuator can be represented by a hierarchized model where the models of the battery, the motor, and the electrically driven arm are made lower level. Also, it is seen that the equation in which the models are integrated turns into Eq.(34).

Accordingly, if the motor at the center of FIG. 21 and the electrically driven arm on the right side of FIG. 21 are individually identified, and they are made the characteristic value of FIG. 21, the electric actuator on the upper hierarchy is naturally identified. The model which can faithfully reproduce the characteristic value and the performance of the product along the mode of the actuality is called a "virtual prototype".

As an applying method of this hierarchized model, it is possible to convert the electric actuator model into the test model when the battery and the electrically driven arm are already identified in FIG. 21, to make the identified internal characteristic values fixed values, and to perform a partial identification defined to an unfixed internal characteristic value of the motor model.

5.2 Virtual Test by Virtual Prototype

Thus identified part model is confirmed as a virtual prototype of the part reproducing the function and the performance held by each part. Similarly, the product model in which the part models already identified are mutually connected and integrated means that the model is confirmed as a virtual prototype reproducing the product. Also, these models result in the identification by converting the models into test models in accordance with the above-mentioned test methods, comparing and evaluating the reproducibility and the test result of the actuality, and verifying the difference between both.

Accordingly, the virtual prototype of the identified product and parts can be evaluated as to the validity by performing the computer simulation instead of the various tests of experimental articles and the like. Performing the evaluation test of the actuality on the computer by utilizing the virtual prototype is called a "virtual test" of the parts or the product. The simulation which has verified the validity of the identification result obtained in FIGS. 37–38 is also one example.

(1) Internal Formation of Virtual Test Model

The virtual test is usually applied with the test standard determining the same environment condition as the evaluation test of the actuality, a test condition and performance such as driving operation, and an evaluation standard such as a success/failure judgment, a performance prediction, a presence/absence of abnormal phenomena, and the like by the reproduction data of the performance and the behavior. This can be typically shown in FIG. 40.

Figure 40:
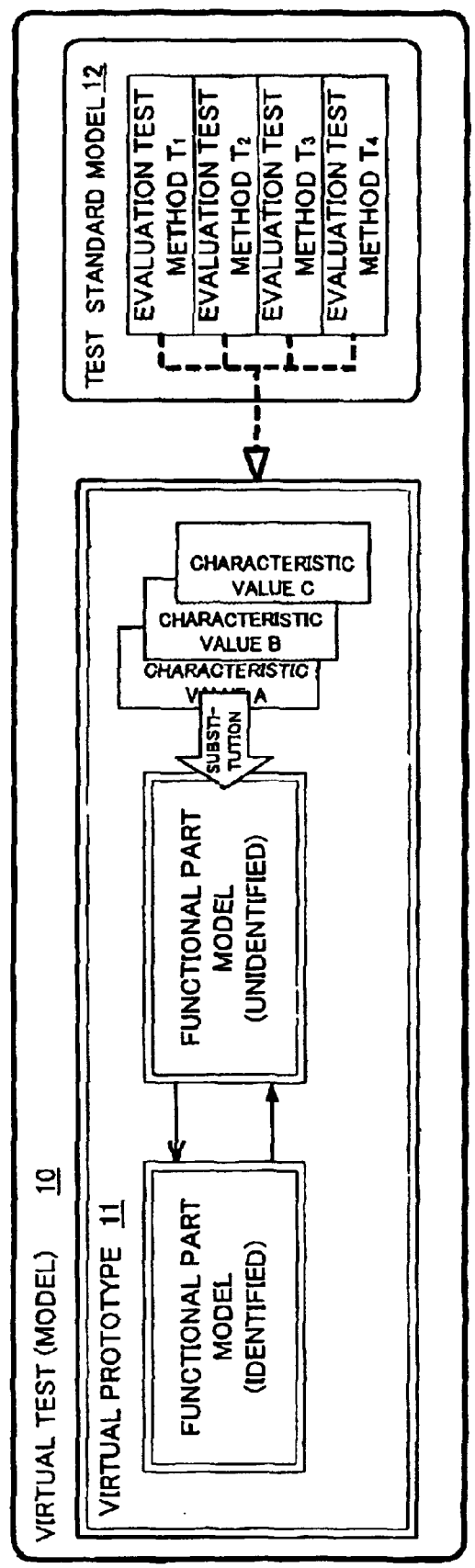
FIG. 40 is a block diagram showing a concept of a virtual test according to the present invention.

FIG. 40 is a basic arrangement of a virtual test model 10 where a virtual prototype 11 and a test standard group 12 applied thereto are modeled to be incorporated. The virtual prototype in this arrangement comprises two kinds of functional part models, an already identified functional part model and a functional part model in which design values and characteristic values of similar parts are provided upon the virtual test.

Both are distinctive in that the former is used as a model of a part having a basic function governing the function and the performance of the product, while the latter is used as a model extended for various products whose characteristic values are different in the application, the structure, and the shape of the products. The product model having both models united indicates that the evaluation test of various products and the test evaluation of various product groups where the derived functional models (latter) of different characteristic values are combined with the identified basic functional model (former) can be performed by the virtual test.

(2) Virtual Prototype Example of Virtual Testing Car

Figure 41:
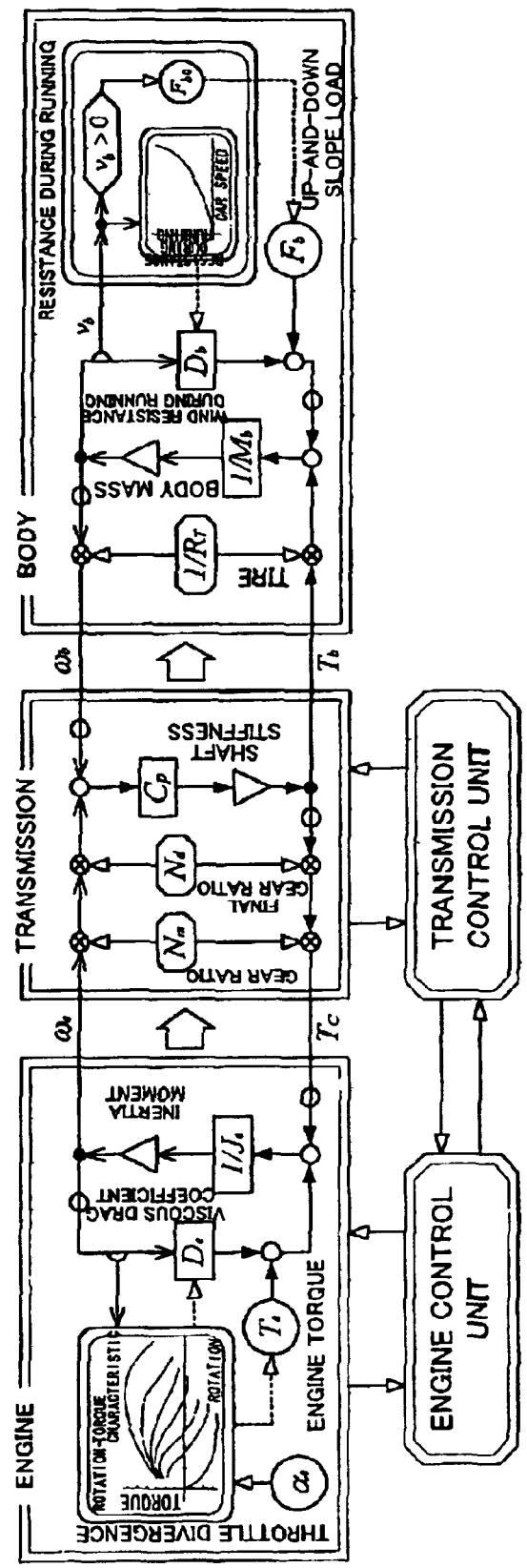
FIG. 41 is a diagram showing a model at the time when a virtual testing system according to the present invention is applied to a car.

For example, a simple model of the virtual prototype for car in FIG. 40 can be shown in FIG. 41. FIG. 41 is an example of a virtual prototype showing a functional model where the functional parts of the engine and the transmission are modeled to be integrated as a power train (P/T), and a functional model where various types of cars which are different in a structure and the like are modeled as a body, and both are integrated as a car. Between the models of the functional parts, the engine and the transmission are related with the angular velocity $\omega_e$ that is a potential quantity, and with the torque $T_e$ that is a flow quantity, while the transmission and the body are related with the torque $v_b$ that is a potential quantity, and with the torque $f_b$ that is a flow quantity.

The characteristics in the models are as follows:

The characteristics of the engine are a moment of inertia $J_e$, a viscous resistance coefficient $\delta_e$, and an internal torque $T_e$. $\delta_e$ and $T_e$ among them respectively indicate a partially linearized gradient, and a generation torque when the engine rotation number is "0", in the rotation—torque characteristic in which a throttle divergence $\alpha_e$, an atmospheric pressure $p_e$, and an air temperature $t_e$ are inputted.

The characteristics of the transmission are a gear ratio $N_m$, a final gear ratio $N_d$, and a stiffness of an output axis $C_p$. Finally, the characteristics of the body are a tire radius $R_T$, a mass of the body $M_b$, a resistance during running $D_b$, and an ascent of a running road $\theta$. Since the characteristics of the body, $R_T$, $M_b$, and $D_b$ are different according to the body structure or the like, they are required to be replaced according to the type of car.

Moreover, the control characteristic values of the engine control unit and the transmission control unit respectively controlling the engine and the transmission are preliminarily identified by the test data.

In order to perform a virtual test under the same condition as the car driving state by using the virtual prototype in FIG. 41, the following model is further required. Firstly, for the gradient $\theta$, the atmospheric pressure $p_e$, the air temperature $t_e$ and the like, the environment condition model provided as an environment condition for using cars is required. Furthermore, for the throttle divergence $\alpha_e$, and a gear ratio $N_g$ of the transmission, the operation model which provides the driving operation condition of cars is required.

Finally, in order to evaluate the reproduction result of the virtual prototype in which the virtual test has been performed, the observation model for observing $\omega_e$, $v_b$, $T_e$, $f_b$, and the like is required. The model for the conditions and for performing the evaluation is modeled based on the evaluation test methods of the test standard models shown in FIG. 40.

The virtual test performed by the model can be applied to various types of cars by incorporating the characteristic values of the body model which are different depending on the type of car into the virtual prototype of the functional part in the P/T which faithfully reproduces the characteristic value, performance, and behavior of the actual machine. The virtual test using the virtual prototype of the car model can be substituted for the various tests performed to various types of car on which the same P/T is mounted.

In the development of cars so far, the evaluation tests extending over a wide range have been performed to the cars having many body structures, so that the validity as a commodity has been verified. In such vast numbers of tests, the number of cars made on the experimental basis can be reduced and the development period required for the test can be shortened by the virtual test performed with the body characteristic value in the virtual prototype being replaced and with modeled test standard groups being combined. As a result, cost for a development can be reduced.

5.3 Virtual Testing System (Model)

Figure 42:
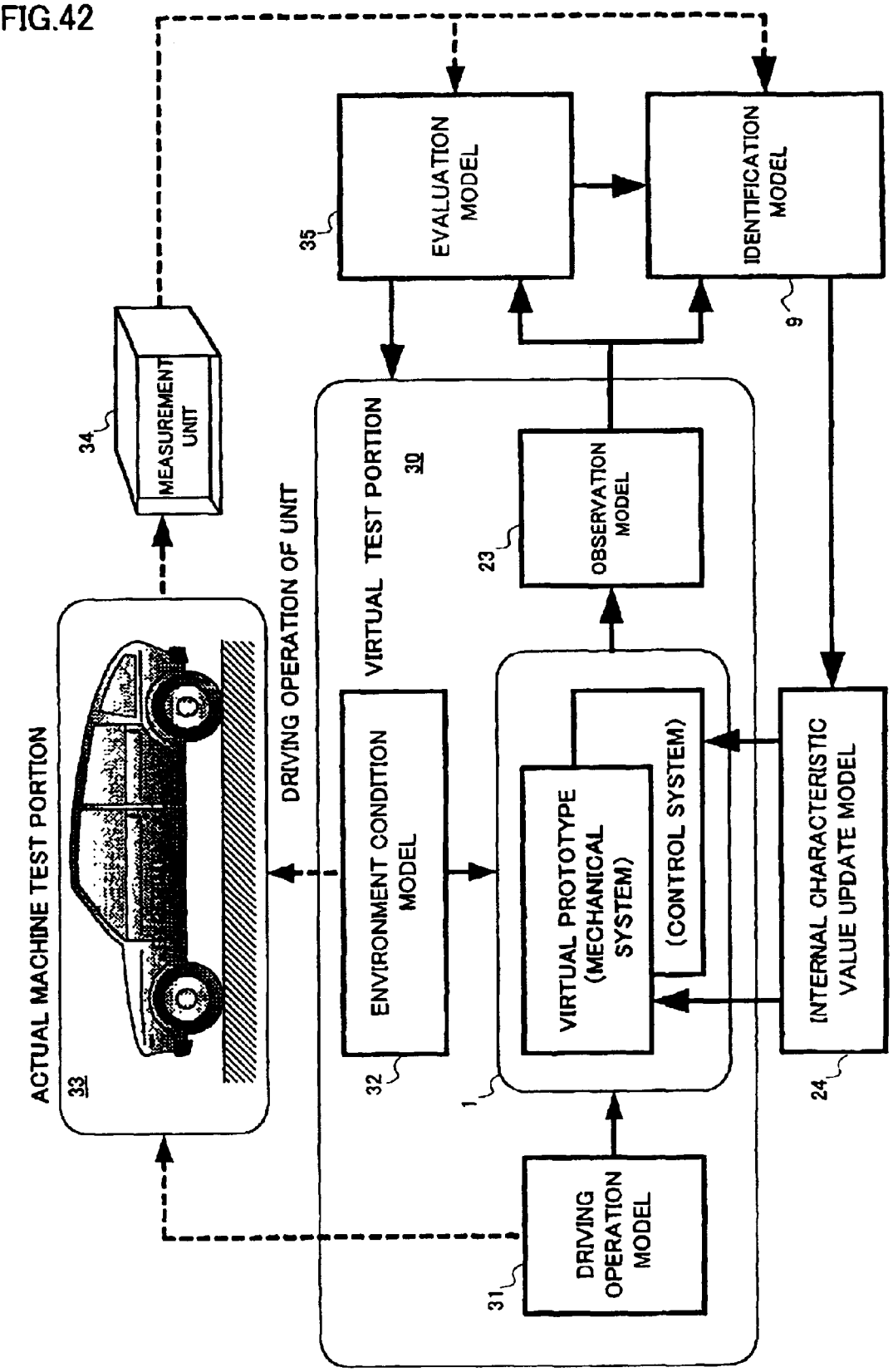
FIG. 42 is a block diagram showing an embodiment of a virtual testing system according to the present invention.

The basic arrangement of the actual machine test and the identification as well as the virtual test by the virtual prototype can be shown as in FIG. 42.

It has been already described for the virtual test of the virtual prototype that the tested model which forms a subject of the actual machine test can be converted into the test model, the test standard can be modeled as the driving operation model and the environment condition model, and the execution result of the virtual prototype can be modeled as the observation model.

It is possible to compare and evaluate both of the observation data reproduced by the virtual test and the test data of the actual machine test and to perform the identification. This indicates that the virtual test model and the test model for the identification can be made common.

Namely, the virtual testing system (model) can have consistency of the actual machine test, the identification, and the virtual test by incorporating an identification model 9 (corresponding to a calculation unit in FIG. 38) which models the identification technique and process to update the internal characteristic value of the virtual prototype, and an evaluation model 35 in which the virtual test verifies the validity of the reproduction data.

In FIG. 42, the actual machine test data are inputted to the evaluation model and to the identification model, and the result of the evaluation model is inputted to be related. As for both models, the following processes are performed: In case a problem arises in the result of the success/failure judgment in the virtual test, the former performs the actual machine test to evaluate again as shown in a dotted line, and in case there is a problem in the identification result of the virtual prototype, the latter can perform the identification again.

Main contents of each portion in the virtual testing system shown in FIG. 42 are given as follows:

①The virtual prototype 1 corresponds to the motor model in FIG. 38, and a model which reproduces the function, the performance, and the characteristic value of the product and part, which is composed of a mechanical system model relating to the mechanism and the structure, and the control system model for controlling them.

②A driving operation model 31 is a model for operating the virtual prototype 1 by the same driving condition as the actual machine. For example, there are an accelerator operation, a transmission operation, a braking operation of a car, and the like.

③ An environment condition model 32 is a model for reproducing the influence of the environment with the virtual prototype 1 being made operate under the same condition as the environment for using the actual machine. For example, there are a running road, a temperature, a humidity, an atmospheric pressure, and the like when the car makes a market running.

④An observation model 23 is a model for reproducing the data, on the model, at each measurement point measured in the actual machine test as shown in FIG. 38, so that the data which are difficult to be measured in an actual machine test can be observed on the model.

⑤An internal characteristic update model 24 is a model for updating the internal characteristic value of the virtual prototype based on the identification result, as shown in FIG. 38.

⑥An actual machine test portion 33 performs a test which has been performed in the prior art, and a measurement unit 34 in the actual machine test portion 33 shows a unit for taking the test data into a computer on real time basis.

The above-mentioned operation can be summed up as follows: If the driving operation condition and the environment condition are provided to the virtual prototype 1 from the models 31 and 32 respectively, the virtual prototype 1 provides the reproduction data obtained as a result of the simulation at this time to the evaluation model 35 from the observation model 23. The evaluation model 35 evaluates, instead of the actual machine test, whether or not the reproduction data of the simulation result is valid (validity of product/part) by comparing the evaluation reference determined by the test standard with the reproduction data.

In case of a failed evaluation, the evaluation model 35 instructs the virtual test portion 30 to change the driving operation condition and the environment condition, and to conduct the identification again if the deviation between the actual machine test data and the reproduction data is large. Thus, as shown in the dotted line in FIG. 42, the driving operation condition and the environment condition are respectively provided to the actual machine test portion 33 from the models 31 and 32.

Accordingly, if the deviation between the actual machine test data from the actual machine test portion 33 through the measurement unit 34 and the reproduction data is large, the evaluation model 35 instructs the identification model 9 to conduct the identification again. Since the identification model 9 corrects the internal characteristic value of the virtual prototype 1 by the internal characteristic update model 34 after receiving the actual machine test data, the evaluation is performed again at the evaluation model 35 through the observation model 23. As a result, the identification model 9 updates the internal characteristic value of the virtual prototype 1 so that the deviation between the actual machine test data and the reproduction data becomes least.

When the evaluation ends, another modification (e.g. modification according to a type of car) in the virtual prototype 1 is evaluated. Particularly, by performing the identification to the internal characteristic value (control parameter) of the control model in the virtual prototype, the virtual prototype 1 can be tuned, according to the type of car, to an optimum state.

5.4 Actual Machine Test of Transmission Applying Virtual Test

In case the actual machine test is performed to a unit of the functional part of the tested object, the functional part of the drive system for driving the part and the functional part of the load system which forms the load are required. The method in which the virtual prototype where such a drive system functional part and a load system functional part are identified is incorporated into the testing unit, and the actual machine test of the tested object is performed will now be examined.

Figure 43:
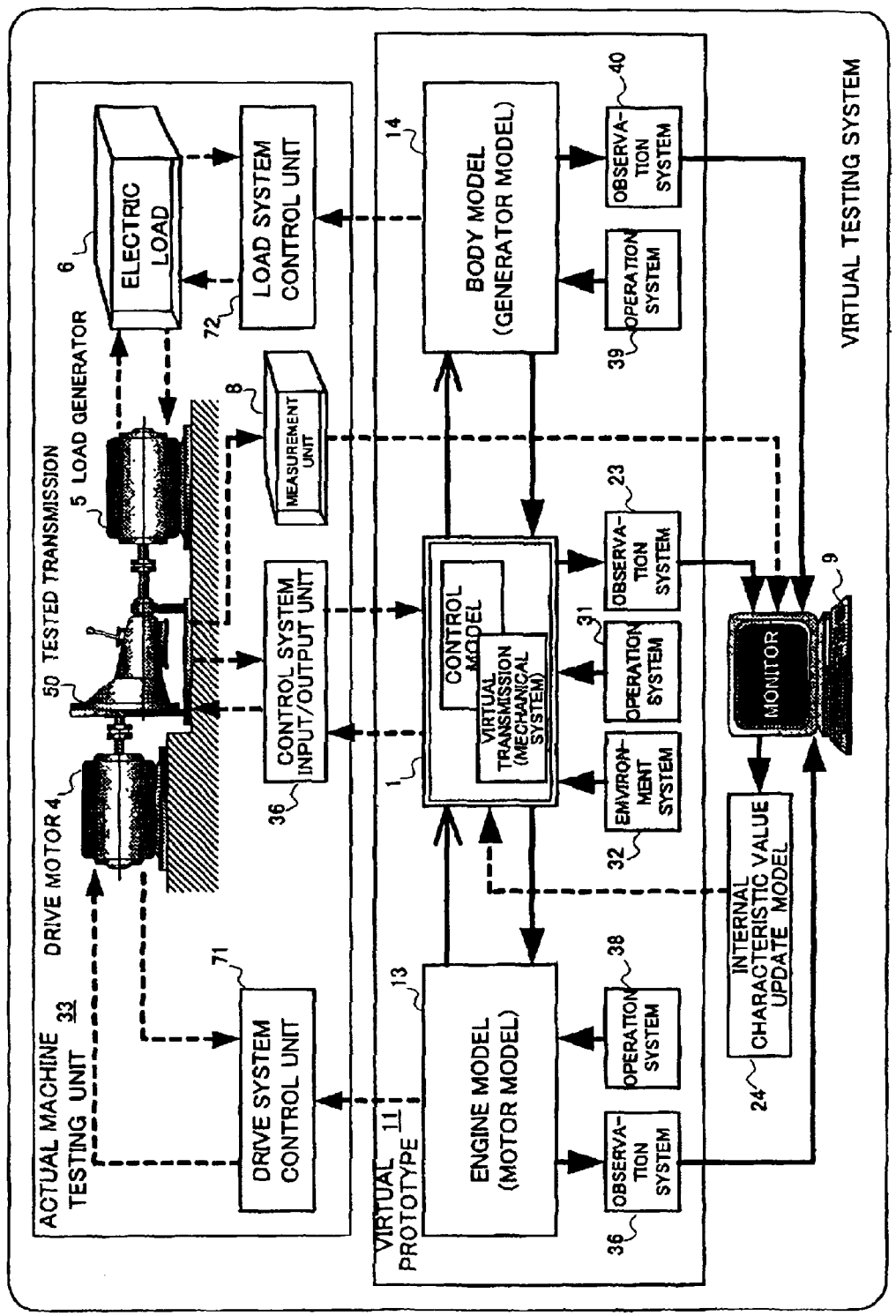
FIG. 43 is a block diagram showing an example applying a virtual testing system according to the present invention to an actual machine test of a transmission.

FIG. 43 shows an example of a testing unit of a transmission included in the virtual prototype.

FIG. 43 shows a unit for reproducing the drive characteristic of the engine and the load characteristic of the car by the drive motor and the load generator, and for performing the actual machine test to the transmission proper along the actual use state. This unit derives the performance required for the running of the car from the engine performance which forms the drive source, and the evaluate test about various performances relating to the acceleration such as an acceleration performance or a gearshift shock is performed by the actual machine.

In FIG. 43, the testing unit 33 is composed of the drive motor 4 for driving the transmission, the load generator 5 which forms the load, the electric load 6, and the measurement unit 8 for measuring the driving state. Also, to the testing unit 33 the virtual prototype 11 of the drive motor 4, the load generator 5 and the transmission 50 is connected for reproducing the driving state of the car. The testing unit 33 comprises the drive system control unit 71 and the load system control unit 72 which faithfully reproduce the result at the drive motor 4 and the load generator 5.

These control units 71 and 72 provide the drive torque of the engine to the transmission 50 by the drive motor 4, and reproduce the load torque provided to the transmission 50 through the body by the load generator 5 and the electric load 6. Both models of the drive motor 4 and the load generator 5 can reproduce the function, the performance, and the behavior of the engine and the body in the testing unit 33 by the identified virtual prototype 11.

Figure 44:
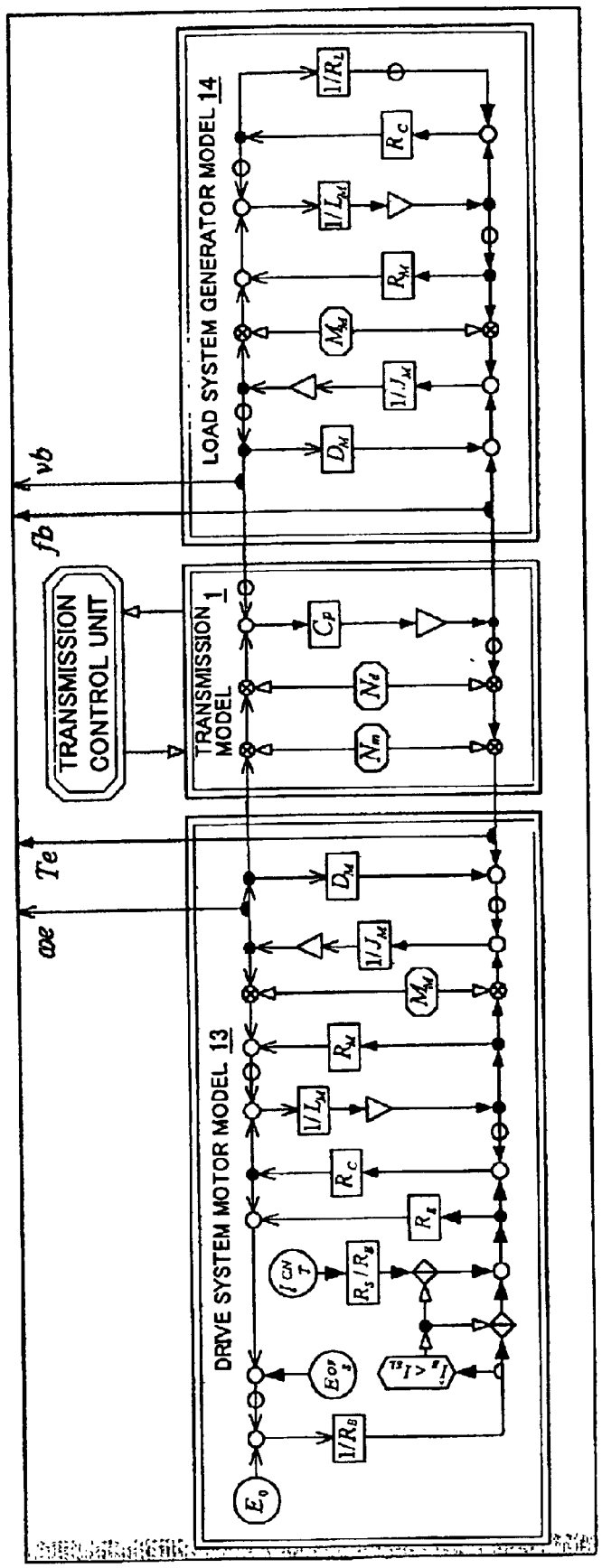
FIG. 44 is a model diagram showing a virtual testing system of a drive system, a transmission, and a load system.

The virtual prototype in which these drive motor 4, transmission 50 and load generator 5 are modeled is shown in FIG. 44. It is to be noted that the operation system models 31, 38, 39, and the environment system model 32 inputted to the transmission model 1 in FIG. 43 are the models of the test standard mentioned above. The former represents the model which inputs the driving operation condition of the driver, and the latter inputs the environment condition such as an air temperature which influences the internal characteristic value of the transmission. Also, the observation system models 23, 37, and 40 are models for observing the state values inside the virtual prototypes.

The motor model 13 of the drive system in FIG. 44 is composed of the models of the motor, the battery, the fixed current control respectively in FIGS. 6, 4A, and 30. It is to be noted that a part of the internal characteristic values of the motor model 13 are omitted for simplified description of the model. Similarly, on the load side, the load generator model 14 is composed of the braking resistance in FIG. 4(1) and the electric load is composed of the braking resistance on the left a side of FIG. 13, where a part of the internal characteristic values is omitted.

In FIG. 44, the angular velocity $\omega_e$, and the input torque $T_e$ connecting the drive system motor model 13 and the transmission model 1 are provided as target values of the drive system control unit 71. Similarly, a velocity $v_b$ and a drive force $f_b$ of the load generator model 14 are provided as target values of the load system control unit 72. Also, the drive torque $T_e$ of the drive motor 4 can be reproduced by controlling the control current $I_{CNT}$ with the operation system from the fixed current control model in FIG. 30 and by adjusting the current of the drive motor.

Also, the load torque of the load generator 5 can be reproduced by being changed into the braking resistance value through the operation system from the motor model of the braking test in FIG. 13. Also, as for the load torque, the fixed current control model and its unit in the same FIG. 30 as the drive motor may be incorporated instead of the braking resistance.

Moreover, into the testing unit 33 shown in FIG. 43, the internal characteristic update model 24 is incorporated in which the evaluation model (see FIG. 42) provided in the calculation unit 9 evaluate a difference if generated between the test result of the transmission 50 and the reproduction result of the virtual prototype 11, and the identification model (see FIG. 42) similarly provided in the calculation unit 9 identifies the internal characteristic value in the transmission model (virtual prototype) 1.

5.5 Actual Machine Test Example of Power Train (P/T) Applying Virtual Test

An example will be examined in which the actual machine test of the P/T where the engine and the transmission, except the motor 4 on the drive side and the virtual prototype 13 and the drive system control unit 71 leading to the motor 4, are united is performed in the actual testing unit shown in FIG. 43.

Figure 45:
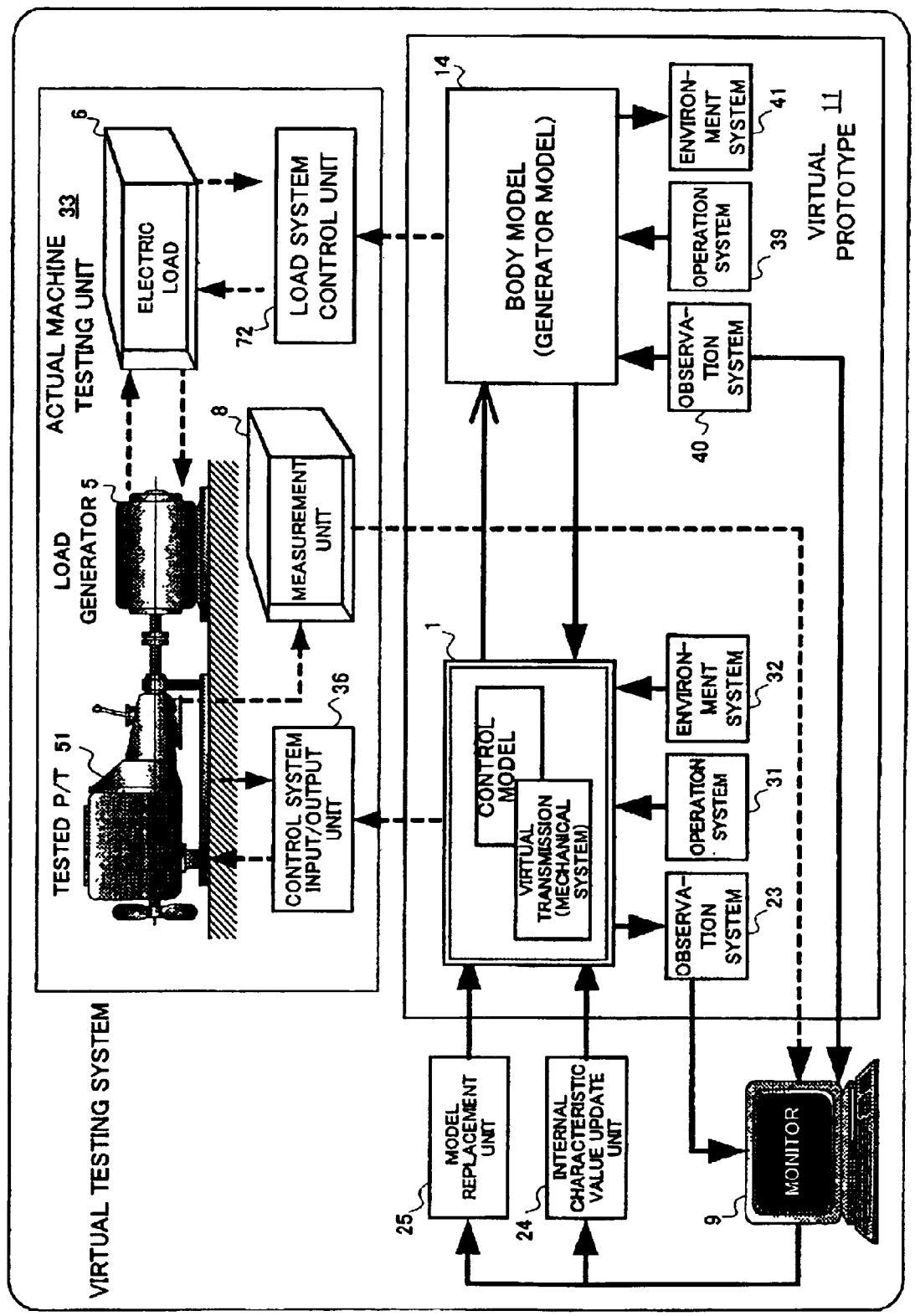
FIG. 45 is a block diagram showing an example applying a virtual testing system according to the present invention to an actual machine test of a power train.

The example of the actual machine testing unit having the P/T and the load generator is shown in FIG. 45.

In this example, the same P/T 51 is mounted on the bodies whose structures are different shown in FIG. 41, and the actual machine test is performed to the various cars, so that the adaptability of the P/T 51 for the cars having the different body characteristic values is verified.

The virtual prototype 1 of the P/T 51 requires many kinds in which transmissions such as an automatic transmission, a manual transmission, and a continuously variable gear are combined in addition to kinds of motors such as a motor, a gasoline engine, and a diesel engine. Accordingly, these virtual prototypes 1 are replaced with a model replacement unit 25.

Also, the virtual prototype 1 of the P/T 51 has a control model for reproducing the software of the control unit of the engine and the transmission, so that the virtual prototype 1 can control the model of the virtual prototype 1 and can directly control the actual machine of the engine and the transmission through a control input/output unit 36.

Accordingly, when adaptability of the body performance reproduced at the actual machine P/T 51 and the load generator 5 is worsened, the internal characteristic value of the control model can be changed through an internal characteristic update unit 24. Then, the measure effect is firstly confirmed in the virtual prototype 1, and secondly the adaptability is again evaluated by the actual machine test to be confirmed.

In case a low-speed region torque of engine mounted on a car whose body weight or running resistance is large is insufficient and the starting acceleration power is insufficient, the control characteristic value of the control model is updated through the internal characteristic update unit 24 in order to improve the acceleration performance and increase the fuel amount at starting the acceleration. The measure effect of the control amount change and the bad influence on the fuel-efficiency and the exhausted gas worried because of the increased amount are firstly confirmed by the virtual test in the simulation of the virtual prototype, and the actual machine evaluation test of the P/T 51 is finally performed by using the virtual testing unit.

By this process, the tests for reproducing bad influence which examines the measure effect and many test items can be verified by the simulation of the virtual prototype in a short time, so that it becomes possible to define the actual test items requiring a long time based on the verification result, and to perform an efficient test operation.

As described above, a characteristic value identification method and an apparatus therefor according to the present invention is arranged so that a functional model of a part is prepared based on a potential quantity and a flow quantity representing a strength and a quantity of energy applied to the part, a steady internal characteristic value of the functional model in a steady state is identified, and a transient internal characteristic value of the functional model in a transient state is identified by using the identified steady internal characteristic value. Therefore, the function of all of the articles which govern two dimensions of the potential quantity and the flow quantity prescribing the energy can be modeled.

Also, since the transient identification is performed to the internal characteristic value of the model after the steady identification, the steady identification without an interference of a transient state can be performed. Since the transient identification is performed based on the steady identification, there is an effect of obtaining an accurate internal characteristic value by a simplified identification process. Also, it is possible to faithfully reproduce products/parts in the steady state and the transient state.

Moreover, by manufacturing an apparatus which uses such a characteristic value identification method, it becomes possible to promptly perform the identification of the functional model of the same kind.

Furthermore, the characteristic value identification apparatus according to the present invention is arranged such that the functional model having the characteristic value identified by the identification apparatus is incorporated in a virtual testing system as a virtual prototype, reproduction data are obtained from the virtual prototype by providing a driving operation condition and an environment condition, actual machine test data obtained by the driving operation condition and the environment condition are compared with the reproduction data, and a re-identification is performed depending on the comparison result as the occasion demands. Therefore, it becomes possible to omit the actual machine test performed in a development process of a design, prototyping, and a test, to shorten a period, and to reduce cost for a development.

What is claimed is:

1. A characteristic value identification method comprising:
    a first process to prepare a government equation representing a functional model of a product part and having, at an input and an output on each side, a pair of a potential quantity and a flow quantity values, respectively, representing a strength and a quantity of energy applied to the product part;
    a second process to convert the functional model into a steady functional model in a steady state by eliminating terms of a transient internal characteristic value in the government equation to identify a steady internal characteristic value of the government equation; and
    a third process to identify the transient internal characteristic value in the government equation by using the steady internal characteristic value, wherein the third process includes:
    a first step for preparing a transient test model to determine at least one transient internal characteristic value in the transient state of the government equation;
    a second step for collecting transient test data by performing a test corresponding to the transient test model;
    a third step for applying the steady internal characteristic value to the internal characteristic value of the transient test model to generate transient phenomenon reproduction data; and
    a fourth step for correcting the transient phenomenon reproduction data based on an error between the transient phenomenon reproduction data and the transient test data, thereby identifying the transient internal characteristic value,
    wherein when the error does not lie within an allowable range the fourth step repeatedly corrects a predetermined transient internal characteristic value within the transient phenomenon reproduction data until the error lies within the allowable range, and determines the transient internal characteristic value to be identified when the error lies within the allowable range.

2. The characteristic value identification method as claimed in claim 1 wherein the second process includes;
    a first step for preparing a steady test model to determine at least one steady internal characteristic value from the steady functional model;
    a second step for collecting steady test data by performing a test corresponding to the steady test model; and
    a third step for identifying a steady internal characteristic value of the government equation based on the steady test data.

3. The characteristic value identification method as claimed in claim 2 wherein the third step for identifying converts the government equation into a recurrence equation to determine the steady internal characteristic value from a recurrence coefficient of the recurrence equation.

4. The characteristic value identification method as claimed in claim 2 wherein the third step for identifying divides the steady internal characteristic value into a known factor and an unknown factor to identify the steady internal characteristic value of the unknown factor.

5. The characteristic value identification method as claimed in claim 1 wherein the fourth step preliminarily calculates a variance deviation, as a time history sensitivity, to an initial value at a time when each transient internal characteristic value is increased or decreased at a fixed ratio, and selects a transient internal characteristic value having a maximum sensitivity within the time history sensitivity as the predetermined transient internal characteristic value.

6. The characteristic value identification method as claimed in claim 1 wherein the fourth step preliminarily calculates a variance deviation, as a time history sensitivity, to an initial value at a time when each transient internal characteristic value is increased or decreased at a fixed ratio, and selects a transient internal characteristic value having the time history sensitivity similar to the error as the predetermined transient internal characteristic value.

7. The characteristic value identification method as claimed in 6 wherein the fourth step simultaneously selects a plurality of transient internal characteristic values having different maximum sensitivity times as the predetermined transient internal characteristic value.

8. A characteristic value identification apparatus comprising:
    block replacement means for a functional model of a product part represented by a government equation having, at an input and an output on each side, a potential quantity and a flow quantity representing a strength and a quantity of energy applied to the product part;
    test reproduction means for reproducing at least one steady test model in a steady state of the functional model and at least one transient test model in a transient state, the functional model being converted into the steady test model in a steady state by eliminating terms of a transient internal characteristic value in the government equation;
    testing means of the product part for performing a steady test and a transient test respectively corresponding to the steady test model and the transient test model;

measurement means for collecting steady test data and transient test data at a time when a steady test and a transient test of the product part are performed by the testing means; and calculating means for identifying a steady internal characteristic value of the steady test model by using the steady test data, for applying the steady internal characteristic value to the transient test model to generate transient phenomenon reproduction data, and for correcting the transient phenomenon reproduction data based on an error between the transient phenomenon reproduction data and the transient test data, thereby identifying a transient internal characteristic value, wherein when the error does not lie within an allowable range the calculating means repeatedly corrects a predetermined transient internal characteristic value within the transient phenomenon reproduction data until the error lies within the allowable range, and determines the transient internal characteristic value to be identified when the error lies within the allowable range.

9. The characteristic value identification apparatus as claimed in claim 8 wherein the calculating means preliminarily calculates a variance deviation, as a time history sensitivity, to an initial value at a time when each transient internal characteristic value is increased or decreased at a fixed ratio, and selects a transient internal characteristic value having a maximum sensitivity within the time history sensitivity as the predetermined transient internal characteristic value.

10. The characteristic value identification apparatus as claimed in claim 9 wherein the calculating means simultaneously selects a plurality of transient internal characteristic values having a different maximum sensitivity time as the predetermined transient internal characteristic value.

11. The characteristic value identification apparatus as claimed in claim 8 wherein the calculating means preliminarily calculates a variance deviation, as a time history sensitivity, to an initial value at a time when each transient internal characteristic value is increased or decreased at a fixed ratio, and selects a transient internal characteristic value having the time history sensitivity similar to the error as the predetermined transient internal characteristic value.

12. A virtual testing system which incorporates a functional model, as a virtual prototype, having an internal characteristic value identified by a characteristic value identification apparatus including:

block replacement means for a functional model of a product part represented by a government equation having, at an input and an output on each side, a potential quantity and a flow quantity representing a strength and a quantity of energy applied to the product part;

test reproduction means for reproducing at least one steady test model in a steady state of the functional model and at least one transient test model in a transient state, the functional model being converted into the steady test model in a steady state by eliminating terms of a transient internal characteristic value in the government equation;

testing means of the product part for performing a steady test and a transient test respectively corresponding to the steady test model and the transient test model;

measurement means for collecting steady test data and transient test data at a time when a steady test and a transient test of the product part are performed by the testing means; and calculating means for identifying a steady internal characteristic value of the steady test model by using the steady test data, for applying the steady internal characteristic value to the transient test model to generate transient phenomenon reproduction data, and for correcting the transient phenomenon reproduction data based on an error between the transient phenomenon reproduction data and the transient test data, thereby identifying a transient internal characteristic value, said virtual testing system comprising:

condition assigning means for assigning a driving operation condition and an environment condition to the characteristic value identification apparatus;

observation means for observing reproduction data obtained by the virtual prototype when the driving operation condition and the environment condition are assigned;

evaluation means for evaluating an observation result of the observation means;

another measurement means for measuring actual machine test data at a time when the driving operation condition and the environment condition are provided to an actual machine which forms a subject of the virtual prototype, and re-identification means of the virtual prototype, the evaluation means comparing an output of the measurement means and the observation result, and making the re-identification means re-identify the virtual prototype according to the comparison result.

13. The virtual testing system as claimed in claim 12 wherein a fixed virtual prototype is incorporated into a product part of a drive system and a load system connected to the product part as the virtual prototype, the testing means performs a test corresponding to the fixed virtual prototype, and the evaluation means at this time makes the re-identification means perform a re-identification according to the comparison result.

* * * * *

UNITED STATES PATENT AND TRADEMARK OFFICE
CERTIFICATE OF CORRECTION

PATENT NO. : 6,920,413 B2
DATED : July 19, 2005
INVENTOR(S) : Shizuo Sumida et al.

It is certified that error appears in the above-identified patent and that said Letters Patent is hereby corrected as shown below:

<u>Column 46,</u>
Line 47, change "in 6" to -- in claim 6 --.

Signed and Sealed this

Eighteenth Day of April, 2006

JON W. DUDAS
*Director of the United States Patent and Trademark Office*